United States Patent
Liu et al.

(10) Patent No.: US 12,449,838 B2
(45) Date of Patent: Oct. 21, 2025

(54) EDGE PROTECTION STRUCTURE AND FOLDABLE DISPLAY TERMINAL

(71) Applicant: HUAWEI TECHNOLOGIES CO., LTD., Guangdong (CN)

(72) Inventors: Yu Liu, Shanghai (CN); Chong Xing, Xi'an (CN); Zheng Li, Shanghai (CN); Yin Li, Shanghai (CN); Qiaoying Ding, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 18/254,507

(22) PCT Filed: Nov. 27, 2021

(86) PCT No.: PCT/CN2021/133764
§ 371 (c)(1),
(2) Date: May 25, 2023

(87) PCT Pub. No.: WO2022/111667
PCT Pub. Date: Jun. 2, 2022

(65) Prior Publication Data
US 2024/0004425 A1    Jan. 4, 2024

(30) Foreign Application Priority Data

Nov. 28, 2020  (CN) .......................... 202011368621.7
Nov. 28, 2020  (CN) .......................... 202011368622.1
(Continued)

(51) Int. Cl.
*G06F 1/16*    (2006.01)
(52) U.S. Cl.
CPC .......... *G06F 1/1616* (2013.01); *G06F 1/1652* (2013.01); *G06F 1/1656* (2013.01)

(58) Field of Classification Search
CPC .... G06F 1/1681; G06F 1/1616; G06F 1/1652; G06F 1/1656
See application file for complete search history.

(56) References Cited

U.S. PATENT DOCUMENTS

| | | |
|---|---|---|
| 10,659,576 B1 | 5/2020 | Hsu et al. |
| 2017/0205853 A1 | 7/2017 | Sun |

(Continued)

FOREIGN PATENT DOCUMENTS

| | | |
|---|---|---|
| CN | 107547700 A | 1/2018 |
| CN | 110136585 A | 8/2019 |

(Continued)

OTHER PUBLICATIONS

European Search Report in European Appln. No. 21897167.9, mailed on Apr. 8, 2024, 9 pages.
(Continued)

*Primary Examiner* — Allen L Parker
*Assistant Examiner* — Peter Krim
(74) *Attorney, Agent, or Firm* — Fish & Richardson P.C.

(57) ABSTRACT

A foldable display terminal, comprising a rotating shaft assembly, a display, a first body, a second body, and an edge protection structure; the edge protection structure comprises a rigid member, a connector, and a soft rubber member; the soft rubber member comprises a protection part, two extension parts and two fastening parts, each extension part and each fastening part are respectively located at two ends of the protection part, a bending angle is formed between each extension part and each fastening part; the two extension parts are located on part of the edge of the display, the two fastening parts are limited in gaps between the rotating shaft assembly and the two borders.

20 Claims, 61 Drawing Sheets

(30) Foreign Application Priority Data

Nov. 28, 2020 (CN) .......................... 202011368623.6
Dec. 26, 2020 (CN) .......................... 202011574525.8
Jan. 27, 2021 (CN) .......................... 202110114497.X

(56) References Cited

U.S. PATENT DOCUMENTS

| | | | |
|---|---|---|---|
| 2020/0183457 A1 | 6/2020 | Youn et al. | |
| 2020/0352038 A1* | 11/2020 | Kim | G06F 1/1641 |
| 2020/0409422 A1* | 12/2020 | Wang | F16C 11/045 |
| 2021/0004049 A1* | 1/2021 | Park | H04M 1/185 |
| 2023/0209733 A1* | 6/2023 | Kim | G06F 1/1686 |
| | | | 361/809 |
| 2025/0016937 A1* | 1/2025 | Kim | G06F 1/1637 |

FOREIGN PATENT DOCUMENTS

| | | |
|---|---|---|
| CN | 209201112 U | 8/2019 |
| CN | 110784567 A | 2/2020 |
| CN | 210864466 U | 6/2020 |
| CN | 111866230 A | 10/2020 |
| EP | 3734947 A1 | 11/2020 |

OTHER PUBLICATIONS

Extended European Search Report in European Appln No. 21897167.9, dated Apr. 8, 2024, 9 pages.

* cited by examiner

EDGE PROTECTION STRUCTURE AND FOLDABLE DISPLAY TERMINAL

CROSS-REFERENCE TO RELATED APPLICATIONS

This application is a National Stage of International Application No. PCT/CN2021/133764, filed on Nov. 27, 2021, which claims priority to Chinese Patent Application No. 202011368621.7, filed on Nov. 28, 2020 and Chinese Patent Application No. 202011368623.6, filed on Nov. 28, 2020 and Chinese Patent Application No. 202011368622.1, filed on Nov. 28, 2020 and Chinese Patent Application No. 202011574525.8, filed on Dec. 26, 2020 and Chinese Patent Application No. 202110114497.X, filed on Jan. 27, 2021. All of the aforementioned applications are hereby incorporated by reference in their entireties.

TECHNICAL FIELD

The present invention relates to the field of electronic technologies, and in particular, to an edge protection structure and a foldable display terminal.

BACKGROUND

A foldable display terminal usually includes a display and a screen support assembly configured to support the display. The screen support assembly includes a stationary shaft. When the foldable display terminal is folded, the display can be folded relative to a position of the stationary shaft. In an existing foldable display terminal, an edge of a display relative to a region of a stationary shaft is usually exposed. This affects appearance effect of the foldable display terminal. In addition, the edge is likely to be damaged due to a problem, for example, a collision, in a use process. This reduces reliability of the foldable display terminal.

SUMMARY

The present invention provides an edge protection structure and a foldable display terminal including the edge protection structure. The edge protection structure can protect an edge of a display and that corresponds to a position of a stationary shaft. This improves appearance effect of the foldable display terminal without affecting folding effect of the foldable display terminal, and prevents the display from being damaged due to a problem, for example, a collision, in a use process, thereby improving reliability of the foldable display terminal including the edge protection structure.

According to a first aspect, this application provides an edge protection structure. The edge protection structure is configured to protect an edge of a bending region of a display. The edge protection structure includes a rigid member, a connector, and a soft rubber member. Strength of the rigid member is greater than strength of the soft rubber member. The soft rubber member is an elastically deformable member, and the rigid member is connected to the soft rubber member by using the connector. The soft rubber member includes a protection part. The protection part includes a first surface and a second surface that are disposed opposite to each other and a third surface connected between the first surface and the second surface. The rigid member is located on one side of the first surface of the protection part. The connector includes a first part and a second part connected to the first part. The first part is connected to the protection part, and the second part is connected to the rigid member. The rigid member is disposed on one side of the bending region of the display, and the protection part of the soft rubber member is configured to cover the edge of the bending region.

In this implementation of this application, the edge protection structure includes the rigid member and the soft rubber member. When the edge protection structure in this application is applied to a foldable display terminal, the rigid member is disposed on the side of the bending region of the display, and the protection part of the soft rubber member covers the edge of the bending region. In this way, the edge of the bending region of the display can be wrapped by using the rigid member and the soft rubber member of the edge protection structure, to prevent the edge of the bending region of the display from being exposed, and improve appearance effect of the foldable display terminal. In addition, when the foldable display terminal is collided, because the edge of the bending region of the display is wrapped by the edge protection structure, the edge protection structure can protect the display, to prevent an edge position of the bending region of the display from being damaged due to the collision.

In this implementation of this application, the edge protection structure is a structure obtained by combining the rigid member and the soft rubber member. The soft rubber member can be bent synchronously with bending of the bending region of the display, to constantly protect the edge of the display, and prevent the edge protection structure from affecting bending of the bending region of the display. In addition, the edge protection structure further includes the rigid member. Compared with the soft rubber member, the rigid member can implement a better anti-collision function, to achieve good protection effect for the edge of the bending region of the display. In other words, in this application, the edge protection structure obtained by combining the rigid member and the soft rubber member protects the edge of the bending region of the display. This can achieve the good protection effect for the edge of the bending region of the display without affecting bending performance of the display, and improve the appearance effect of the foldable display terminal.

In some implementations, the soft rubber member further includes two fastening parts. The two fastening parts are respectively connected to two ends of the protection part, and each of the fastening parts is partially connected to the third surface of the protection part.

In these implementations of this application, the soft rubber member further includes the fastening part. When the edge protection structure is applied to the foldable display terminal, the fastening parts can be relatively fastened to a first body and a second body on two sides of a rotating shaft assembly of the foldable display terminal. By relatively fastening the fastening parts to the first body and the second body, a problem that the two ends of the protection part connected to the fastening parts tilt because the protection part is deformed after being bent with the display for a plurality of times can be avoided. In addition, when moving with the first body and the second body, the fastening parts can drive the protection part to be folded with the bending region of the display, to reduce acting force between the protection part and the display, so as to avoid damage to the display and improve reliability of the foldable display terminal.

In some implementations, the edge protection structure further includes two extension parts. The two extension parts are respectively connected to the two ends of the protection part. When the edge protection structure in this implementation is applied to the foldable display terminal, the extension parts at the two ends of the protection part of the edge protection structure are also fastened separately, so that a shape of the protection part can be further maintained, to avoid the problem that the two ends of the protection part tilt because the protection part is deformed after being bent with the display for the plurality of times.

In some implementations, the extension part includes a contact surface. The contact surface is connected between the first surface of the extension part and the second surface of the extension part, and the contact surface is smoothly connected to the third surface of the protection part. When the edge protection structure in this implementation is applied to the foldable display terminal, the contact surface of the extension part and the third surface of the protection part are both in contact with the display, and the contact surface of the extension part and the third surface of the protection part are smoothly connected. This can prevent the contact surface and the third surface from generating a protrusion due to a large angle change at a position at which the contact surface is connected to the third surface, to prevent the protrusion generated on the contact surface and the third surface from generating large pressure for the display, so as to ensure that the display is not damaged by pressure of the soft rubber part.

In some implementations, the extension part includes a fastening surface opposite to the contact surface. The protection part includes a fourth surface opposite to the third surface. The fastening surface is smoothly connected to the fourth surface. This avoids a significant step change or angle change at a position at which the fastening surface of the extension part is connected to the fourth surface of the protection part, ensures that the edge protection structure requires no high precision when being mounted on the rotating shaft assembly and can still ensure that an outer surface of the foldable display terminal still has good appearance effect, and avoids a problem that an appearance is asymmetric or mounting of a first edge protector or a second edge protector is affected, because the edge protection structure is mounted on the rotating shaft assembly with low precision, when the position at which the fastening surface of the extension part is connected to the fourth surface of the protection part has the significant step change or angle change.

In some implementations, the extension part and the soft rubber member are an integrated structure. In this way, the extension part and the soft rubber member are more closely combined, and it is ensured that the extension part and the soft rubber member are unlikely to be separated after being bent with the display for a plurality of times.

In some implementations, the rigid member and the second part of the connector are an integrated structure. In this way, the rigid member and the second part of the connector are more closely combined, and it is ensured that the rigid member and the second part of the connector are unlikely to be separated after being bent with the display for a plurality of times.

In some implementations, the rigid member is connected to the second part of the connector by using an adhesive, a screw, solder, or a fastener. In this way, a connection between the rigid member and the soft rubber member is simpler and costs are lower.

In some implementations, the first part and the protection part are an integrated structure. In this way, the protection part and the first part of the connector are more closely combined, and it is ensured that the protection part and the first part of the connector are unlikely to be separated after being bent with the display for a plurality of times. In addition, when the second part of the connector and the rigid member are also an integrated structure, that is, the rigid member, the soft rubber member, and the connector are an integrated structure, a connection between the rigid member and the soft rubber member is firmer, and a problem that the soft rubber member is separated from the rigid member after being bent for a plurality of times is avoided.

In some implementations, a rigid plate is embedded in the fastening part. Strength of the rigid plate is greater than the strength of the soft rubber part. In this implementation, the rigid plate is embedded in the fastening part. In this way, strength of the fastening part is enhanced, and when the foldable display terminal is bent, the fastening part is prevented from being deformed and stuck in the first body or the second body. This avoids a case that the fastening part is deformed and stuck in the first body or the second body to affect protection of the protection part for the edge of the bending region of the display.

In some implementations, the third surface of the protection part of the soft rubber member is a concave cambered surface. In this implementation, when the bending region of the display is bent, the protection part of the soft rubber member is bent from the third surface of the protection part to a direction away from the display. After the protection part is bent with the display for a plurality of times, the protection part is likely to generate plastic deformation. As a result, two ends of the protection part tilt in the direction away from the display. In this implementation, the third surface of the protection part is designed as the concave cambered surface, that is, the protection part is enabled to have initial deformation toward the display. This can partially neutralize deformation of the protection part in the direction away from the display after the protection part is bent for the plurality of times, and reduce a risk that the two ends of the protection part tilt after the protection part is bent for the plurality of times.

In some implementations, the protection part of the soft rubber member includes a fourth surface opposite to the third surface. A groove that is concavely disposed toward the fourth surface from the third surface is disposed on the protection part of the soft rubber member. By disposing the groove, it can be ensured that a shape of an outer surface of the protection part remains unchanged, to ensure that the foldable display terminal has good appearance effect and the protection part can be more likely to be deformed, so as to ensure that the protection part can be better bent and deformed with the display, and is unlikely to generate large acting force for the display to damage the display.

In some implementations, the soft rubber member is made of a soft rubber material, and the rigid member and the connector are both made of a metal material. The soft rubber material has features of being soft and elastically deformable. The soft rubber member is made of the soft rubber material, so that it can be ensured that the edge protection structure can protect the edge of the bending region of the display, and the edge protection structure can be prevented from affecting bending of the bending region of the display. The metal material has specific strength, to ensure that the rigid member can achieve good collision-resisting effect, so as to implement good protection for the display.

According to a second aspect, this application further provides a foldable display terminal. The foldable display terminal includes a stationary shaft, a display, and any edge protection structure according to the first aspect. The display includes a bending region, and the bending region of the display is stacked on the stationary shaft. The display includes a display surface and a side surface intersecting with the display surface, and the display surface is away from the stationary shaft. The edge protection structure includes a rigid member, a connector, and a soft rubber member. Strength of the rigid member is greater than strength of the soft rubber member. The soft rubber member is an elastically deformable member, and the rigid member is connected to the soft rubber member by using the connector. The soft rubber member includes a protection part. The protection part includes a first surface and a second surface that are disposed opposite to each other and a third surface connected between the first surface and the second surface. The rigid member is located on one side of the first surface of the protection part. The connector includes a first part and a second part connected to the first part. The first part is connected to the protection part, and the second part is connected to the rigid member. The rigid member is fastened to the stationary shaft, the rigid member is located on one side of the side surface of the display, and the rigid member is located in a length extension direction of the bending region. The protection part of the soft rubber member is located on a side that is of the display and that backs onto the stationary shaft, and the protection part covers an edge of the bending region of the display.

In this implementation of this application, the rigid member of the edge protection structure is fastened to a rotating shaft assembly, the rigid member is located on the side of the side surface of the display, and the rigid member is located in the length extension direction of the bending region. The protection part of the soft rubber member is located on one side that is of the edge of the bending region of the display and that backs onto the rotating shaft assembly. In this way, the edge of the bending region of the display is wrapped by using the rigid member and the soft rubber member of the edge protection structure, to prevent the bending region of the display from being exposed, so as to improve appearance effect of the foldable display terminal. In addition, when the foldable display terminal is collided, because the edge of the bending region of the display is wrapped by the edge protection structure, the edge protection structure can protect the display, to prevent an edge position of the bending region of the display from being damaged due to the collision.

In this implementation of this application, the edge protection structure is a structure obtained by combining the rigid member and the soft rubber member. The soft rubber member can be bent synchronously with bending of the bending region of the display, to constantly protect the edge of the display, and prevent the edge protection structure from affecting bending of the bending region of the display. In addition, the edge protection structure further includes the rigid member. Compared with the soft rubber member, the rigid member can implement a better anti-collision function, to achieve good protection effect for the edge of the bending region of the display. In other words, in this application, the edge protection structure obtained by combining the rigid member and the soft rubber member protects the edge of the bending region of the display. This can achieve the good protection effect for the edge of the bending region of the display without affecting bending performance of the display, and improve the appearance effect of the foldable display terminal.

In some implementations, the foldable display terminal further includes a first edge protector and a second edge protector. The soft rubber member further includes two fastening parts. The two fastening parts are respectively connected to two ends of the protection part. Each of the fastening parts is partially connected to the third surface of the protection part. The two fastening parts are respectively located on a side that is of the first edge protector and that faces the display and a side that is of the second edge protector and that faces the display. In other words, the two fastening parts of the soft rubber member are respectively pressed by the first edge protector and the second edge protector. In this way, a problem that the two ends of the protection part tilt because the protection part generates plastic deformation after being folded and unfolded with the display for a plurality of times can be avoided.

In some implementations, the foldable display terminal further includes a first body and a second body. The stationary shaft is located between the first body and the second body, and the stationary shaft is rotatably connected to the first body and the second body. The display further includes a first fastening region and a second fastening region. The bending region is located between the first fastening region and the second fastening region. The first fastening region of the display is opposite to the first body and is fastened to the first body. The second fastening region of the display is opposite to the second body and is fastened to the second body. In this way, when the foldable display terminal in this application needs to be folded, a user applies force to the first body and the second body, so that an end that is of the first body and that is away from the stationary shaft and an end that is of the second body and that is away from the stationary shaft are close to each other. In this way, the first fastening region of the display and the second fastening region of the display are folded by using a rotating shaft region of the display as an axis.

In this implementation of this application, a peripheral edge of the first edge protector is fixedly connected to the first body. The first edge protector covers an edge of the first fastening region of the display. In this way, the edge of the first fastening region of the display can be prevented from being exposed, to prevent the edge of the first fastening region of the display from being damaged due to a collision or a hit. A peripheral edge of the second edge protector is fixedly connected to the second body. The second edge protector covers an edge of the second fastening region of the display. In this way, the edge of the first fastening region of the display can be prevented from being exposed, to prevent the edge of the first fastening region of the display from being damaged due to a collision or a hit.

In some implementations, the soft rubber member further includes two extension parts. The two extension parts are respectively connected to the two ends of the protection part, and the two extension parts are respectively located on the side that is of the first edge protector and that faces the display and the side that is of the second edge protector and that faces the display. In other words, the two extension parts can be respectively pressed by the first edge protector and the second edge protector. The two extension parts are respectively connected to the two ends of the protection part, and the two extension parts are respectively pressed by the first edge protector and the second edge protector, that is, the two ends of the protection part can be further fastened. Therefore, a shape of the protection part can be further maintained, to avoid the problem that the two ends of the protection part tilt after the protection part is bent with the display for the plurality of times.

In some implementations, the extension part includes a contact surface. The contact surface faces the display, the contact surface is connected between the first surface of the extension part and the second surface of the extension part, and the contact surface is smoothly connected to the third surface of the protection part. In this implementation, the contact surface faces the display. In a process of bending the display, the contact surface of the extension part and the third surface of the protection part are in contact with the display. The contact surface of the extension part and the third surface of the protection part are smoothly connected. This can prevent the contact surface and the third surface from generating a protrusion due to a large angle change at a position at which the contact surface is connected to the third surface, to prevent the protrusion generated on the contact surface and the third surface from generating large pressure for the display, so as to ensure that the display is not damaged by pressure of the soft rubber part.

In some implementations, the extension part includes a fastening surface opposite to the contact surface. The protection part includes a fourth surface opposite to the third surface. The fastening surface is smoothly connected to the fourth surface. This avoids a significant step change or angle change at a position at which the fastening surface of the extension part is connected to the fourth surface of the protection part, ensures that the edge protection structure requires no high precision when being mounted on the rotating shaft assembly and can still ensure that an outer surface of the foldable display terminal still has good appearance effect, and avoids a problem that an appearance is asymmetric or mounting of the first edge protector or the second edge protector is affected, because the edge protection structure is mounted on the rotating shaft assembly with low precision, when the position at which the fastening surface of the extension part is connected to the fourth surface of the protection part has the significant step change or angle change.

In some implementations, the extension part and the soft rubber member are an integrated structure. In this way, the extension part and the soft rubber member are more closely combined, and it is ensured that the extension part and the soft rubber member are unlikely to be separated after being bent with the display for a plurality of times.

In some implementations, the rigid member and the second part of the connector are an integrated structure. In this way, the rigid member and the second part of the connector are more closely combined, and it is ensured that the rigid member and the second part of the connector are unlikely to be separated after being bent with the display for a plurality of times.

In some implementations, the rigid member is connected to the second part of the connector by using an adhesive, a screw, solder, or a fastener. In this way, a connection between the rigid member and the soft rubber member is simpler and costs are lower.

In some implementations, the first part and the protection part are an integrated structure. In this way, the protection part and the first part of the connector are more closely combined, and it is ensured that the protection part and the first part of the connector are unlikely to be separated after being bent with the display for a plurality of times. In addition, when the second part of the connector and the rigid member are also an integrated structure, that is, the rigid member, the soft rubber member, and the connector are an integrated structure, a connection between the rigid member and the soft rubber member is firmer, and a problem that the soft rubber member is separated from the rigid member after being bent for a plurality of times is avoided.

In some implementations, a rigid plate is embedded in the fastening part. Strength of the rigid plate is greater than the strength of the soft rubber part. The rigid plate is embedded in the fastening part. In this way, strength of the fastening part is enhanced, and when the foldable display terminal is bent, the fastening part is prevented from being deformed and stuck in the first body or the second body. This avoids a case that the fastening part is deformed and stuck in the first body or the second body to affect protection of the protection part for the edge of the bending region of the display.

In some implementations, the third surface of the protection part of the soft rubber member is a concave cambered surface. When the bending region of the display is bent, the protection part of the soft rubber member is bent from the third surface of the protection part to a direction away from the display. After the protection part is bent with the display for a plurality of times, the protection part is likely to generate plastic deformation. As a result, two ends of the protection part tilt in the direction away from the display. In this implementation, the third surface of the protection part is designed as the concave cambered surface, that is, the protection part is enabled to have initial deformation toward the display. This can partially neutralize deformation of the protection part in the direction away from the display after the protection part is bent for the plurality of times, and reduce a risk that the two ends of the protection part tilt after the protection part is bent for the plurality of times.

In some implementations, the protection part of the soft rubber member includes a fourth surface opposite to the third surface. A groove that is concavely disposed toward the fourth surface from the third surface is disposed on the protection part of the soft rubber member. By disposing the groove, it can be ensured that a shape of an outer surface of the protection part remains unchanged, to ensure that the foldable display terminal has good appearance effect and the protection part can be more likely to be deformed, so as to ensure that the protection part can be better bent and deformed with the display, and is unlikely to generate large acting force for the display to damage the display.

In some implementations, the soft rubber member is made of a soft rubber material, and the rigid member and the connector are both made of a metal material. The soft rubber material has features of being soft and elastically deformable. The soft rubber member is made of the soft rubber material, so that it can be ensured that the edge protection structure can protect the edge of the bending region of the display, and the edge protection structure can be prevented from affecting bending of the bending region of the display. The metal material has specific strength, to ensure that the rigid member can achieve good collision-resisting effect, so as to implement good protection for the display.

According to a third aspect, this application further provides another edge protection structure. The edge protection structure is configured to protect an edge of a bending region of a display. The edge protection structure includes a rigid member and two rotating shaft members. One end of each of the two rotating shaft members is rotatably connected to the rigid member. The rotating shaft member includes a connecting rod and a fastening part. One end of the connecting rod is rotatably connected to the rigid member, and the other end of the connecting rod is connected to the fastening part. The fastening part includes a first surface facing one side of the rigid member. A position-limiting protrusion is convexly disposed on the first surface, and the position-limiting protrusion is located at an end that is of the fastening part and that is away from the connecting rod. The rigid member is disposed on one side of the bending region. The rotating shaft member of the soft rubber member is configured to cover the edge of the bending region.

In this implementation of this application, the edge protection structure includes the rigid member and the rotating shaft member. When the edge protection structure in this application is applied to a foldable display terminal, the rigid member is disposed on the side of the bending region of the display, and the rotating shaft member covers the edge of the bending region. In this way, the edge of the bending region of the display can be wrapped by using the rigid member and the rotating shaft member of the edge protection structure, to prevent the edge of the bending region of the display from being exposed, and improve appearance effect of the foldable display terminal. In addition, when the foldable display terminal is collided, because the edge of the bending region of the display is wrapped by the edge protection structure, the edge protection structure can protect the display, to prevent an edge position of the bending region of the display from being damaged due to the collision.

In this implementation of this application, the rotating shaft member can be rotated relative to the rigid member. When the foldable display terminal is folded, the rotating shaft member can be correspondingly rotated relative to the rigid member, so that the edge protection structure can constantly protect the edge of the bending region of the display, and the edge protection structure can be prevented from affecting bending of the bending region of the display.

In some implementations, the connecting rod includes a first rod surface facing the rigid member. There is a gap between the first rod surface and the rigid member. In this way, it can be ensured that no friction is generated between the connecting rod and the rigid member when the rotating shaft member is rotated, to ensure smooth rotation of the rotating shaft member, and avoid damage caused by friction generated between the connecting rod and the rigid member.

In some implementations, the fastening part further includes a second surface opposite to the first surface. The second surface is located on a side that is of the first surface and that is away from the rigid member, and the second surface is in contact with and connected to the first rod surface of the connecting rod. In other words, the fastening part is located on a side that is of the connecting rod and that faces the rigid member. When the edge protection structure is mounted in the foldable display terminal, the connecting rod covers the edge of the bending region of the display. The fastening part is located on the side that is of the connecting rod and that faces the rigid member. Therefore, the fastening part can be always located between the display and a border, to ensure that the position-limiting protrusion located on the fastening part can be always located in a chute on the border, and can slide in the chute.

In some implementations, the first surface of the fastening part is coplanar with a surface that is of the rigid member and that is away from the rotating shaft member. This can ensure that distances between the border and positions of the fastening part and the rigid member are the same in a process of folding the foldable display terminal, can ensure that no friction is generated between the border and the fastening part or the rigid member in the process of folding the foldable display terminal, to ensure smooth folding of the foldable display terminal, and can minimize a gap between the fastening part, the rigid member, and the border.

In some implementations, the connecting rod further includes a second rod surface opposite to the first rod surface and a third rod surface connected between the first rod surface and the second rod surface. The third rod surface is a plane. When the edge protection structure is mounted in the foldable display terminal, the third rod surface is in contact with the display of the foldable display terminal. Because the third rod surface that is in contact with the display is a plane, a distance between the display and the third rod surface can be reduced. This avoids a case that a position of the third rod surface protruding against the display to damage the display, thereby ensuring quality of the display.

In some implementations, the rigid member includes a connecting end and a fastening end connected to the connecting end. The connecting rod is connected to the connecting end of the rigid member. The fastening part includes a first end and a second end that are disposed opposite to each other. The first end of the fastening part is connected to the connecting rod. The position-limiting protrusion is disposed at the second end of the fastening part. The second end is closer to a reference plane than the first end. The reference plane is located on a side that is of the fastening end and that is away from the connecting end. This can ensure that the fastening part is always located between the display and the border in the process of folding the foldable display terminal, to ensure that the position-limiting protrusion located on the fastening part can be always located in the chute on the border, and can slide in the chute.

In some implementations, the connecting end includes a first surface and a second surface that are disposed opposite to each other. The fastening end includes a third surface and a fourth surface that are disposed opposite to each other. The third surface and the first surface face a same side, and the second surface and the fourth surface face a same side. The first surface and the third surface are non-coplanarly disposed, and the first surface and the third surface are connected by using a fifth surface. When the fastening end of the rigid member is inserted into a slot of a stationary shaft of the foldable display terminal, so that the edge protection structure is mounted in the foldable display terminal, the fifth surface of the rigid member can be in contact with a surface of the stationary shaft. This ensures that the fastening end of the rigid member can be more stable when being inserted into the stationary shaft, thereby ensuring stable mounting of the edge protection structure in the foldable display terminal.

In some implementations, a width of the fastening end is less than a width of the connecting end. A width direction of the fastening end and a width direction of the connecting end are the same, and are both perpendicular to a direction from the first surface to the second surface. When the fastening end of the rigid member is inserted into a slot of a stationary shaft of the foldable display terminal, so that the edge protection structure is mounted in the foldable display terminal, a part that is of the connecting end and that exceeds the fastening end in the width direction abuts against a surface of the stationary shaft. This can further ensure that the fastening end of the rigid member can be more stable when being inserted into the slot of the stationary shaft, and is unlikely to shake to fall off.

In some implementations, an end surface of the end that is of the connecting rod and that is connected to the rigid member is a circular-arc surface. Engagement teeth are disposed on the end surface, and engagement teeth on end surfaces of two connecting rods are engaged with each other. When one rotating shaft member is rotated, because the engagement teeth on the end surfaces of the two connecting rods are engaged with each other, the other rotating shaft member of the edge protection structure can be rotated synchronously, to achieve better rotation experience.

In some implementations, the rigid member and the rotating shaft member are both metal members. In other words, the edge protection structure has high strength. This can achieve good anti-collision effect, and achieve better protection effect for the edge of the bending region of the display.

According to a fourth aspect, this application further provides another foldable display terminal. The foldable display terminal includes a screen support assembly, a display, and two edge protection structures according to any implementation of the second aspect. The display is stacked on the screen support assembly. The screen support assembly includes a first body, a second body, and a stationary shaft. The stationary shaft is located between the first body and the second body. The display includes a first fastening region, a second fastening region, and a bending region. The bending region is located between the first fastening region and the second fastening region. The first fastening region is opposite to the first body and is fastened to the first body. The second fastening region is opposite to the second body and is fastened to the second body. The bending region is opposite to the stationary shaft.

The rigid members of the two edge protection structures are respectively fastened to two ends of the stationary shaft, and the rigid members of the two edge protection structures are respectively located on two opposite sides of the bending region of the display. The connecting rod of the edge protection structure is located on a side that is of the display and that is away from the stationary shaft, and covers an edge of the bending region of the display. The first body and the second body each include a border. The border is disposed around an edge of the display, and chute is disposed on the border. The position-limiting protrusion on the fastening part of the edge protection structure slides in the chute.

The edge protection structure is fastened to a rotating shaft assembly, the rigid member of the edge protection assembly is located on one side of the bending region of the display, and the connecting rod covers the edge of the bending region of the display. In other words, the edge of the bending region of the display is wrapped by using the rigid member and the connecting rod. In this way, the edge of the bending region of the display is prevented from being exposed, appearance effect of the foldable display terminal is improved, and the edge of the bending region of the display is prevented from being damaged due to a collision. In addition, the rotating shaft member can be rotated relative to the rigid member. When the foldable display terminal is folded, the rotating shaft member can be correspondingly rotated relative to the rigid member, so that the edge protection structure can constantly protect the edge of the bending region of the display, and the edge protection structure can be prevented from affecting bending of the bending region of the display.

In some implementations of this application, a track of the chute is correspondingly designed based on a movement track of the position-limiting protrusion of the edge protection structure when the foldable display terminal is bent. In this way, when the foldable display terminal is bent, the bending region of the display is bent, and when being folded by using the rotating shaft assembly as an axis, the first body and the second body can drive the position-limiting protrusion of the rotating shaft member to correspondingly slide in the chute, and drive the rotating shaft member to correspondingly rotate. As a result, it is ensured that rotation of the rotating shaft member and folding of the display are always synchronous in a process of folding the foldable display terminal. The rotating shaft member does not need to be pushed by the display to rotate, that is, there is no acting force between the display and the rotating shaft member. This avoids a case that acting force is generated between the display and the rotating shaft member to possibly cause damage to the display.

According to a fifth aspect, this application provides another edge protection structure. The edge protection structure is configured to protect an edge of a bending region of a display. The edge protection structure includes an elastic sheet and a flexible member. The elastic sheet includes a protection section and two fastening sections. The two fastening sections are respectively connected to two sides of the protection section. The flexible member is stacked on the elastic sheet and covers the protection section of the elastic sheet. Elasticity of the elastic sheet is greater than elasticity of the flexible member. The flexible member and the protection section of the spring sheet are configured to cover the edge of the bending region.

When the edge protection structure in this application is mounted in a foldable display terminal, the protection section of the elastic sheet and the flexible member of the edge protection structure are opposite to the bending region of the display, and cover the edge of the bending region of the display. In this way, the edge of the bending region of the display is covered with the edge protection structure, to prevent the edge of the bending region from being exposed, and improve appearance effect of the foldable display terminal. In addition, the bending region of the display is covered with the flexible member and the protection section of the edge protection structure. Therefore, when the bending region of the display is collided, the flexible member and the protection section of the edge protection structure can protect the bending region of the display, to prevent the edge of the bending region of the display from being damaged due to the collision. In addition, in this implementation of this application, the elasticity of the elastic sheet is greater than the elasticity of the flexible member. This ensures that the edge protection structure still does not generate large deformation after being bent for a plurality of times, to ensure a bending life of the edge protection structure.

In some implementations, flexibility of the elastic sheet is less than flexibility of the flexible member. The flexibility of the elastic sheet is less than the flexibility of the flexible member, to provide good support effect for the flexible member. In addition, the flexible member has good flexibility, to reduce impact of the flexible member on bending performance of the edge protection structure. In addition, the flexible member can achieve good buffer effect, to prevent acting force generated by a collision from being transferred to the display through the elastic sheet, so as to implement a good protection function for the display.

In some implementations, a surface smoothness degree of the elastic sheet is greater than a surface smoothness degree of the flexible member. In this implementation of this application, when the edge protection structure is mounted in the foldable display terminal, a surface of the elastic sheet is in contact with the display. In this implementation of this application, the surface smoothness degree of the elastic sheet is higher, to reduce friction force between the elastic sheet and the display, and avoid pulling between the elastic sheet and the display due to the friction force in a process of bending the foldable display terminal. This ensures smooth bending of the foldable display terminal, and avoids damage to the display due to pulling between the elastic sheet and the display, thereby improve reliability of the foldable display terminal.

In some implementations, a width of the middle position of the protection section is less than widths of two sides of the protection section that are close to the fastening sections.

In this way, bending performance of the middle position of the protection section can be better than bending performance of the two ends of the protection section that are close to the fastening sections, and when the foldable display terminal is folded, a bending position of the edge protection structure is at the middle position of the protection section. This reduces bending of the two ends of the protection section that are connected to the fastening sections, to reduce pulling for the fastening sections. In addition, when the foldable display terminal is bent, a bending degree of the middle position of the bending region of the display is greatest. In this implementation of this application, the bending performance of the middle position of the protection section is better than the bending performance of the two ends of the protection section that are close to the fastening sections, and the middle position of the protection section is opposite to the middle position of the bending region. This ensures that the edge protection structure can be bent and deformed synchronously with the display, without generating acting force for the display to damage the display.

In some implementations, a width of the middle position of the flexible member is less than widths of two ends of the flexible member that are close to the fastening sections. In this way, bending performance of the middle position of the flexible member is better than bending performance of the two sides of the flexible member that are close to the fastening sections, and bending of the flexible member occurs at the middle position of the flexible member as much as possible. This can avoid separation between the two ends of the flexible member and the elastic sheet, and avoid a problem that the two ends of the flexible member tilt, to ensure the appearance effect of the foldable display terminal. In addition, when the foldable display terminal is bent, the bending degree of the middle position of the bending region of the display is greatest. In this implementation of this application, the bending performance of the middle position of the flexible member is better than the bending performance of the two ends of the flexible member that are close to the fastening sections, and the middle position of the flexible member is opposite to the middle position of the bending region. This ensures that the edge protection structure can be bent and deformed synchronously with the display, without generating large acting force for the display to damage the display.

In some implementations, the protection section includes a first surface and a second surface that are disposed opposite to each other in a width direction. The middle position of the first surface is concavely disposed toward the second surface to form a notch. In this way, the width of the middle position of the protection section is less than the widths of the two sides of the protection section that are close to the fastening sections, so that the bending performance of the middle position of the protection section is better than the bending performance of the two ends of the protection section that are close to the fastening sections.

In some implementations, a thickness of the middle position of the flexible member is less than thicknesses of the two ends of the flexible member that are close to the fastening sections. In this way, the bending performance of the middle position of the flexible member can be further improved.

In some implementations, the flexible member includes a third surface and a fourth surface that are disposed opposite to each other in a thickness direction. The third surface is far away from the elastic sheet relative to the fourth surface, and the third surface is a cambered surface that is concavely disposed toward the fourth surface. In this way, the thickness of the middle position of the flexible member is less than the thicknesses of the two ends of the flexible member that are close to the fastening sections.

In some implementations, a width of the fastening section is the same as a width of the protection section. Width directions of the fastening section and the protection sections are perpendicular to an arrangement direction of the fastening section and the protection section. Because the fastening sections are connected to the two sides of the protection section, in this application, the protection section can be tightened through fastening by the fastening sections. The width of the fastening section is basically the same as the width of the protection section. Therefore, each position of the protection section in the width direction can be tightened through fastening by the fastening sections, to avoid a problem that each position tilts after being bent for a plurality of times.

In some implementations, the width of the protection section is less than a width of the protector. In other words, when the protector covers the protection section of the elastic sheet, an edge of the protector in a width direction extends out of an edge of the protection section. When the edge protection structure is collided, collision force acts on the protector. Because the protector is a flexible structure that is more flexible than the elastic sheet, the protector can generate a better buffer function for the collision force, to prevent the collision force from acting on the elastic sheet, so as to avoid a case that the collision force is transferred to the display through the elastic sheet to damage the display.

In some implementations, a bonding layer is stacked on the fastening section, the bonding layer and the flexible member are located on a same side of the elastic sheet, and the bonding layer includes an adhesive layer and a release film layer. The release film layer is located on a side that is of the adhesive layer and that is away from the fastening section. By stacking the bonding layer on the fastening section, the fastening section can be conveniently fastened to the foldable display terminal. In some implementations, the elastic sheet and the flexible member are an integrated structure. Specifically, the elastic sheet and the flexible member may be formed into the integrated structure in an integrated molding manner, for example, injection molding, to ensure stability of a connection between the elastic sheet and the flexible member.

In some implementations, the elastic sheet is a PET sheet, a PI sheet, or a metal sheet, and the flexible member is a rubber member or a silica gel member.

According to a sixth aspect, this application provides another foldable display terminal. The foldable display terminal includes a display, a first edge protector, a second edge protector, and two edge protection structures according to any implementation of the fifth aspect. The display includes a first fastening region, a second fastening region, and a bending region. The bending region is located between the first fastening region and the second fastening region. The first edge protector covers an edge of the first fastening region of the display. The second edge protector covers an edge of the second fastening region of the display. The two edge protection structures are respectively located on two opposite sides of the bending region of the display. The protection section of the elastic sheet and the flexible member cover an edge of the bending region of the display. One fastening section of the elastic sheet of the edge protection structure is located on a side that is of the first edge protector and that faces the display, and is fastened to the first edge protector. The other fastening section is located on a side that is of the second edge protector and that faces the display, and is fastened to the second edge protector.

In this implementation of this application, the protection section of the elastic sheet and the flexible member of the edge protection structure are opposite to the bending region of the display, and cover the edge of the bending region of the display. In this way, the edge of the bending region of the display is covered with the edge protection structure, to prevent the edge of the bending region from being exposed, and improve appearance effect of the foldable display terminal. In addition, the bending region of the display is covered with the flexible member and the protection section of the edge protection structure. Therefore, when the bending region of the display is collided, the flexible member and the protection section of the edge protection structure can protect the bending region of the display, to prevent the edge of the bending region of the display from being damaged due to the collision. In addition, in this implementation of this application, the elasticity of the elastic sheet is greater than the elasticity of the flexible member. This ensures that the edge protection structure still does not generate large deformation after being bent for a plurality of times, to ensure a bending life of the edge protection structure.

According to a seventh aspect, this application provides another edge protection structure. The edge protection structure is configured to protect an edge of a bending region of a display. The edge protection structure includes a rigid member and an elastic sheet. Elasticity of the elastic sheet is greater than elasticity of the rigid member. The rigid member includes a rigid plate and a bump. The rigid plate includes a connection surface. The bump is fastened to the connection surface and protrudes in a direction away from the connection surface. The bump includes a fastening surface. The display includes a display surface and a side surface intersecting with the display surface. The rigid plate is disposed on one side of the side surface of the display, and the rigid plate is located in a length extension direction of the bending region. The connection surface faces the side surface, and the fastening surface faces the display surface. The elastic sheet is fixedly connected to the fastening surface, and the elastic sheet may be bent by using the bump as an axis. The elastic sheet includes a first section, a second section, and a third section. The second section and the third section are respectively located on two sides of the first section. The bump is fastened to the first section. The display is located on a side that is of the elastic sheet and that is away from the bump. The first section of the elastic sheet is configured to cover the edge of the bending region.

In this application, the rigid plate is disposed on the side of the side surface of the display, and the rigid plate is located in the length extension direction of the bending region. In addition, the elastic sheet is fixedly connected to the fastening surface, and the first section of the elastic sheet covers the edge of the bending region. In this way, the edge of the bending region of the display can be wrapped by using the rigid plate and the elastic sheet of the edge protection structure. As a result, the edge of the bending region of the display is prevented from being exposed. This can improve appearance effect of a foldable display terminal, and prevent the edge of the bending region of the display from being damaged due to a collision.

In some implementations of this application, the edge protection structure further includes a smooth layer. The elastic sheet includes a first surface and a second surface that are disposed opposite to each other. The fastening surface is in contact with the first surface. The second surface is away from the bump relative to the first surface. The smooth layer covers the second surface. A smoothness degree of a surface that is of the smooth layer and that is away from the elastic sheet is greater than a smoothness degree of a surface of the elastic sheet.

When the edge protection structure is mounted in the foldable display terminal, the second surface of the elastic sheet faces the display. In this implementation of this application, the second surface of the elastic sheet is covered with the smooth layer with higher smoothness degree, so that the smooth layer is in contact with the display when the edge protection structure is mounted in the foldable display terminal. Because the smooth layer has a smooth surface, frictional acting force between the edge protection structure and the display can be reduced. This ensures that a process of bending or unfolding the foldable display terminal is smoother, and prevents the display from being damaged due to frictional acting force between the elastic sheet and the display.

In some implementations of this application, the edge protection structure further includes a stiffener. The stiffener includes a first part, a second part, and a third part connected between the first part and the second part. The first part is fastened to the rigid plate. A through hole is disposed on the elastic sheet. The second part passes through the through hole on the elastic sheet and is in contact with the bump. The third part is located on the side that is of the elastic sheet and that is away from the bump.

In this implementation of this application, the elastic sheet can be limited between the third part and the bump, to avoid separation between the elastic sheet and the rigid member when fastening between the elastic sheet and the bump fails. In addition, the through hole is disposed on the elastic sheet. An end that is of the second part and that is away from the third part passes through the through hole to one side of the first surface of the elastic sheet from the second surface of the elastic sheet, and is in contact with the bump. This further strengthens a connection between the elastic sheet and the rigid member, and avoids separation between the elastic sheet and the rigid member.

In some implementations of this application, a groove concavely disposed in a direction away from the elastic sheet is disposed on the fastening surface of the bump. The end that is of the second part and that is away from the third part is inserted into the groove. This can further avoid separation between the elastic sheet and the bump.

In some implementations of this application, the edge protection structure further includes a smooth layer. The elastic sheet includes a first surface and a second surface that are disposed opposite to each other. The fastening surface is in contact with the first surface. The second surface is away from the bump relative to the first surface. The smooth layer covers another region of the second surface other than a position opposite to the bump. A smoothness degree of a surface that is of the smooth layer and that is away from the elastic sheet is greater than a smoothness degree of a surface of the elastic sheet. In this implementation, when the edge protection structure is mounted in the foldable display terminal, the second surface of the elastic sheet faces the display. In this implementation of this application, the another region of the second surface of the elastic sheet other than the position opposite to the bump is covered with the smooth layer with higher smoothness degree. In this way, when the edge protection structure is mounted in the foldable display terminal and the smooth layer is in contact with the display, because the smooth layer has a smooth surface, frictional acting force between the edge protection structure and the display can be reduced. This ensures that a process of bending or unfolding the foldable display terminal is smoother, and prevents the display from being damaged due to frictional acting force between the elastic sheet and the display.

In an implementation of this application, the edge protection structure further includes a flexible member. The flexible member is disposed at the position that is of the second surface of the elastic sheet and that is opposite to the bump. A hollow region is disposed on the flexible member. The third part is located in the hollow region. A thickness of the smooth layer and a thickness of the flexible member are both greater than or equal to a thickness of the third part. When the edge protection structure is mounted in the foldable display terminal, the flexible member is in contact with the display. Because the thickness of the flexible member is greater than or equal to the thickness of the third part, the third part is not in direct contact with the display. This avoids a case that the third part is in direct contact with the display to damage the display.

In some implementations of this application, a mounting groove is concavely disposed on the connection surface of the rigid plate. The first part of the stiffener is embedded in the mounting groove. In this way, a connection between the rigid plate and the stiffener can be firmer.

In some implementations of this application, an adhesive layer is disposed between the elastic sheet and the bump. The elastic sheet and the bump are fastened by using the adhesive layer. In this way, a connection manner between the elastic sheet and the bump is simple.

In some implementations of this application, the elastic sheet is made of a hyperelastic shape memory alloy or a high-modulus plastic material.

In some implementations of this application, the rigid plate includes a connecting end and a fastening end connected to the connecting end. The bump is located on a side that is of the connecting end and that is away from the fastening end.

In some implementations of this application, the connecting end includes a first surface and a second surface that are disposed opposite to each other. The fastening end includes a third surface and a fourth surface that are disposed opposite to each other. The third surface and the first surface face a same side, and the second surface and the fourth surface face a same side. The first surface and the third surface are non-coplanarly disposed, and the first surface and the third surface are connected by using a fifth surface. When the edge protection structure is mounted in the foldable display terminal, the fastening end of the rigid plate is inserted into and fastened to a slot of a stationary shaft, and the fifth surface of the rigid member can be in contact with a surface of the stationary shaft. This ensures that the fastening end of the rigid member can be more stable when being inserted into the stationary shaft, and is unlikely to shake to fall off.

In some implementations of this application, a width of the fastening end is less than a width of the connecting end. A width direction of the fastening end and a width direction of the connecting end are the same, and are both perpendicular to a direction from the first surface to the second surface. When the fastening end of the rigid plate is inserted into the slot of the stationary shaft, a part that is of the connecting end and that exceeds the fastening end in the width direction abuts against the surface of the stationary shaft. This can further ensure that the fastening end of the rigid member can be more stable when being inserted into the slot of the stationary shaft, and is unlikely to shake to fall off.

According to an eighth aspect, this application provides another foldable display terminal. The foldable display terminal includes a display, a first edge protector, a second edge protector, and an edge protection structure. The display includes a first fastening region, a bending region, and a second fastening region. The bending region is located between the first fastening region and the second fastening region. The first edge protector covers an edge of the first fastening region of the display. The second edge protector covers an edge of the second fastening region of the display. The edge protection structure includes a rigid member and an elastic sheet. Elasticity of the elastic sheet is greater than elasticity of the rigid member. The rigid member includes a rigid plate and a bump. The rigid plate includes a connection surface. The bump is fastened to the connection surface and protrudes in a direction away from the connection surface, and the bump includes a fastening surface. The display includes a display surface and a side surface intersecting with the display surface. The rigid plate is disposed on one side of the side surface of the display. The rigid plate is located in a length extension direction of the bending region. The connection surface faces the side surface, and the fastening surface faces the display surface. The elastic sheet is fixedly connected to the fastening surface, and the elastic sheet may be bent by using the bump as an axis. The elastic sheet includes a first section, a second section, and a third section. The second section and the third section are respectively located on two sides of the first section. The bump is fastened to the first section. The display is located on a side that is of the elastic sheet and that is away from the bump. The first section covers an edge of the bending region. The second section is located between the first edge protector and the display. The third section is located between the second edge protector and the display.

In this application, the first edge protector covers the edge of the first fastening region of the display, to prevent, by using the first edge protector, the edge of the first fastening region of the display from being exposed. This can prevent the edge of the first fastening region of the display from being damaged due to a collision or a hit. The second edge protector covers the edge of the second fastening region of the display, to prevent, by using the second edge protector, the edge of the second fastening region of the display from being exposed. This can prevent the edge of the second fastening region of the display from being damaged due to a collision or a hit. In addition, the rigid plate of the edge protection structure is disposed on the side of the side surface of the display, and the rigid plate is located in the length extension direction of the bending region. In addition, the elastic sheet is fixedly connected to the fastening surface, and the first section of the elastic sheet covers the edge of the bending region. In this way, the edge of the bending region of the display can be wrapped by using the rigid plate and the elastic sheet of the edge protection structure. As a result, the edge of the bending region of the display is prevented from being exposed. This can improve appearance effect of the foldable display terminal, and prevent the edge of the bending region of the display from being damaged due to a collision.

In addition, the second section of the elastic sheet is located between the first edge protector and the display, and the third section of the elastic sheet is located between the second edge protector and the display. In other words, two ends of the elastic sheet can be pressed by using the first edge protector and the second edge protector. This prevents the two ends of the elastic sheet from tilting.

In some implementations of this application, the foldable display terminal further includes a first body, a second body, and a rotating shaft. The rotating shaft is located between the first body and the second body. The first fastening region of the display is opposite to the first body and is fastened to the first body. The second fastening region of the display is opposite to the second body and is fastened to the second body. The bending region of the display corresponds to the rotating shaft. Two ends of the rotating shaft each are provided with a slot. The rigid plate of the edge protection structure is partially inserted into and fastened to the slot. In this way, fastening of the foldable display terminal and the rotating shaft is implemented.

In some implementations of this application, the edge protection structure further includes a smooth layer. The elastic sheet includes a first surface and a second surface that are disposed opposite to each other. The fastening surface is in contact with the first surface. The second surface is away from the bump relative to the first surface. The smooth layer covers the second surface. A smoothness degree of a surface that is of the smooth layer and that is away from the elastic sheet is greater than a smoothness degree of a surface of the elastic sheet. The surface that is of the smooth layer and that is away from the elastic sheet is in contact with the display. In this implementation of this application, the second surface of the elastic sheet is covered with the smooth layer with higher smoothness degree. In this way, when the edge protection structure is mounted in the foldable display terminal and the smooth layer is in contact with the display, because the smooth layer has a smooth surface, frictional acting force between the edge protection structure and the display can be reduced. This ensures that a process of bending or unfolding the foldable display terminal is smoother, and prevents the display from being damaged due to frictional acting force between the elastic sheet and the display.

In some implementations of this application, the edge protection structure further includes a stiffener. The stiffener includes a first part, a second part, and a third part connected between the first part and the second part. The first part is fastened to the rigid plate. A through hole is disposed on the elastic member. The second part passes through the through hole on the elastic sheet and is in contact with the bump. The third part is located on the side that is of the elastic sheet and that is away from the bump. In this implementation of this application, the elastic sheet can be limited between the third part and the bump, to avoid separation between the elastic sheet and the rigid member when fastening between the elastic sheet and the bump fails. In addition, the through hole is disposed on the elastic sheet. An end that is of the second part and that is away from the third part passes through the through hole to one side of the first surface of the elastic sheet from the second surface of the elastic sheet, and is in contact with the bump. This further strengthens a connection between the elastic sheet and the rigid member, and avoids separation between the elastic sheet and the rigid member.

In some implementations of this application, a groove concavely disposed in a direction away from the elastic sheet is disposed on the fastening surface of the bump. The end that is of the second part and that is away from the third part is inserted into the groove. This can further avoid separation between the elastic sheet and the bump.

In some implementations of this application, the edge protection structure further includes a smooth layer. The elastic sheet includes a first surface and a second surface that are disposed opposite to each other. The fastening surface is in contact with the first surface. The second surface is away from the bump relative to the first surface. The smooth layer covers another region of the second surface other than a position opposite to the bump. A smoothness degree of a surface that is of the smooth layer and that is away from the elastic sheet is greater than a smoothness degree of a surface of the elastic sheet. The surface that is of the smooth layer and that is away from the elastic sheet is in contact with the display. In this implementation, when the edge protection structure is mounted in the foldable display terminal, the second surface of the elastic sheet faces the display. In this implementation of this application, the another region of the second surface of the elastic sheet other than the position opposite to the bump is covered with the smooth layer with higher smoothness degree. In this way, when the edge protection structure is mounted in the foldable display terminal and the smooth layer is in contact with the display, because the smooth layer has a smooth surface, frictional acting force between the edge protection structure and the display can be reduced. This ensures that a process of bending or unfolding the foldable display terminal is smoother, and prevents the display from being damaged due to frictional acting force between the elastic sheet and the display.

In some implementations of this application, the edge protection structure further includes a flexible member. The flexible member is disposed at the position that is of the second surface of the elastic sheet and that is opposite to the bump. A hollow region is disposed on the flexible member. The third part is located in the hollow region. A thickness of the smooth layer and a thickness of the flexible member are both greater than or equal to a thickness of the third part. When the edge protection structure is mounted in the foldable display terminal, the flexible member is in contact with the display. Because the thickness of the flexible member is greater than or equal to the thickness of the third part, the third part is not in direct contact with the display. This avoids a case that the third part is in direct contact with the display to damage the display.

In some implementations of this application, a mounting groove is concavely disposed on the connection surface of the rigid plate. The first part of the stiffener is embedded in the mounting groove. In this way, a connection between the rigid plate and the stiffener can be firmer.

In some implementations of this application, an adhesive layer is disposed between the elastic sheet and the bump. The elastic sheet and the bump are fastened by using the adhesive layer. In this way, a connection manner between the elastic sheet and the bump is simple.

In some implementations of this application, the elastic sheet is made of a hyperelastic shape memory alloy or a high-modulus plastic material.

In some implementations of this application, the rigid plate includes a connecting end and a fastening end connected to the connecting end. The bump is located on a side that is of the connecting end and that is away from the fastening end. The fastening end is inserted into and fastened to the slot.

In some implementations of this application, the connecting end includes a first surface and a second surface that are disposed opposite to each other. The fastening end includes a third surface and a fourth surface that are disposed opposite to each other. The third surface and the first surface face a same side, and the second surface and the fourth surface face a same side. The first surface and the third surface are non-coplanarly disposed, and the first surface and the third surface are connected by using a fifth surface. The fifth surface is in contact with a surface of a stationary shaft. This ensures that the fastening end of the rigid member can be more stable when being inserted into the stationary shaft, and is unlikely to shake to fall off.

In some implementations of this application, a width of the fastening end is less than a width of the connecting end. A width direction of the fastening end and a width direction of the connecting end are the same, and are both perpendicular to a direction from the first surface to the second surface. A part that is of the connecting end and that exceeds the fastening end in the width direction abuts against a surface of a stationary shaft. This can further ensure that the fastening end of the rigid member can be more stable when being inserted into a slot of the stationary shaft, and is unlikely to shake to fall off.

According to a ninth aspect, this application provides another edge protection structure. The edge protection structure includes a flexible member and two fastening members. The flexible member is connected between the two fastening members. Flexibility of the flexible member is greater than flexibility of the fastening member. The fastening member includes a fastening plate and a fastening block fixedly connected to the fastening plate. Two ends of the flexible member are respectively connected to the fastening plates of the two fastening members. The fastening plate and the fastening block are located on one side of a light output surface of a display. The flexible member covers a bending region of the display. The fastening blocks of the two fastening members are fixedly connected to two rotating shafts of a rotating shaft assembly respectively.

In this application, the flexible member of the edge protection structure can cover an edge position of the bending region of the display, to avoid an edge of the bending region from being exposed, so as to improve appearance effect of a display terminal. In addition, the bending region of the display is covered with the flexible member of the edge protection structure. Therefore, when the bending region of the display is collided, the flexible member of the edge protection structure can protect the bending region of the display, to prevent the edge of the bending region of the display from being damaged due to the collision.

In some implementations, the flexible member includes a first surface and a second surface that are disposed opposite to each other. The first surface faces the display, and the first surface includes two first regions that are disposed at an interval and a second region located between the two first regions. The fastening plate is fixedly connected to the first region. The two fastening members are disposed at an interval.

In this application, the fastening plate is fixedly connected to the first region. The two fastening members are disposed at the interval. In other words, an interval region between the two fastening plates is opposite to the second region of the flexible member. Therefore, when the edge protection structure is folded with the foldable display terminal, the second region of the flexible member is not affected by the fastening plate. This ensures that the flexible member can have good folding effect.

In some implementations, the second region of the first surface is concave toward the second surface. In this way, a thickness of a part that is of the flexible member and that corresponds to the first region can be reduced. As a result, the flexible member can have better bending effect, to prevent the edge protection structure from affecting folding effect of the foldable display terminal.

In some implementations, the fastening plate is an elastic member. Elasticity of the fastening plate is greater than that of the fastening block and that of the flexible member. In this way, when the fastening plate is fixedly connected to the flexible member, the fastening plate can provide specific support for the flexible member. In addition, the fastening plate is also a structure having good elasticity. Therefore, the fastening plate also has good bending performance, that is, the first region that is of the flexible member and that is fixedly connected to the fastening plate can also be bent. As a result, the edge protection structure can have better bending performance, and the edge protection structure is prevented from affecting folding effect of the foldable display terminal. In addition, the fastening plate has good elasticity. Therefore, it can be ensured that the edge protection structure still does not generate large deformation after being bent for a plurality of times, to ensure a bending life of the edge protection structure.

In some implementations, the fastening plate includes a first section and a second section connected to the first section. The first section is connected to the flexible member, and the second section is connected to the fastening block. In other words, in this implementation, the fastening block and the flexible member are fastened to different sections of the fastening plate. This avoids that strength of the fastening block affects bending performance of a part that is of the fastening plate and that is connected to the flexible member, thereby ensuring that each position of the flexible member can have good bending performance.

In some implementations, the fastening block includes a first plate and a second plate. The first plate is opposite to the fastening block, and the second plate connects the first plate to the fastening plate. An edge of a support plate of the rotating shaft is inserted between the first plate and the fastening block, and the support plate is fastened to the first plate.

In this application, the fastening block is fixedly connected to the support plate of the rotating shaft. This can achieve better fixed connection effect, and further avoid impact of a fixed connection between the fastening block and the rotating shaft on effect of rotation of the rotating shaft relative to the stationary shaft.

In some implementations, the edge protection structure further includes a smooth layer. Surface smoothness of the smooth layer is higher than surface smoothness of the fastening block. The smooth layer covers a surface that is of the fastening block and that is away from the flexible member. When the edge protection structure is mounted in the foldable display terminal, the smooth layer is in contact with the display. Because the smooth layer has a smooth surface, frictional acting force between the edge protection structure and the display can be reduced. This ensures that a process of bending or unfolding the foldable display terminal is smoother, and prevents the display from being damaged due to frictional acting force between the fastening block and the display.

According to a tenth aspect, this application further provides a foldable display terminal. The foldable display terminal includes a display, a rotating shaft assembly, and the edge protection structure according to any implementation of the ninth aspect. The rotating shaft assembly includes a stationary shaft and two rotating shafts. The two rotating shafts are rotatably connected to two sides of the stationary shaft respectively. The display includes a bending region. The bending region is disposed opposite to the stationary shaft. The flexible member and the fastening plate of the edge protection structure are located on a side that is of the bending region of the display and that is away from the stationary shaft. The flexible member and the fastening plate cover an edge of the bending region. The fastening block of the fastening member is fixedly connected to the rotating shaft.

In this application, the flexible member and the fastening plate of the edge protection structure are located on the side that is of the bending region of the display and that is away from the stationary shaft, and the flexible member and the fastening plate cover the edge of the bending region. In this way, the edge of the bending region of the display can be wrapped by using the flexible member and the fastening plate of the edge protection structure. As a result, the edge of the bending region of the display is prevented from being exposed. This can improve appearance effect of the foldable display terminal, and prevent the edge of the bending region of the display from being damaged due to a collision.

In addition, the fastening block of the fastening member is fixedly connected to the rotating shaft. In this way, the edge protection structure can be fastened to the foldable display terminal, and the two ends of the flexible member that are connected to the fastening blocks can be fastened. This can prevent the two ends of the flexible member from tilting after the flexible member is bent for a plurality of times.

BRIEF DESCRIPTION OF DRAWINGS

To describe the structural features and functions of the present invention more clearly, the following describes the present invention in detail with reference to the accompanying drawings and specific embodiments.

DESCRIPTION OF EMBODIMENTS

To make the objectives, technical solutions, and advantages of this application clearer, the following further describes this application in detail with reference to the accompanying drawings.

It should be noted that the terms "first", "second", and the like in this application are merely intended for a purpose of description, and shall not be understood as an indication or implication of relative importance or implicit indication of a quantity of indicated technical features. Therefore, a feature limited by "first", "second", or the like may explicitly or implicitly include one or more features. In the descriptions of this application, unless otherwise specified, "a plurality of" means two or more than two.

This application provides a foldable display terminal. The foldable display terminal may display an image, and can also be folded, to change a size of an area of the foldable display terminal. In this application, the foldable display terminal may be a product having a display interface, for example, a mobile phone, a display, a tablet computer, or a vehicle-mounted computer. A specific form of the foldable display terminal is not specially limited in this embodiment of this application. For ease of understanding the foldable display terminal provided in this application, the following specifically describes the foldable display terminal in this application with reference to the accompanying drawings.

Figure 1:
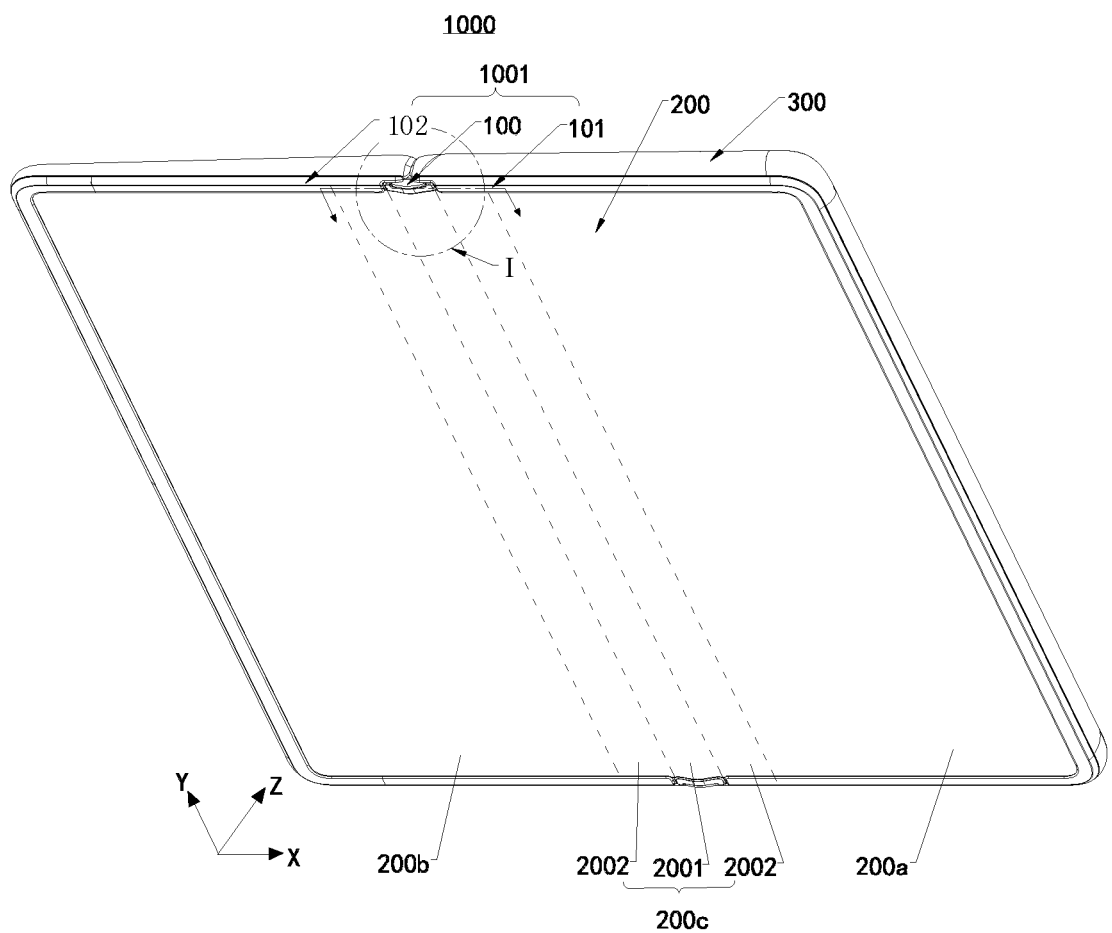
FIG. 1 is a schematic diagram of a structure of a foldable display terminal according to an implementation of this application in an unfolded state.
Figure 2:
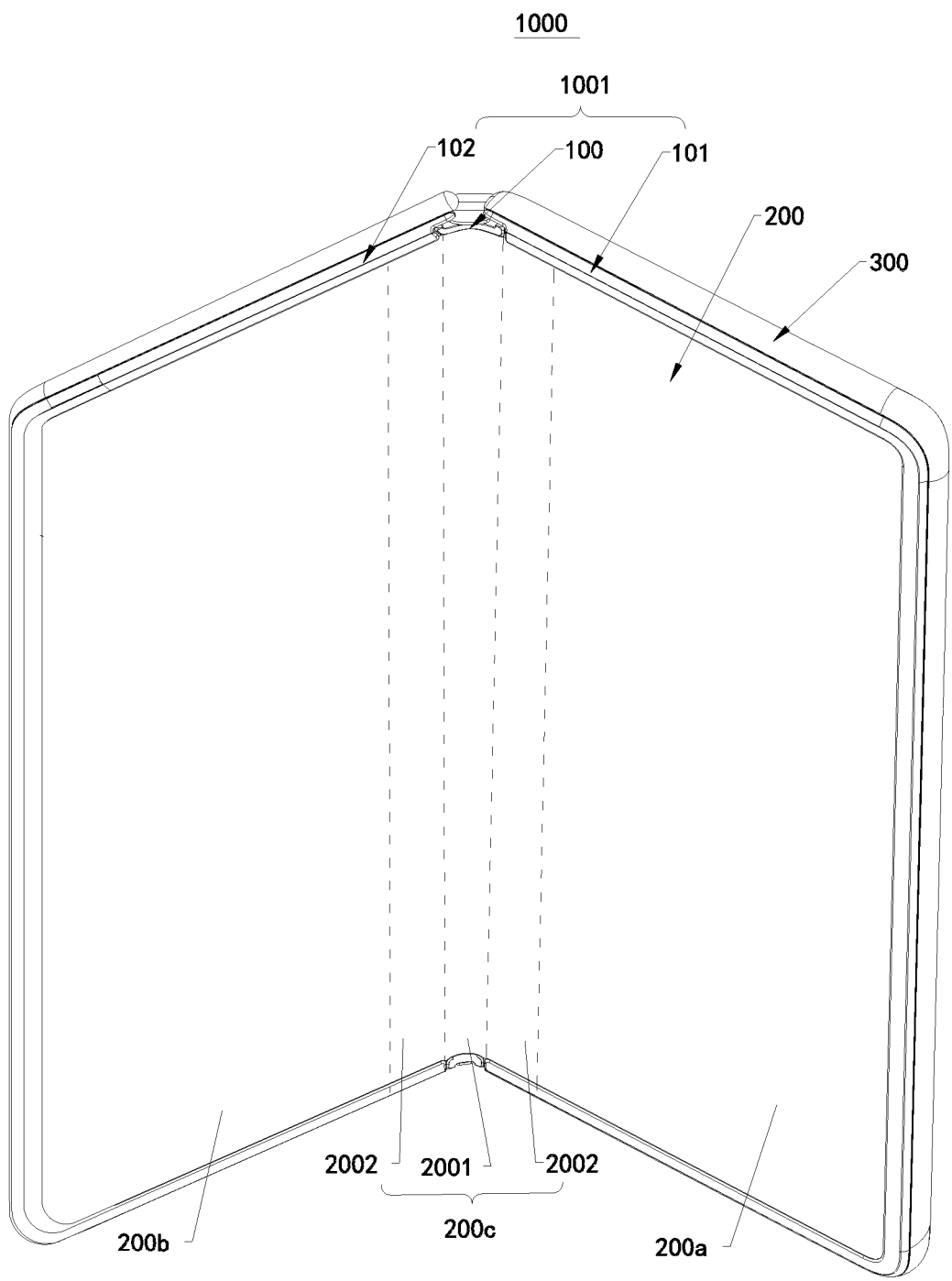
FIG. 2 is a schematic diagram of a structure of the foldable display terminal in the implementation shown in FIG. 1 when the foldable display terminal is folded to an intermediate state.
Figure 3:
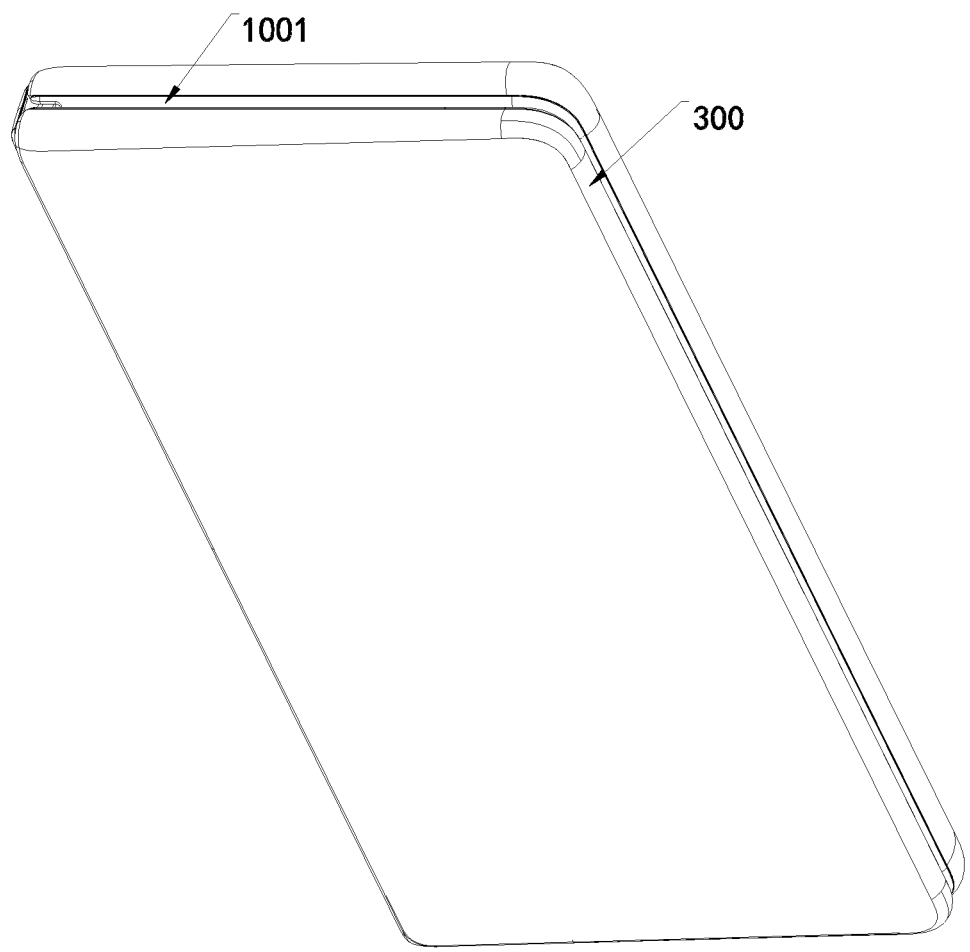
FIG. 3 is a schematic diagram of a structure of the foldable display terminal in the implementation shown in FIG. 1 when the foldable display terminal is folded to a fully closed state.

Refer to FIG. 1, FIG. 2, and FIG. 3. FIG. 1 is a schematic diagram of a structure of a foldable display terminal 1000 according to an implementation of this application in an unfolded state. FIG. 2 is a schematic diagram of a structure of the foldable display terminal 1000 in the implementation shown in FIG. 1 when the foldable display terminal 1000 is folded to an intermediate state. FIG. 3 is a schematic diagram of a structure of the foldable display terminal 1000 in the implementation shown in FIG. 1 when the foldable display terminal 1000 is folded to a fully closed state. In this implementation, the foldable display terminal 1000 is a mobile phone. The foldable display terminal 1000 can be folded or unfolded, to change a size of the foldable display terminal 1000 based on an actual requirement and a use scenario. For example, when video viewing or file processing needs to be performed, the foldable display terminal 1000 may be unfolded to the state shown in FIG. 1, to increase a size of a display of the foldable display terminal 1000, so as to have better video viewing effect or better file processing experience. When a call needs to be answered or made, the foldable display terminal 1000 may be folded to the state shown in FIG. 3, to facilitate holding of a user, so as to improve user experience.

Figure 4:
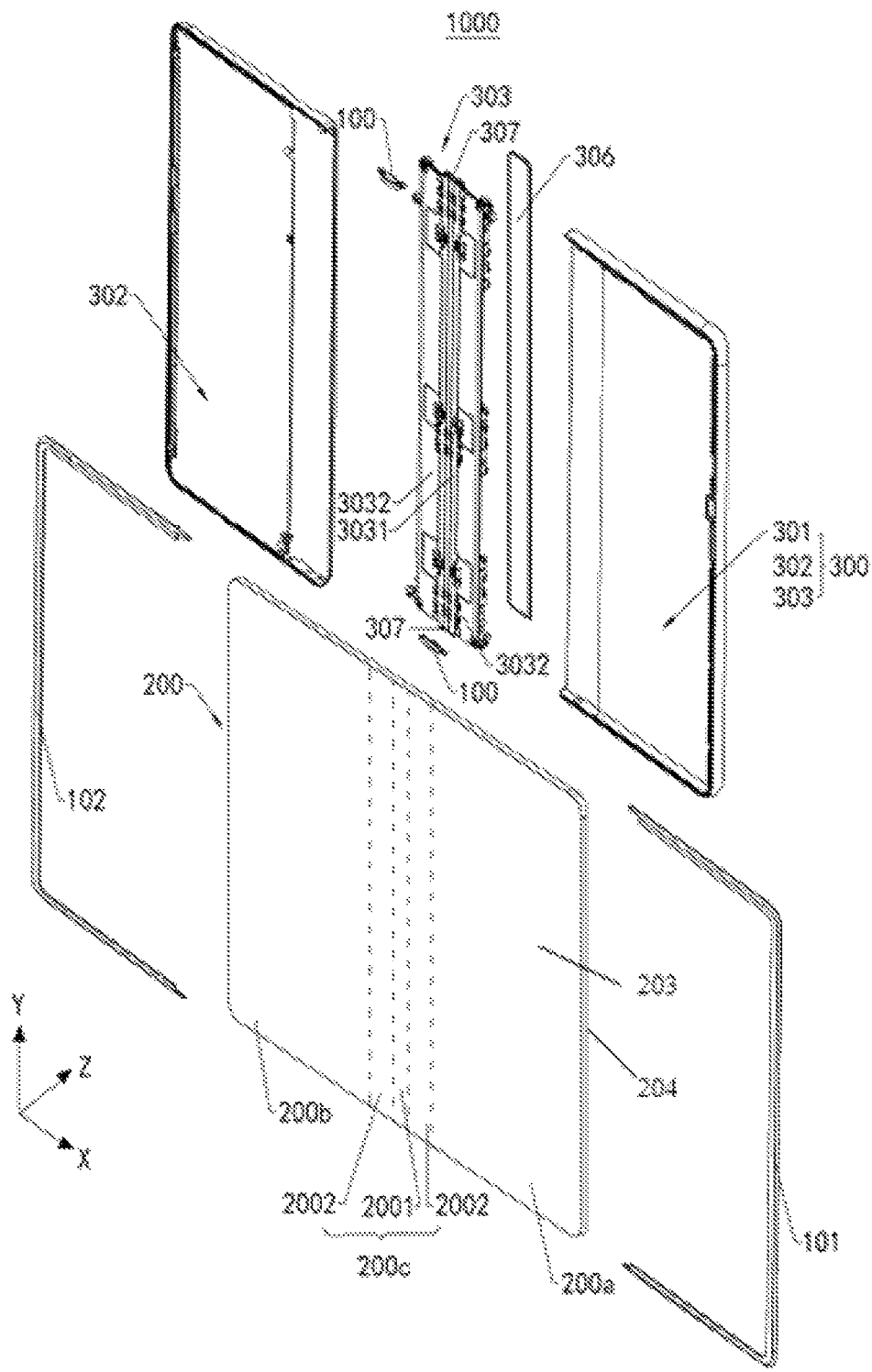
FIG. 4 is a schematic exploded view of the foldable display terminal shown in FIG. 1.

FIG. 4 is a schematic exploded view of the foldable display terminal 1000 shown in FIG. 1. In this implementation, the foldable display terminal 1000 includes a display 200, a screen support assembly 300, and an edge protection assembly 1001. The display 200 is stacked on the screen support assembly 300, and the screen support assembly 300 supports the display 200, and drives the display 200 to fold.

In this implementation of this application, the display 200 includes a display surface 203 and a side surface 204 intersecting with the display surface 203. The display surface 203 is a surface that is of the display 200 and that is configured to output light, and the side surface 204 is a surface of the display 200 in a thickness direction. In this implementation, the display 200 is an inward folded screen of the foldable display terminal 1000. To be specific, when the foldable display terminal 1000 is folded, the display surface 203 of the display 200 is located on an inner side of the foldable display terminal 1000. It may be understood that, in some other implementations of this application, the display 200 may be alternatively an outward folded screen of the foldable display terminal 1000. To be specific, when the foldable display terminal 1000 is folded, the display surface 203 of the display 200 is located on an outer side of the foldable display terminal 1000.

It should be noted that, in this application, the thickness direction of the display 200 and a thickness direction of the foldable display terminal 1000 are the same, and are both a Z-axis direction in FIG. 4, a length direction of the display 200 and a length direction of the foldable display terminal 1000 are the same, and are both an X-axis direction in FIG.

4, and a width direction of the display 200 and a width direction of the foldable display terminal 1000 are the same, and are both a Y-axis direction in FIG. 4.

The edge protection assembly 1001 is located on an edge of the display 200, and is configured to protect an edge position of the display 200. This prevents the edge of the display 200 from being exposed, so that the foldable display terminal 1000 has good appearance effect, and can prevent the edge of the display 200 from being damaged due to an external problem, for example, a collision, thereby improving reliability of the foldable display terminal 1000.

In this implementation, the display 200 includes a first fastening region 200a, a second fastening region 200b, and a rotating shaft region 200c connected between the first fastening region 200a and the second fastening region 200b. The first fastening region 200a and the second fastening region 200b are fastened to the screen support assembly 300, so that the display 200 is fastened to the screen support assembly 300, and the screen support assembly 300 supports the display 200. When the foldable display terminal 1000 is folded, the rotating shaft region 200c of the display 200 can be bent. In this implementation of this application, when the foldable display terminal 1000 is folded, a bending region of the display 200 is the rotating shaft region 200c of the display 200 in this application. In a process of bending the foldable display terminal 1000, the rotating shaft region 200c of the display 200 is bent, and an end that is of the first fastening region 200a and that is away from the bending region 202b and an end that is of the second fastening region 200b and that is away from the rotating shaft region 200c are close to each other. In a process of unfolding the foldable display terminal 1000, the rotating shaft region 200c of the display 200 gradually becomes flat, and the end that is of the first fastening region 200a and that is away from the rotating shaft region 200c and the end that is of the second fastening region 200b and that is away from the rotating shaft region 200c are away from each other.

In this implementation, the rotating shaft region 200c of the display 200 includes a bending region 2001 and connection regions 2002 connected to two sides of the bending region 2001. In this implementation, there are two connection regions 2002, and the two connection regions 2002 are respectively a first connection region and a second connection region. The first connection region and the second connection region are respectively located on the two sides of the bending region 2001. The first connection region connects the bending region 2001 to the first fastening region 200a, and the second connection region connects the bending region 2001 to the second fastening region 200a. In this implementation, when the foldable display terminal 1000 is folded, a bending degree of the bending region 2001 is usually greater than a bending degree of the connection region 2002. It may be understood that, in some implementations of this application, the rotating shaft region 200c may include only the bending region 2001, and two opposite sides of the bending region 2001 are respectively connected to the first fastening region 200a and the second fastening region 200a. Alternatively, in some implementations, the rotating shaft region 200c includes the bending region 2001 and connection region 2002. There may be more than two connection regions 2002. In the more than two connection regions, some connection regions are connected to a side that is of the bending region 2001 and that is close to the first fastening region 200a, and a remaining connection region is connected to a side that is of the bending region 2001 and that is close to the second fastening region 200b. For example, in some implementations, the rotating shaft region 200c includes the bending region 2001 and four connection regions 2002. Two connection regions 2002 are connected between the bending region 2001 and the first fastening region 200a, and remaining two connection regions 2002 are connected between the bending region 2001 and the second fastening region 200a.

Figure 5:
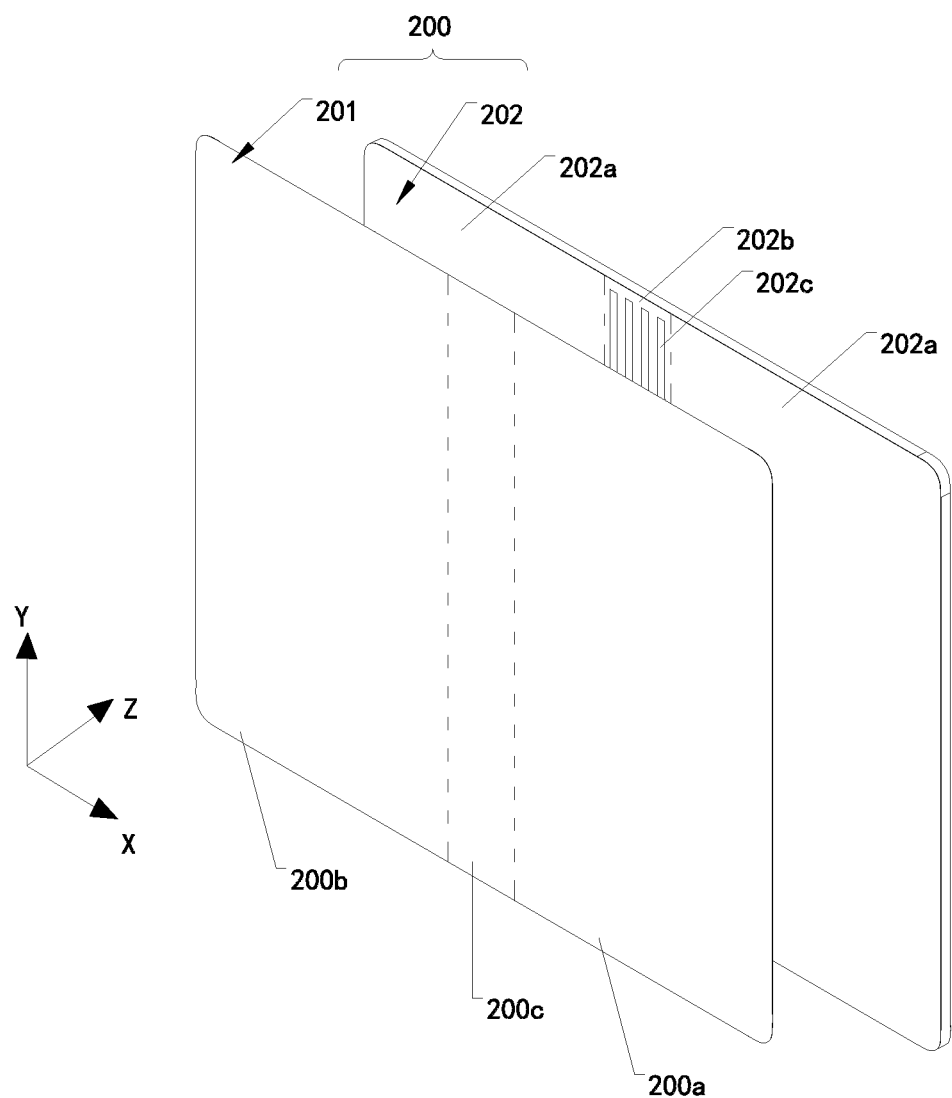
FIG. 5 is an exploded view of a structure of a display in an implementation shown in FIG. 4.

FIG. 5 is an exploded view of a structure of the display 200 in the implementation shown in FIG. 4. Specifically, the display 200 includes a flexible screen 201. The flexible screen 201 is configured to display an image, and has a feature of being bendable. In this implementation, the flexible screen 201 may be an organic light-emitting diode (organic light emitting diode, OLED) display. It may be understood that, in another implementation of this application, the flexible screen 201 may be alternatively another screen that has performance of being bendable and that can display an image.

In this implementation, the display 200 may further include a support member 202 configured to support the flexible screen 201. The flexible screen 201 is stacked on the support member 202, that is, the support member 202 can provide support for the flexible screen 201. This increases a service life of the flexible screen 201, without affecting bending performance of the display 200. In this implementation, the support member 202 includes two support regions 202a and a bending region 202b connected between the two support regions 202a. The two support regions 202a are respectively located in the first fastening region 200a and the second fastening region 200b of the display 200. The bending region 202b of the support member 202 is located in the rotating shaft region 200c of the display 200. The bending region 202b of the support member 202 has better bending performance than the support region 202a. This prevents the support member 202 from affecting bending performance of the bending region 200c of the display 200. In this implementation, the support member 202 is a metal sheet. A plurality of strip grooves 202c disposed at an interval are disposed in the bending region 202b of the support member 202. An extension direction of the strip groove 202c is the same as a length direction of the bending region 200c of the display 200 (namely, the Y direction in FIG. 4). In this way, the bending region 202b of the support member 202 has better bending performance than the support region 202a, to avoid impact of the support member 202 on the bending performance of the bending region 200c of the display 200.

It may be understood that, in another implementation of this application, the support member 202 may be alternatively another structure, to achieve good support effect for the flexible screen 201, without affecting bending performance of the rotating shaft region 200c of the display 200. In some implementations, the display 200 may alternatively have no support member 202. In other words, the display 200 includes only the flexible screen 201, and the screen support assembly 300 supports the flexible screen 201.

Refer to FIG. 4 again. In this implementation, the screen support assembly 300 includes a first body 301, a second body 302, and a rotating shaft assembly 303. The rotating shaft assembly 303 is rotatably connected between the first body 301 and the second body 302. The first fastening region 200a of the display 200 is opposite to the first body 301 and is fastened to the first body 301. The second fastening region 200b of the display 200 is opposite to the second body 302 and is fastened to the second body 302. The bending region 202b of the display 200 corresponds to the rotating shaft assembly 303. The first body 301 and the second body 302 can be folded by using the rotating shaft assembly 303 as an axis, to drive folding of the rotating shaft region 200c that is of the display 200 and that corresponds to the rotating shaft assembly 303.

It may be understood that, in another implementation of this application, the foldable display terminal 1000 may further include a third body. The third body is connected between the first body 301 and the second body 302. The first body 301 is connected to the third body by using the rotating shaft assembly 303, and the second body 302 may be connected to the third body by using another rotating shaft assembly 303. In some other implementations of this application, the foldable display terminal 1000 may further include a plurality of third bodies. The plurality of third bodies are connected between the first body and the second body, and the plurality of third bodies may be connected by using another rotating shaft assembly 303. In this way, the foldable display terminal 1000 can be folded for a plurality of times.

In this implementation, the rotating shaft assembly 303 includes one stationary shaft 3031 and two rotating shafts 3032. The two rotating shafts 3032 are respectively located on two sides of the stationary shaft 3031 and are rotatably connected to the stationary shaft 3031. In this implementation of this application, axial directions of the stationary shaft 3031 and the rotating shaft 3032 are parallel, and are both the Y-axis direction shown in FIG. 4. The two rotating shafts 3032 are respectively disposed on two sides of the stationary shaft 3031 in a width direction. The width direction of the stationary shaft 3031 is the X-axis direction and is perpendicular to the Y-axis direction in FIG. 4. In this implementation of this application, the stationary shaft 3031 may be rotatably connected to the rotating shaft 3032 in a manner of a structure, for example, a rotating shaft, a hinge, or a gear, or in a manner of fitting between structures. Details are not described herein. Specifically, when the foldable display terminal 1000 is folded by using the rotating shaft assembly 303 as a folding position, the rotating shaft 3032 is rotated relative to the stationary shaft 3031, to implement folding of the foldable display terminal 1000. It should be noted that, in a process of rotating the rotating shaft 3032 relative to the stationary shaft 3031, the axial direction of the rotating shaft 3032 is always the same as the axial direction of the stationary shaft 3031, and an angle between the rotating shaft 3032 and the stationary shaft 3031 gradually changes.

Figure 4A:
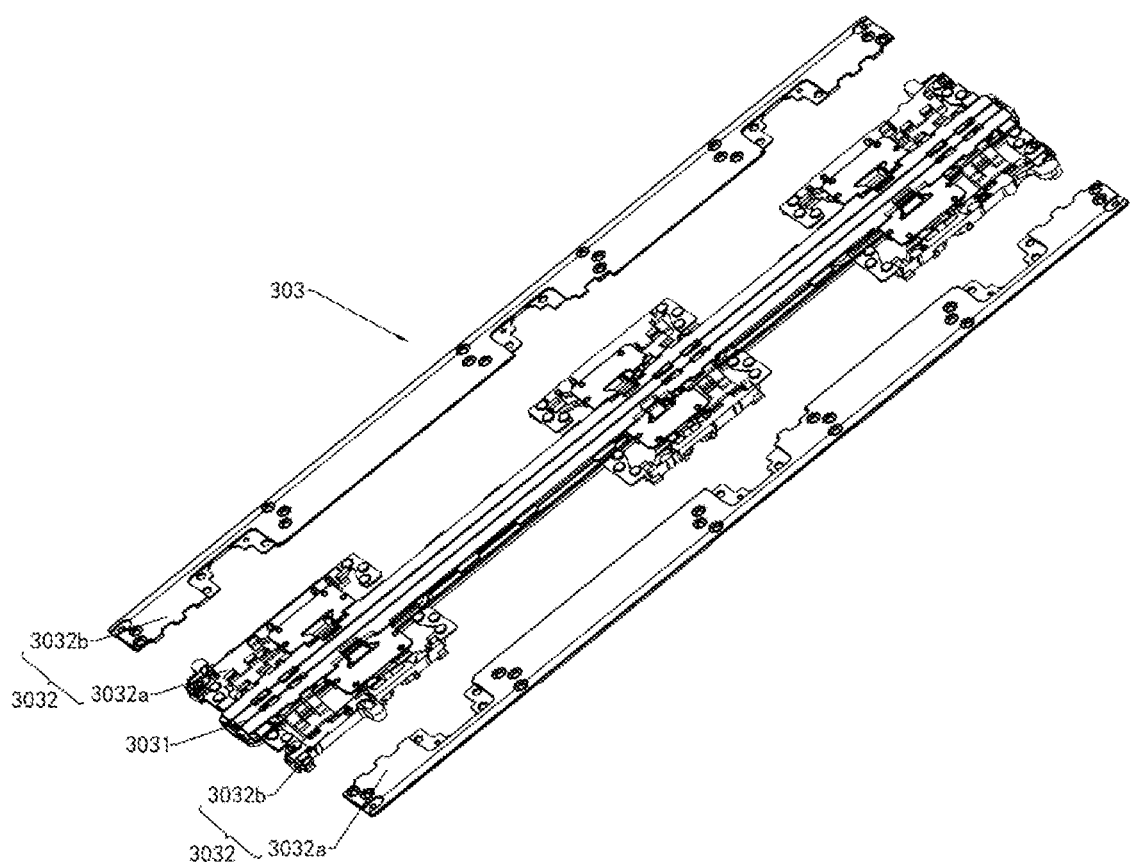
FIG. 4a is a schematic exploded view of a rotating shaft assembly in an implementation shown in FIG. 4.

FIG. 4a is a schematic exploded view of the rotating shaft assembly 303 in the implementation shown in FIG. 4. In this implementation, the rotating shaft 3032 of the rotating shaft assembly 303 includes a rotating mechanism 3032a and a support plate 3032b stacked on the rotating shaft mechanism 3032a. A plurality of rotating structures constitute the rotating shaft mechanism 3032a through fitting, so that the rotating shaft 303 can be rotated relative to the stationary shaft 3031. The support plate 3032b is a flat-plate-like structure and is fastened to the rotating shaft mechanism 3032a. The display 200 is stacked on the rotating shaft assembly 303, and the display 200 is in contact with the support plate 3032b. The support plate 3032b supports the display 200.

In this implementation, the two rotating shafts 3032 are respectively a first rotating shaft and a second rotating shaft. The first body 301 of the foldable display terminal 1000 is rotatably connected to a side that is of the first rotating shaft and that is away from the stationary shaft 3031, and the second body 302 is rotatably connected to a side that is of the second rotating shaft and that is away from the stationary shaft 3031. In other words, the first rotating shaft is rotatably connected between the stationary shaft 3031 and the first body 301, and the second rotating shaft is rotatably connected between the stationary shaft 3031 and the second body 302, that is, the stationary shaft 3031 is rotatably connected to the first body 301 by using the first rotating shaft, and the stationary shaft 3031 is rotatably connected to the second body 302 by using the second rotating shaft. The first body 301 may be rotatably connected to the first rotating shaft in a manner of a structure, for example, a rotating shaft, a hinge, or a gear, or in a manner of fitting between structures. The second body 302 may be rotatably connected to the second rotating shaft in a manner of a structure, for example, a rotating shaft, a hinge, or a gear, or in a manner of fitting between structures. Details are not described herein in this application.

When the first body 301 and the second body 302 are folded by using the rotating shaft assembly 303 as the axis, the first rotating shaft and the second rotating shaft can be both rotated relative to the stationary shaft 3031, the first body 301 can be rotated relative to the first rotating shaft, and the second body 302 can be rotated relative to the second rotating shaft.

In this implementation, the rotating shaft region 200c of the display 200 is opposite to the rotating shaft assembly 303. Specifically, the bending region 2001 of the rotating shaft region 200c is opposite to the stationary shaft 3031 of the rotating shaft assembly 303, and each connection region 2002 of the rotating shaft region 200c is opposite to one rotating shaft 3032 of the rotating shaft assembly 303.

In some implementations of this application, the connection region 2002 of the rotating shaft region 200c can be fastened to the rotating shaft 3032 opposite to the connection region 2002, to ensure that the rotating shaft 3032 of the rotating shaft assembly 303 is rotated relative to the stationary shaft 3031. When the rotating shaft region 200c of the display 200 is bent, it is ensured that the rotating shaft assembly 303 can achieve better support effect for the rotating shaft region 200c of the display 200, to prevent the rotating shaft region 200c of the display 200 from being damaged in a bending process. In this implementation, the connection region 2002 of the rotating shaft region 200c can be fastened to the rotating shaft 3032, that corresponds to the connection region 2002, in an adhesive bonding manner. Specifically, in this implementation, the first connection region is opposite to the first rotating shaft and is bonded and fastened to the first rotating shaft by using an adhesive. The second connection region is opposite to the second rotating shaft and is bonded and fastened to the second rotating shaft by using an adhesive. It may be understood that, in some other implementations of this application, the connection region 2002 of the rotating shaft region 200c can be alternatively connected and fastened to the rotating shaft 3032 opposite to the connection region 2002 in various manners such as screw fastening, welding, a buckling connection, and adhesive fastening. This is not specifically limited in this application. Alternatively, in some other implementations of this application, the connection region 2002 and the rotating shaft 3032 of the display 200 may not be fastened.

In some implementations of this application, there are more than two connection regions 2002 of the rotating shaft region 200c, and there may also be more than two rotating shafts 3032 of the rotating shaft assembly 303. The connection regions 2002 of the rotating shaft region 200c are opposite to the rotating shafts 3032 of the rotating shaft assembly 303 in a one-to-one manner. In other words, each connection region 2002 on the display 200 is disposed opposite to one rotating shaft 3032. For example, in some implementations, there may be four rotating shafts 3032. Two rotating shafts 3032 are rotatably connected between the stationary shaft 3031 and the first body 301, and remaining two rotating shafts 3032 are rotatably connected between the stationary shaft 3031 and the second body 302. In these implementations, by increasing a quantity of rotating shafts 3032 of the rotating shaft assembly 303, rotation performance of the rotating shaft assembly 303 can be improved, and bending performance of the rotating shaft region 200c of the display 200 can be improved, so that the rotating shaft region 200c of the display 200 can have a more natural bending state.

It may be understood that, in some implementations, the rotating shaft assembly 303 may alternatively include only the stationary shaft 3031, and two opposite sides of the stationary shaft 3031 are rotatably connected to the first body 301 and the second body 302 respectively.

Figure 6:
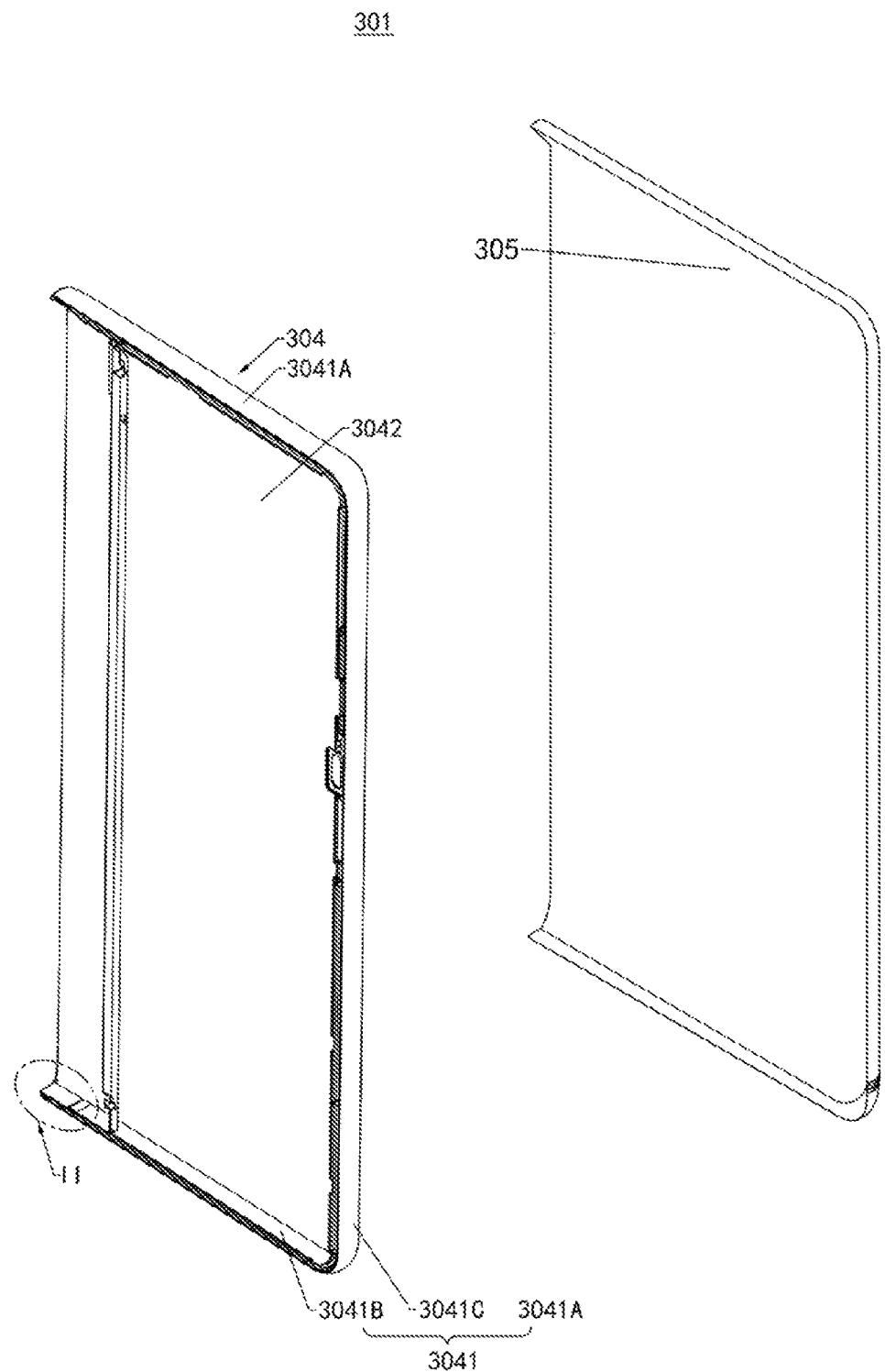
FIG. 6 is a schematic exploded view of a structure of a first body according to an implementation of this application.

FIG. 6 is a schematic exploded view of a structure of the first body 301 according to an implementation of this application. It should be noted that, in this implementation of this application, structures of the first body 301 and the second body 302 are the same or mirror each other. In this application, the first body 301 is used as an example to describe the structures of the first body 301 and the second body 302. In this implementation, the first body 301 and the second body 302 each include a middle frame 304 and a rear cover 305. The middle frame 304 included in the first body 301 is a first middle frame, and the rear cover 305 included in the first body 301 is a first rear cover. The middle frame 304 included in the second body 302 is a second middle frame, and the rear cover 305 included in the second body 302 is a second rear cover.

In this implementation, the middle frame 304 includes a border 3041 and a middle plate 3042. The middle plate 3042 is located in a region enclosed by the border 3041, and is connected to an inner surface of the border 3041. The rear cover 305 is fastened to the border 3041, and the rear cover 305 is disposed opposite to the middle plate 3042. In some implementations, there is a spacing between the rear cover 305 and the middle plate 3042. The rear cover 305, the middle plate 3042, and the border 3041 enclose accommodation space. Components such as a battery and a mainboard of the foldable display terminal 1000 are accommodated in the accommodation space.

In this implementation, the border 3041 includes a first section 3041A and a second section 3041B that are disposed opposite to each other, and a third section 3041C connected between the first section 3041A and the second section 3041B. One end of the first section 3041A and one end of the second section 3041B are respectively located at two ends of the rotating shaft 3032 of the rotating shaft assembly 303, and the other end of the first section 3041A and the other end of the second section 3041B are respectively connected to two ends of the third section 3041C.

In this implementation of this application, the rear cover 305 may be fastened to the border 3041 in various fastening manners such as a fastener and adhesive bonding. It may be understood that, in some other implementations of this application, the rear cover 305 can be alternatively an integrated structure formed in an integrated manner with the border 3041.

Specifically, refer to FIG. 6. In this implementation, a border 3041 included in the first middle frame is a first border, and a middle plate 3042 included in the first middle frame is a first middle plate. The first middle plate is located in a region enclosed by the first border, and is connected to an inner surface of the first border. The first rear cover is fastened to the first middle frame, and the first rear cover is disposed opposite to the first middle plate. There is a spacing between the first rear cover and the first middle plate. The first rear cover, the first middle plate, and the first border enclose first accommodating space. A border 3041 included in the second middle frame is a second border, and a middle plate 3042 included in the second middle frame is a second middle plate. The second middle plate is located in a region enclosed by the second border, and is connected to an inner surface of the second border. The second rear cover is fastened to the second middle frame, and the second rear cover is disposed opposite to the second middle plate. There is a spacing between the second rear cover and the second middle plate. The second rear cover, the second middle plate, and the second border enclose second accommodating space. The components such as the battery and the mainboard of the foldable display terminal 1000 are accommodated in the first accommodation space and/or the second accommodation space.

In this implementation, the first fastening region 200a of the display 200 is fastened to a side that is of the first middle plate and that is away from the first rear cover, and the second fastening region 200b of the display 200 is fastened to a side that is of the second middle plate and that is away from the second rear cover. In this implementation, there is a specific distance between an edge of the first fastening region 200a of the display 200 and the first border, and there is a specific distance between an edge of the second fastening region 200b of the display 200 and the second border. This can prevent the display 200 from being damaged because acting force during a collision is transferred to the display 200 through the first border or the second border when the foldable display terminal 1000 is collided.

When the foldable display terminal 1000 in this application needs to be folded, the user applies force to the first body 301 and the second body 302, so that an end that is of the first body 301 and that is away from the rotating shaft assembly 303 and an end that is of the second body 302 and that is away from the rotating shaft assembly 303 are close to each other, the rotating shaft 3032 of the rotating shaft assembly 303 is rotated relative to the stationary shaft 303b, and the first body 301 and the second body 302 are rotated relative to the rotating shafts 3032 connected to the first body 301 and the second body 302. As a result, the first fastening region 200a of the display 200 and the second fastening region 200b of the display 200 are folded by using the rotating shaft region 200c of the display 200 as an axis. When the foldable display terminal 1000 needs to be unfolded, the user applies force to the first body 301 and the second body 302, so that the end that is of the first body 301 and that is away from the rotating shaft assembly 303 and the end that is of the second body 302 and that is away from the rotating shaft assembly 303 are away from each other, the rotating shaft 3032 of the rotating shaft assembly 303 is rotated, for unfolding, relative to the stationary shaft 303b, and the first body 301 and the second body 302 are rotated, for unfolding, relative to the rotating shafts 3032 connected to the first body 301 and the second body 302. As a result, the first fastening region 200a of the display 200 and the second fastening region 200b of the display 200 are unfolded by using the rotating shaft region 200c of the display 200 as an axis.

Figure 7:
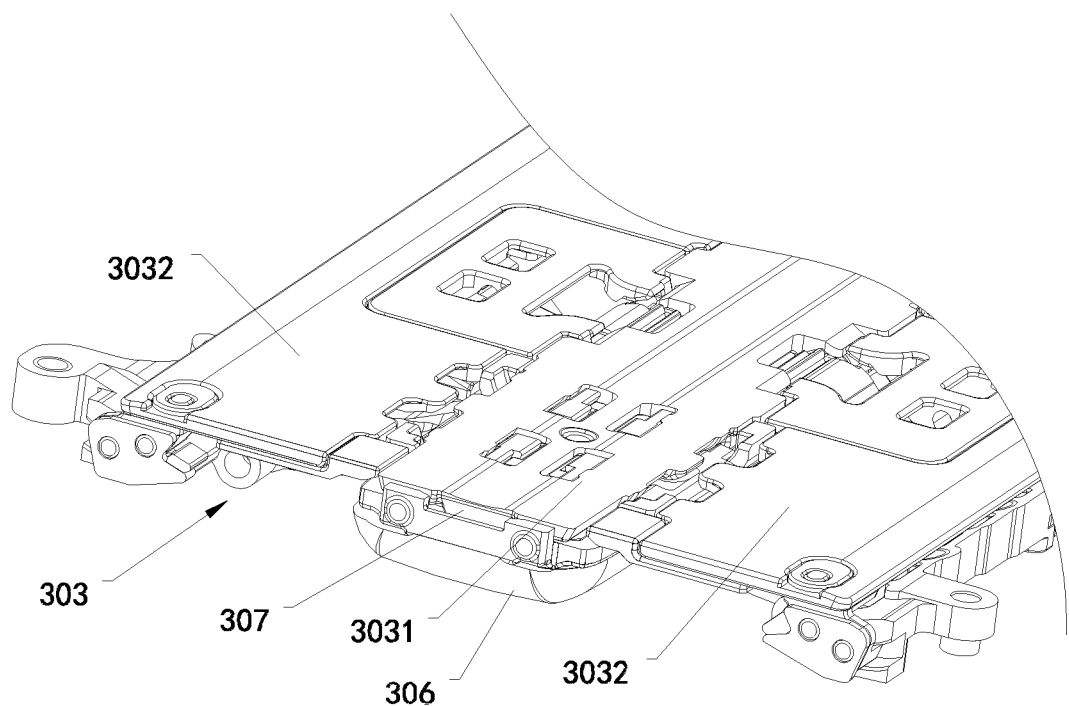
FIG. 7 is an enlarged view of a structure of a partial position of a rotating shaft decoration member shown in FIG. 4 when the rotating shaft decoration member is fastened to a rotating shaft assembly.

Refer to FIG. 4 and FIG. 7 together. FIG. 7 is an enlarged view of a structure of a partial position of a rotating shaft decoration member 306 shown in FIG. 4 when the rotating shaft decoration member 306 is fastened to the rotating shaft assembly 303. In this implementation of this application, the rotating shaft assembly 303 further includes the rotating shaft decoration member 306. The rotating shaft decoration member 306 covers a surface that is of the stationary shaft 3031 and that is away from the display 200, to prevent the rotating shaft assembly 303 from being exposed, so as to protect the rotating shaft assembly 303. In addition, the rotating shaft decoration member 306 can match structures, colors, and the like of the rear covers 305 of the first body 301 and the second body 302, so that the foldable display terminal 1000 can have the good appearance effect.

Refer to FIG. 1 and FIG. 4 together. In this implementation of this application, the foldable display terminal 1000 further includes the edge protection assembly 1001. The edge protection assembly 1001 includes an edge protector and an edge protection structure 100. The edge protector can cover edges of the first fastening region 200*a*, the second fastening region 200*b*, and the connection region 2002 of the rotating shaft region 200*c* of the display 200. The edge protection structure 100 can cover an edge of the bending region 2001 of the rotating shaft region 200*c*. In this way, the edge of the display 200 is protected by using the edge protector and the edge protection structure 100, to prevent the edge of the display 200 from being exposed, so as to improve appearance effect of the foldable display terminal 1000, and prevent the edge of the display 200 from being damaged due to the collision or the like.

Refer to FIG. 1 and FIG. 4 together. In this implementation, the edge protector includes a first edge protector 101 and a second edge protector 102. The first edge protector 101 is located on a side that is of the display 200 and that backs onto the first body 301. The first edge protector 101 covers edges of the first fastening region 200*a* of the display 200 and the first connection region of the rotating shaft region 200*c*. In addition, the first edge protector 101 is fixedly connected to the first border of the first body 301. The first border of the first body 301 and the first edge protector 101 can wrap the edges of the first fastening region 200*a* of the display 200 and the first connection region, to prevent the edges of the first fastening region 200*a* of the display 200 and the first connection region from being exposed. This can prevent the edges of the first fastening region 200*a* of the display 200 and the first connection region from being damaged due to a collision or a hit, and also prevent water, dust, and the like from entering the display 200 or the foldable display terminal 1000 through the edges of the first fastening region 200*a* of the display 200 and the first connection region, thereby ensuring that the display 200 and the foldable display terminal 1000 can have better reliability. A peripheral edge of the first edge protector 101 may be fixedly connected to the second border in a connection manner of buckling fastening, bonding fastening, or other fastening. This is not specifically limited in this application.

Similarly, the second edge protector 102 is located on a side that is of the display 200 and that backs onto the second body 302. The second edge protector 102 covers edges of the second fastening region 200*b* of the display 200 and the second connection region. In addition, a peripheral edge of the second edge protector 102 is fixedly connected to the second border. The second border and the second edge protector 102 can wrap the edges of the second fastening region 200*b* of the display 200 and the second connection region, to prevent the edges of the second fastening region 200*b* of the display 200 and the second connection region from being exposed. This can prevent the edges of the second fastening region 200*b* of the display 200 and the second connection region from being damaged due to a collision or a hit, and prevent water, dust, and the like from entering the display 200 or the foldable display terminal 1000 through the edges of the second fastening region 200*b* of the display 200 and the second connection region, thereby ensuring that the display 200 and the foldable display terminal 1000 has better reliability. The peripheral edge of the second edge protector 102 may be fixedly connected to the second border in a connection manner of buckling fastening, bonding fastening, or other fastening. This is not specifically limited in this application.

Refer to FIG. 1 and FIG. 4 together. In this implementation of this application, there are two edge protection structures 100. The two edge protection structures 100 are respectively located at two opposite ends of the rotating shaft assembly 303, and are located at two opposite ends of the bending region 2001 of the display 200 in a length direction (namely, the Y-axis direction in FIG. 4). The edge protection structure 100 can protect an edge of the bending region 2001 of the display 200, to prevent the edge of the bending region 2001 of the display 200 from being exposed. This improves the appearance effect of the foldable display terminal 1000, and can prevent the edge of the bending region 2001 of the display 200 from being damaged due to a collision, and prevent water, dust, and the like from penetrating into the display 200 or the foldable display terminal 1000 through the edge of the bending region 2001 of the display 200, thereby ensuring that the display 200 and the foldable display terminal 1000 have higher reliability.

Figure 8:
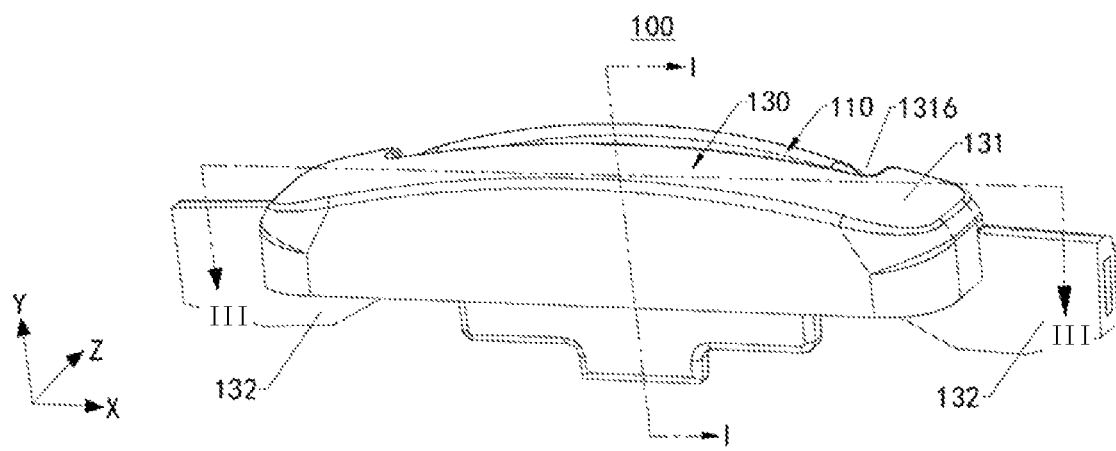
FIG. 8 is a schematic diagram of a structure of an edge protection structure according to a first implementation of this application.
Figure 9:
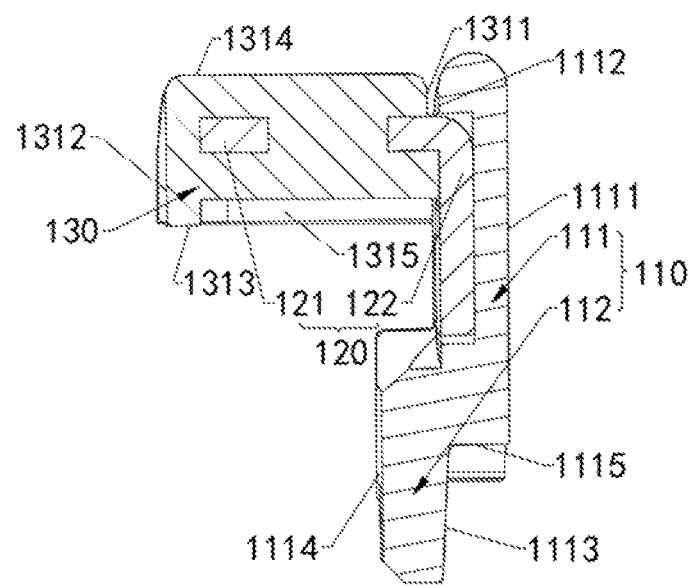
FIG. 9 is a cross sectional schematic view of the edge protection structure shown in FIG. 8 after the edge protection structure is cut in a direction I-I.
Figure 10:
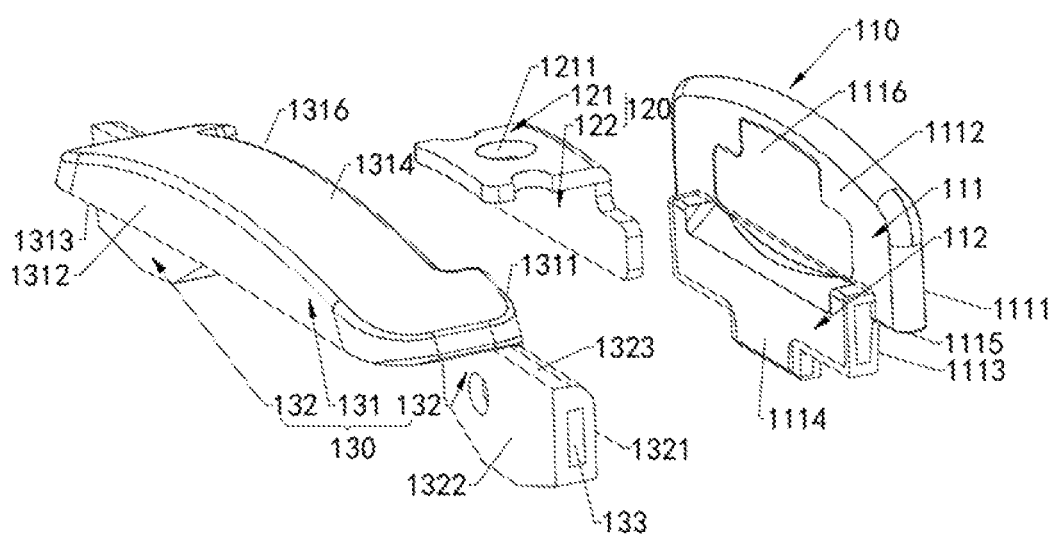
FIG. 10 is a schematic exploded view of the structure of the edge protection structure shown in FIG. 8.

Specifically, refer to FIG. 8, FIG. 9, and FIG. 10. FIG. 8 is a schematic diagram of a structure of the edge protection structure 100 according to a first implementation of this application. FIG. 9 is a cross sectional schematic view of the edge protection structure 100 shown in FIG. 8 after the edge protection structure 100 is cut in a direction I-I. FIG. 10 is a schematic exploded view of the structure of the edge protection structure 100 shown in FIG. 8. In this implementation, the edge protection structure 100 includes a rigid member 110, a connector 120, and a soft rubber member 130. The rigid member 110 is connected to the soft rubber member 130 by using the connector 120.

In this implementation, strength of the rigid member 110 and strength of the connector 120 are greater than strength of the soft rubber member 130. The soft rubber member 130 is an elastically deformable member.

In an implementation shown in FIG. 10, the rigid member 110 and the connector 120 may be both metal members made of a metal material, and have high strength. Specifically, the metal material for forming the rigid member 110 and the connector 120 may be various types of metal materials such as stainless steel, cast iron, and aluminum, or alloy materials. It may be understood that, in another implementation of this application, the rigid member 110 and the connector 120 may be alternatively mechanical members made of another type of material. For example, in some implementations, the rigid member 110 or the connector 120 may be a fine ceramic member made of a fine ceramic material.

In this implementation, the rigid member 110 may be obtained in a manner of metal injection molding (metal injection molding, MIM). In this implementation, the rigid member 110 with high dimensional precision can be obtained through metal injection molding, to help the edge protection structure 100 fit another structure of the foldable display terminal 1000. In addition, the rigid member 110 obtained through metal injection molding has uniform organization and high relative density at all positions, to have high strength, so as to achieve better protection effect for the edge of the display 200. In addition, surface finish of the rigid member 110 is good, so that the foldable display terminal 1000 can have the good appearance effect. It may be understood that, in another implementation of this application, the rigid member 110 may be alternatively formed by using another technology, for example, formed in a manner, for example, computer numerical control (Computer numerical control, CNC) machining forming or die casting molding.

In the implementation shown in FIG. 10, the soft rubber member 130 is an elastically deformable member, and the soft rubber member 130 has lower strength and can be bent and deformed. In some implementations of this application, the soft rubber member 130 is made of an elastically deformable soft rubber material. Specifically, the soft rubber material for forming the soft rubber member 130 may be silica gel, a thermoplastic elastomer (thermoplastic elastomer, TPE), thermoplastic polyurethane (thermoplastic polyurethane, TPU), polyvinyl chloride (polyvinyl chloride, PVC) soft rubber, rubber (for example, silicone rubber, natural rubber, cis-1,4-polybutadiene rubber, styrene-butadiene rubber, or ethylene propylene rubber), or the like. It may be understood that the soft rubber member 130 in this application may be alternatively made of another material that can implement elastic deformation. The another material is not enumerated herein.

In some implementations of this application, surfaces of the rigid member 110 and the soft rubber member 130 each may be coated with a plating layer, to further improve appearance effect of the edge protection structure 100. For example, in some implementations, the plating layer on the surface of the rigid member 110 has a same color as the rear cover of the foldable display terminal 1000. In this way, the foldable display terminal 1000 has a uniform appearance color, to have better appearance effect. In some implementations, the plating layer can further prevent external water, oxygen, and the like from corroding the rigid member 110, to improve quality of the foldable display terminal 1000.

In this application, the plating layer may be formed through evaporation by using an evaporation technology, or may be formed through deposition in a manner, for example, vapor deposition. A manner of forming the plating layer is not specifically limited herein.

Figure 11:
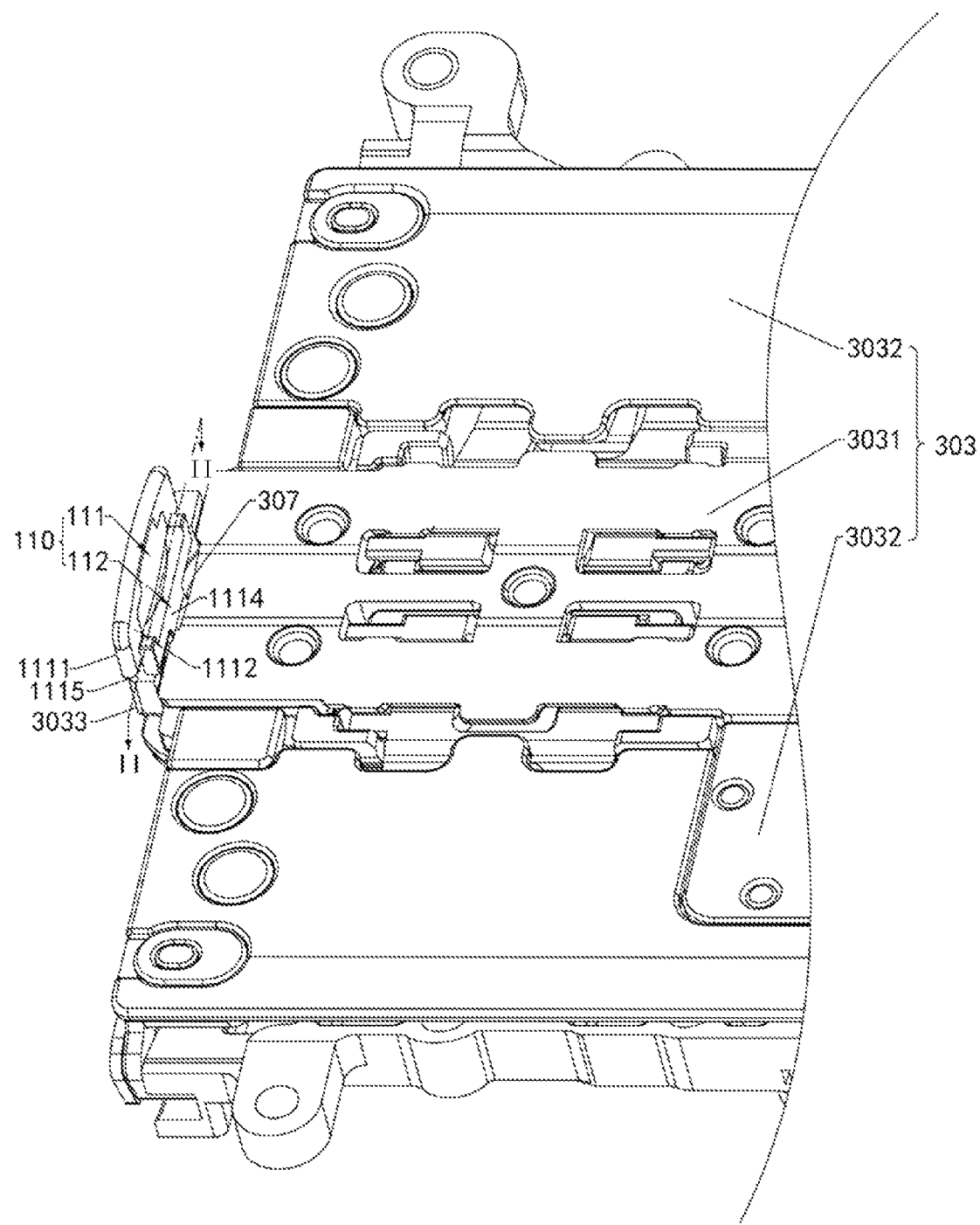
FIG. 11 is a schematic diagram of a partial structure when a rigid member of the edge protection structure shown in FIG. 10 is fastened to a rotating shaft assembly.
Figure 12:
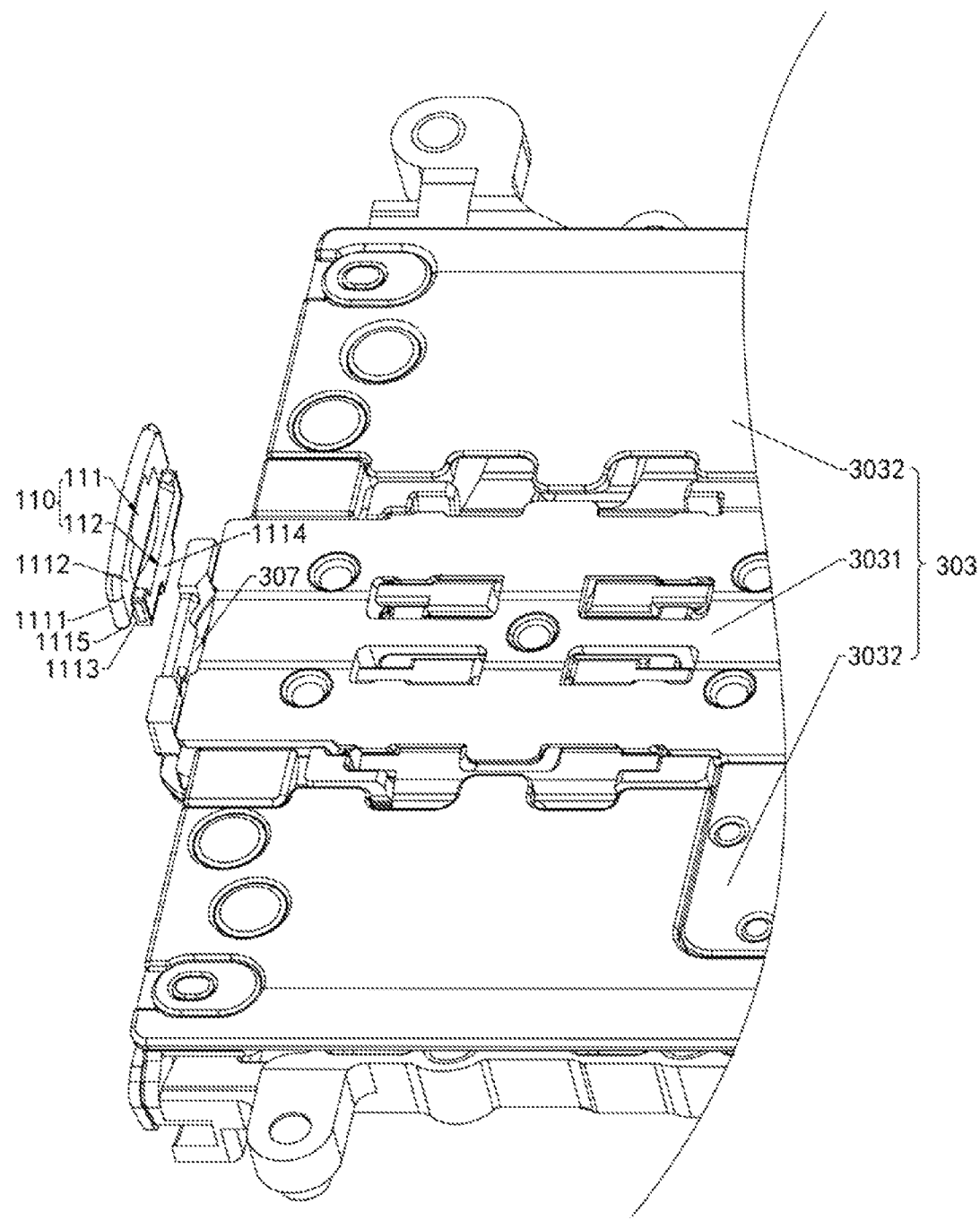
FIG. 12 is a schematic exploded view of a partial structure of a rigid member of the edge protection structure shown in FIG. 10 and a rotating shaft assembly.
Figure 13:
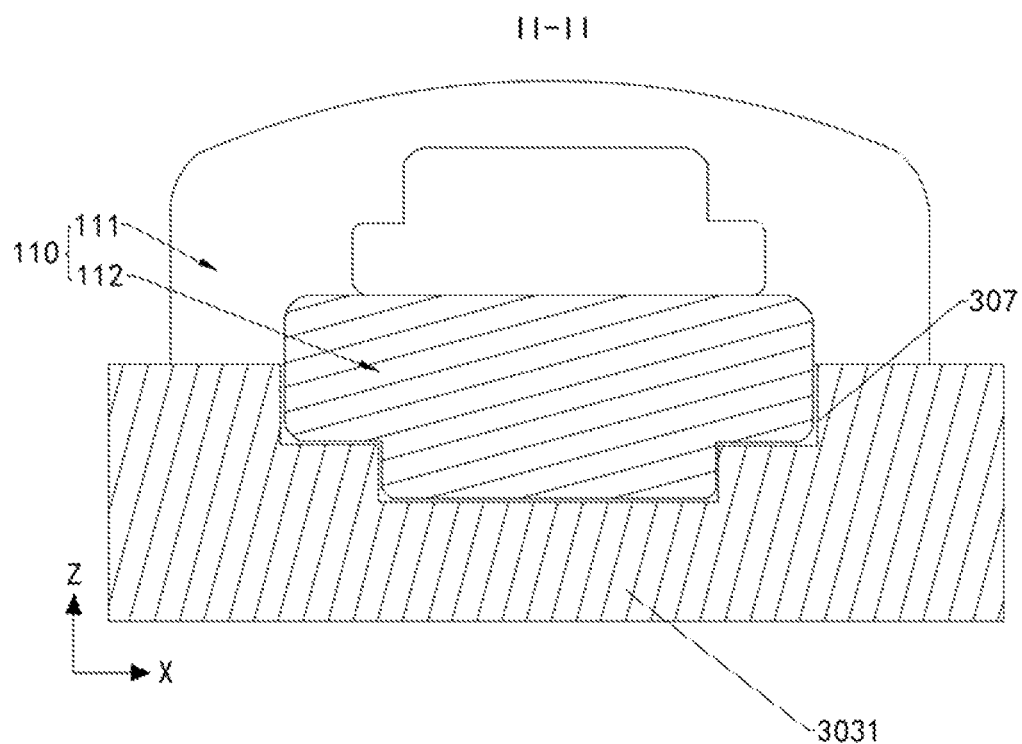
FIG. 13 is a cross sectional schematic view of a position II-II in FIG. 11.

In the implementation shown in FIG. 10, the rigid member 110 includes a connecting end 111 and a fastening end 112 connected to the connecting end 111. Refer to FIG. 11, FIG. 12, and FIG. 13. FIG. 11 is a schematic diagram of a partial structure when the rigid member 110 of the edge protection structure 100 shown in FIG. 10 is fastened to the rotating shaft assembly 303. FIG. 12 is a schematic exploded view of a partial structure of the rigid member 110 of the edge protection structure 100 shown in FIG. 10 and the rotating shaft assembly 303. FIG. 13 is a cross sectional schematic view of a position II-II in FIG. 11. In this implementation, the fastening end 112 of the rigid member 110 is fastened to the stationary shaft 3031 of the rotating shaft assembly 303. In this way, the edge protection structure 100 is fastened to the rotating shaft assembly 303. In this implementation, slots 307 are disposed at two ends of the stationary shaft 3031, and the fastening end 112 of the rigid member 110 is inserted into the slot 307 and fastened. In this implementation, the fastening end 112 of the rigid member 110 is inserted into the slot 307, and is fastened to a slot wall of the slot 307 by using an adhesive. It may be understood that, in some other implementations of this application, the rigid member 110 may be alternatively fastened to the stationary shaft 3031 in another manner. For example, the rigid member 110 may be fastened to the stationary shaft 3031 in various manners such as buckling and screw fastening. Details are not described herein.

Refer to FIG. 10 again. In some implementations of this application, the rigid member 110 is a plate-like structure. The connecting end 111 of the rigid member 110 includes a first surface 1111 and a second surface 1112 that are disposed opposite to each other. The first surface 1111 is closer to the outside of the foldable display terminal 1000 than the second surface 1112. The fastening end 112 of the rigid member 110 includes a third surface 1113 and a fourth surface 1114 that are disposed opposite to each other. The third surface 1113 is closer to the outside of the foldable display terminal 1000 than the fourth surface 1114. In this implementation, a stepped structure is formed at a position at which the connecting end 111 is connected to the fastening end 112 of the rigid member 110. To be specific, the first surface 1111 of the connecting end 111 and the third surface 1113 of the fastening end 112 are non-coplanarly disposed, and the first surface 1111 of the connecting end 111 is closer to the outside of the foldable display terminal 1000 than the third surface 1113 of the fastening end 112. The first surface 1111 of the connecting end 111 and the third surface 1113 of the fastening end 112 are connected by using a fifth surface 1115.

Refer to FIG. 11. In this implementation, when the fastening end 112 of the rigid member 110 is inserted into the slot 307 of the stationary shaft 3031, the fifth surface 1115 of the rigid member 110 is in contact with a surface of the stationary shaft 3031. This ensures that the fastening end 112 of the rigid member 110 can be more stable when being inserted into the stationary shaft 3031. In addition, in this implementation, when the rigid member 110 is fastened to the stationary shaft 3031, the first surface 1111 of the connecting end 111 of the rigid member 110 is coplanar with an end surface 3033 of the stationary shaft 3031, so that the foldable display terminal 1000 can have a flat appearance, to have the better appearance effect.

Refer to FIG. 11 and FIG. 13. In this implementation of this application, a width of the fastening end 112 may be less than a width of the connecting end 111. When the rigid member 110 is fastened to the stationary shaft 3031, a width direction of the fastening end 112 and a width direction of the connecting end 111 of the rigid member 110 are the same as a width direction of the stationary shaft 3031, and are a direction X in FIG. 13. When the fastening end 112 of the rigid member 110 is inserted into the slot 307 of the stationary shaft 3031, apart that is of the connecting end 111 and that exceeds the fastening end 112 in the width direction abuts against the surface of the stationary shaft 3031. This can further ensure that the fastening end 112 of the rigid member 110 can be more stable when being inserted into the slot 307 of the stationary shaft 3031, and is unlikely to shake to fall off.

Refer to FIG. 9 and FIG. 10 together again. In this implementation, the soft rubber member 130 includes a protection part 131. The protection part 131 includes a first surface 1311 and a second surface 1312 that are disposed opposite to each other and a third surface 1313 and a fourth surface 1314 that are connected between the first surface 1311 and the second surface 1312. The third surface 1313 and the fourth surface 1314 are disposed opposite to each other. When the edge protection structure 100 is fastened to the rotating shaft assembly 303, the third surface 1313 of the protection part 131 faces the display 200. In the implementation shown in FIG. 10, the third surface 1313 is a plane.

Figure 14:
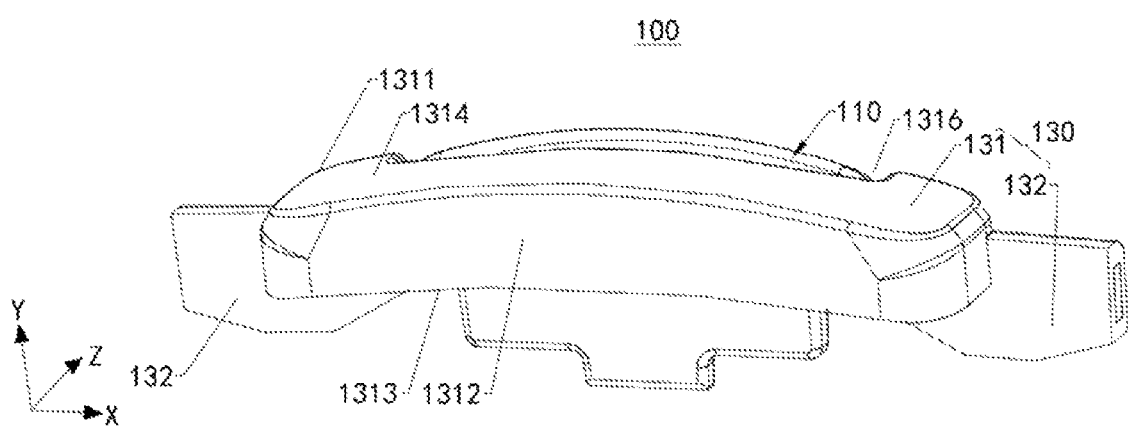
FIG. 14 is a schematic diagram of a structure of an edge protection structure according to a second implementation of this application.

FIG. 14 is a schematic diagram of a structure of the edge protection structure 100 according to a second implementation of this application. The edge protection structure 100 in this implementation is basically the same as the edge protection structure 100 shown in FIG. 10. A difference lies in that, in the edge protection structure 100 in the implementation shown in FIG. 14, the third surface 1313 is a cambered surface that is concave toward the fourth surface 1314. In this implementation, when the rotating shaft region 200c of the display 200 is bent, the protection part 131 of the soft rubber member 130 is bent with the rotating shaft region 200c of the display 200. When the protection part 131 is bent, two ends of the protection part 131 are close to each other. The fourth surface 1314 is an inner surface of the protection part 131 when the protection part 131 is bent. After the protection part 131 is bent with the display 200 for a plurality of times, the protection part 131 is likely to generate plastic deformation. As a result, the two ends of the protection part 131 tilt in a direction away from the display 200. In this implementation, the third surface 1313 of the protection part 131 is designed as the cambered surface that is slightly concave toward the fourth surface 1314, that is, the protection part 131 is enabled to have initial deformation toward the display 200. This can partially neutralize deformation of the protection part 131 toward the fourth surface 1314 after the protection part 131 is bent for the plurality of times, and reduce a risk that the two ends of the protection part 131 tilt after the protection part 131 is bent for the plurality of times, thereby prolong a service life of the edge protection structure 100.

It should be noted that, in the implementation shown in FIG. 14, a bending radian of the third surface 1313 is small, so that there can be basically no gap between the third surface 1313 of the protection part 131 and the display 200 when the protection part 131 covers an edge of the rotating shaft region 200c of the display 200. This reduces a case that water, dust, and the like enter the display 200 or the foldable display terminal 1000 through a gap between the third surface 1313 and the display 200. The two ends of the third surface 1313 that are bent toward the display 200 generate small pressure for the display 200, to prevent the display 200 from being damaged.

In the implementation shown in FIG. 14, the first surface 1311 and the second surface 1312 are both planes, the fourth surface 1314 is a cambered surface, and a bending radian of the fourth surface 1314 is greater than the bending radian of the third surface 1313. In this way, the edge protection structure 100 can have good appearance effect. It may be understood that, in this application, forms of the first surface 1311, the second surface 1312, the third surface 1313, and the fourth surface 1314 of the protection part 131 may alternatively change. In other words, the forms of the first surface 1311, the second surface 1312, the third surface 1313, and the fourth surface 1314 of the protection part 131 are not specifically limited in this application. For example, in some implementations, the first surface 1311 and the second surface 1312 of the protection part 131 may be alternatively cambered surfaces, and the third surface 1313 and the fourth surface 1314 may be planes.

Refer to FIG. 9 again. In some implementations of this application, a groove 1315 that is concavely disposed from the third surface 1313 to the fourth surface 1314 is further disposed on the protection part 131. By disposing the groove 1315, it can be ensured that a shape of an outer surface of the protection part 131 remains unchanged, to ensure that the foldable display terminal 1000 has the good appearance effect and the protection part 131 can be more likely to be deformed, so as to ensure that the protection part 131 can be better bent and deformed with the display 200, and is unlikely to generate large acting force for the display 200 to damage the display 200.

Refer to FIG. 8, FIG. 9, and FIG. 10 again. In this implementation of this application, the rigid member 110 is located on one side of the first surface 1311 of the protection part 131. In an implementation shown in FIG. 10, a groove 1316 is concavely disposed on the first surface 1311 of the protection part 131 toward the second surface 1312, and the connecting end 111 that is of the rigid member 110 and that is connected to the protection part 131 is located in the groove 1316 of the protection part 131. The connecting end 111 of the rigid member 110 can be embedded in the groove 1316 of the protection part 131, and a groove wall of the groove 1316 can prevent the rigid member 110 from shaking relative to the soft rubber member 130. This ensures stability of a connection between the rigid member 110 and the soft rubber member 130. It may be understood that, in another implementation of this application, there may be alternatively no groove 1316 on the protection part 131. The rigid member 110 is located on the side of the first surface 1311 of the protection part 131, and the second surface 1312 of the rigid member 110 is in contact with the first surface 1311 of the protection part 131.

Figure 15:
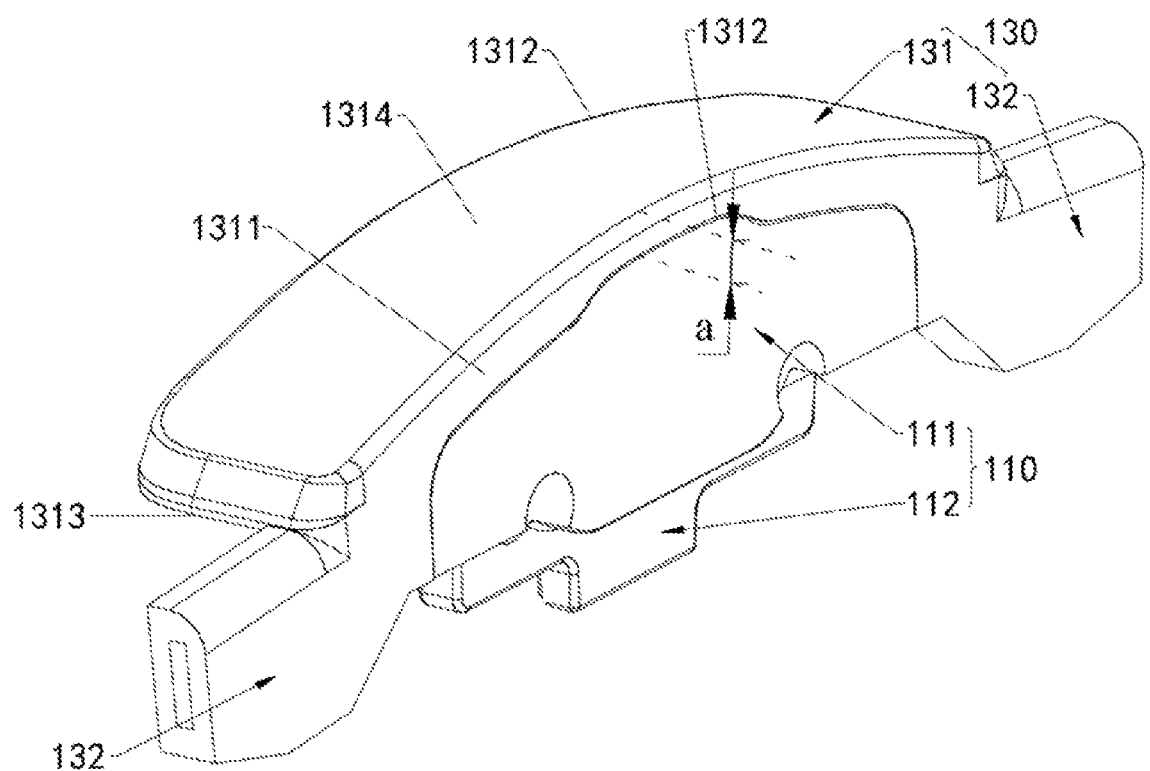
FIG. 15 is a schematic diagram of a structure of an edge protection structure according to a third implementation of this application.

In the implementation shown in FIG. 10, the groove 1316 extends to the fourth surface 1314 of the protection part 131. In this way, a notch is formed on a side that is of the fourth surface 1314 and that faces the first surface 1311. It may be understood that, in some other implementations of this application, the groove 1316 may alternatively not extend to the fourth surface 1314 of the protection part 131, that is, there can be a spacing between the groove 1316 and the fourth surface 1314. For example, FIG. 15 is a schematic diagram of a structure of the edge protection structure 100 according to a third implementation of this application. The structure of the edge protection structure 100 in this implementation is basically the same as the structure of the edge protection structure 100 shown in FIG. 10. A difference lies in that, in this implementation, there is a specific spacing a between the groove 1316 and the fourth surface 1314, and the rigid member 110 is embedded in the groove 1316.

Refer to FIG. 10 again. In some implementations of this application, the soft rubber member 130 further includes two fastening parts 132 that are respectively connected to the two ends of the protection part 131, and a part of the fastening part 132 is connected to the third surface 1313 of the protection part 131. Specifically, the fastening part 132 includes a first surface 1321 and a second surface 1322 that are disposed opposite to each other and a third surface 1323 connected between the first surface 1321 and the second surface 1322. In this implementation, a part of the third surface 1313 of the fastening part 132 is connected to the third surface 1313 of the protection part 131.

In this implementation, the fastening part 132 and the protection part 131 may be an integrated structure obtained through injection molding. In this implementation, because the fastening part 132 and the protection part 131 are an integrated structure, the fastening part 132 and the protection part 131 can be combined more firmly. This avoids separation between the fastening part 132 and the protection part 131 in a process of folding the foldable display terminal 1000, thereby ensuring quality of the foldable display terminal 1000. It may be understood that, in some other implementations of this application, the fastening part 132 and the protection part 131 may be alternatively fastened in another manner. For example, in some implementations, the fastening part 132 and the protection part 131 may be alternatively fastened through adhesive bonding.

It should be noted that, in some implementations of this application, the soft rubber member 130 may alternatively have only the protection part 131 and no fastening part 132.

In some implementations, a rigid plate 133 is further embedded in the fastening part 132. Strength of the rigid plate 133 is greater than strength of the fastening part 132. As a result, the strength of the fastening part 132 can be enhanced by using the rigid plate 133, to prevent the fastening part 132 from generating deformation. In some implementations of this application, the rigid plate 133 may be made of a metal material or another material.

In this implementation of this application, the connector 120 is configured to connect the rigid member 110 to the soft rubber member 130. The connector 120 is made of a non-elastic-deformation material and has specific strength, to achieve good connection effect. In this implementation, the connector 120 may be made of a metal material, a metal alloy material, or a rigid material, for example, a plastic material with high strength or a ceramic material.

Refer to FIG. 9 and FIG. 10. In this implementation, the connector 120 includes a first part 121 and a second part 122 that intersect. The first part 121 is connected to the protection part 131 of the soft rubber member 130, and the second part 122 is connected to the rigid member 110. This implements a connection between the rigid member 110 and the soft rubber member 130.

Specifically, in this implementation, the first part 121 vertically intersects with the second part 122. The first part 121 of the connector 120 is embedded in the protection part 131 of the soft rubber member 130. In this implementation, the first part 121 of the connector 120 and the soft rubber member 130 are an integrated structure that may be obtained by using an integrated molding technology. It should be noted that, in this application, that a component A and a component B are an integrated structure obtained by using an integrated molding technology means that, in a process of forming the component A or the component B, the component A and the component B are connected together, and the component A and the component B do not need to be connected together in a manner of reprocessing (for example, bonding, welding, a fastener connection, or a screw connection). In this implementation, the first part 121 of the connector 120 and the soft rubber member 130 are an integrated structure obtained through injection molding. Specifically, the formed connector 120 is put into a mold, and then a fused soft rubber material is filled into the mold. After the fused soft rubber material is cooled and solidified, the soft rubber member 130 in this implementation is formed. The first part 121 of the connector 120 is embedded into the protection part 131 of the soft rubber member 130, and forms an integrated structure with the protection part 131 of the soft rubber member 130. In this implementation, the soft rubber member 130 and the first part 121 of the connector 120 are formed into the integrated structure. This can ensure stable connection effect between the soft rubber member 130 and the connector 120, and ensures quality of the edge protection structure 100, to improve quality of the foldable display terminal 1000.

Refer to FIG. 10. In some implementations, a positioning hole 1211 is further disposed on the first part 121 of the connector 120. The positioning hole 1211 can facilitate positioning of the connector 120 in the mold. In addition, the first part 121 of the connector 120 and the protection part 131 of the soft rubber member 130 are formed into the integrated structure, and the positioning hole 1211 is also filled with the soft rubber material for forming the protection part 131. To be specific, a contact area between the first part 121 of the connector 120 and the protection part 131 of the soft rubber member 130 can be increased by using the positioning hole 1211, to further improve stability of a connection between the first part 121 of the connector 120 and the protection part 131 of the soft rubber member 130.

It may be understood that, in another implementation of this application, the soft rubber member 130 may be alternatively connected to the first part 121 of the connector 120 by using a connection technology, for example, an adhesive. For example, in some implementations, a groove that is concavely disposed toward the second surface 1312 is disposed on the first surface 1311 of the protection part 131 of the soft rubber member 130. The first part 121 of the connector 120 is inserted into the groove, and the first part 121 of the connector 120 is fastened to a groove wall of the groove by using the adhesive.

Figure 16:
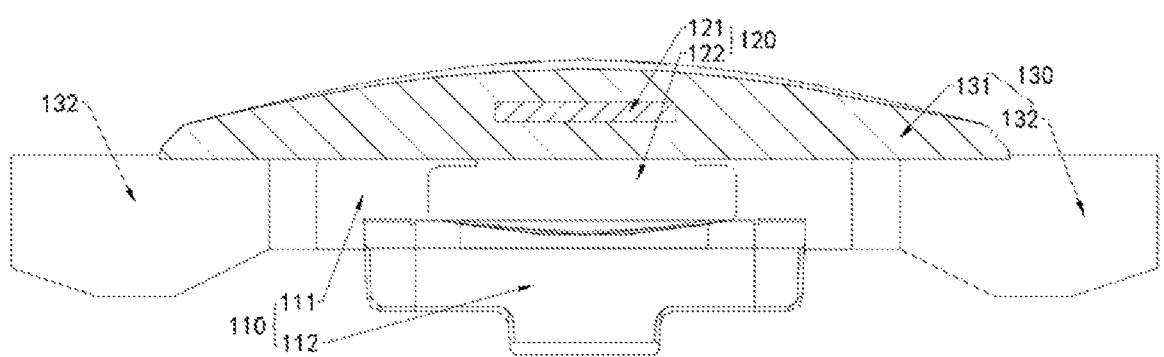
FIG. 16 is a cross sectional schematic view obtained through cutting along a position III-III shown in FIG. 8.

FIG. 16 is a cross sectional schematic view obtained through cutting along a position III-III shown in FIG. 8. In this implementation of this application, the first part 121 of the connector 120 is connected to the middle position of the protection part 131 of the soft rubber member 130. The connector 120 is a mechanical member having specific strength. Therefore, a position that is of the protection part 131 and that is connected to the first part 121 of the connector 120 does not generate elastic deformation, but another position of the protection part 131 can still generate elastic deformation. When the display 200 is folded, the two ends of the protection part 131 can be folded by using, as an axis, the position that is of the protection part 131 and that is connected to the first part 121 of the connector 120.

In this implementation, the second part 122 of the connector 120 is connected to the connecting end 111 of the rigid member 110. In this way, the rigid member 110 is connected to the soft rubber member 130 by using the connector 120. Specifically, in this implementation, the connector 120 is in contact with the second surface 1112 of the rigid member 110, and the connector 120 is bonded and fastened to the second surface 1312 of the rigid member 110 by using an adhesive. This implements a fixed connection between the rigid member 110 and the connector 120.

Refer to FIG. 10 again. In some implementations of this application, a groove 1116 is concavely disposed on the second surface 1112 of the connecting end 111 of the rigid member 110 toward the first surface 1111. The second part 122 of the connector 120 can be embedded in the groove 1116, and the second part 122 of the connector 120 is bonded to an inner wall of the groove 1116 by using an adhesive. In this implementation, the groove 1116 is disposed at the connecting end 111 of the rigid member 110. In this way, the adhesive used to glue the rigid member 110 and the connector 120 can be accommodated at a position of the groove 1116, and is unlikely to flow to another position that does not need to be connected to the second part 122 of the connector 120. This can ensure that the adhesive can effectively bond and fasten the second part 122 of the connector 120 to the inner wall of the groove 1116. In addition, because the groove 1116 is disposed, a groove wall of the groove 1116 can limit shaking of the second part 122 of the connector 120 in various directions in the groove 1116. This reduces a problem that the second part 122 may be separated from the rigid member 110 when the foldable display terminal 1000 is collided.

It may be understood that, in some other implementations of this application, the second part 122 of the connector 120 may be alternatively connected to the connecting end 111 of the rigid member 110 in various manners such as a screw, solder welding, or a fastener connection. This is not specifically limited in this application.

Figure 17:
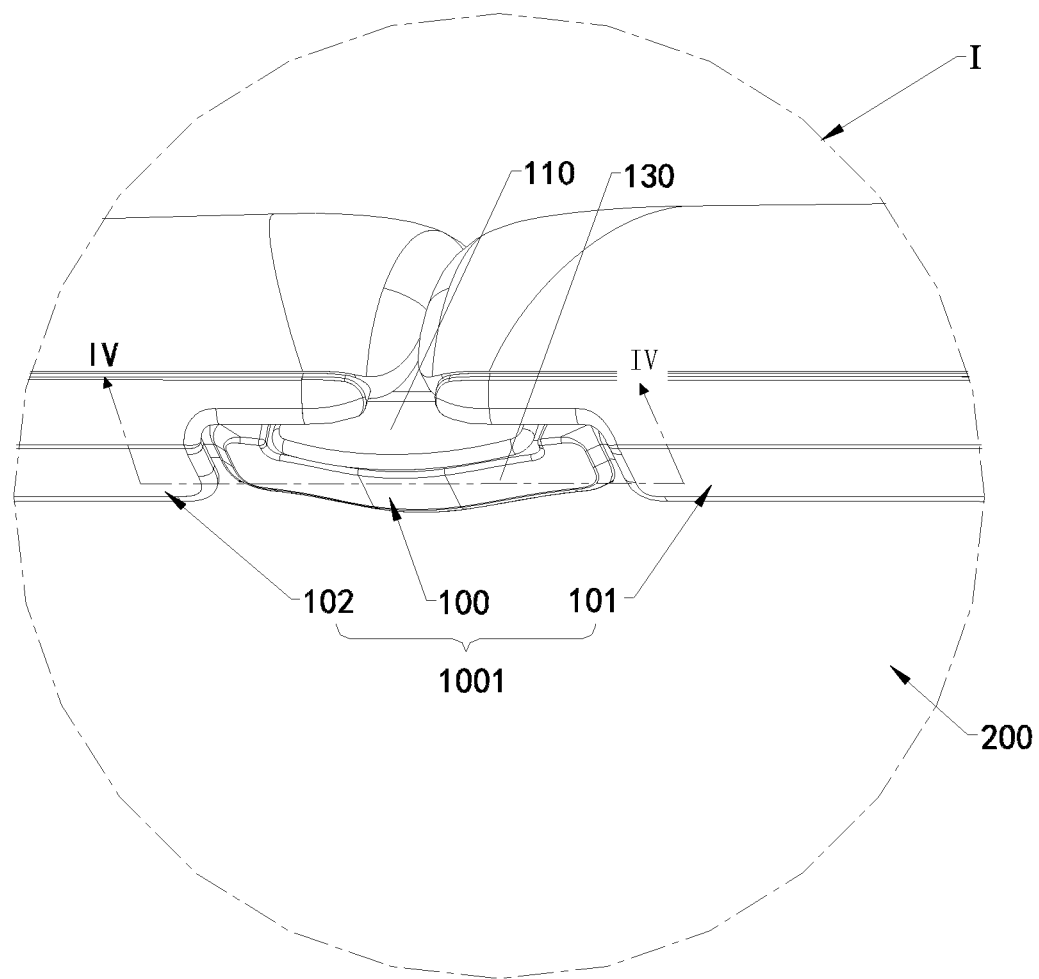
FIG. 17 is a schematic enlarged view of a position I shown in FIG. 1.
Figure 18:
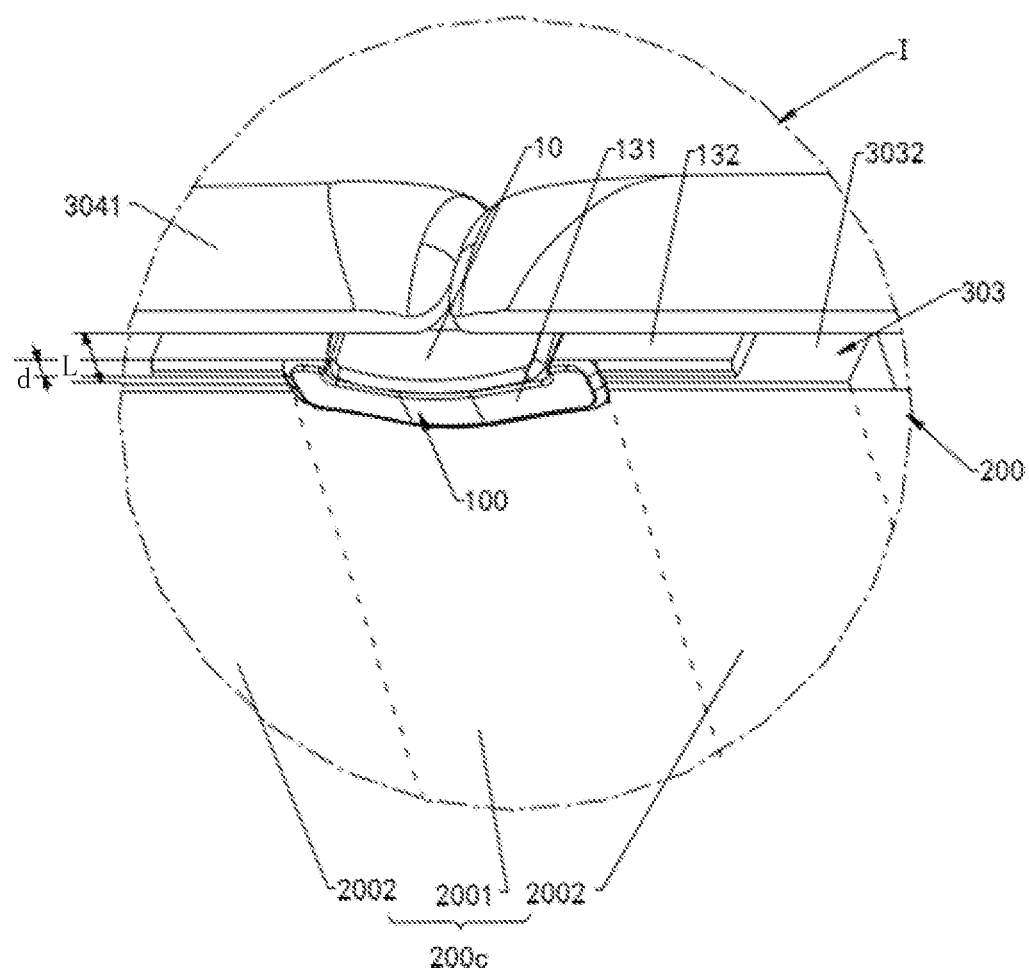
FIG. 18 is a schematic diagram of a position relationship between the edge protection structure shown in FIG. 8 and another structure of a foldable display terminal.
Figure 19:
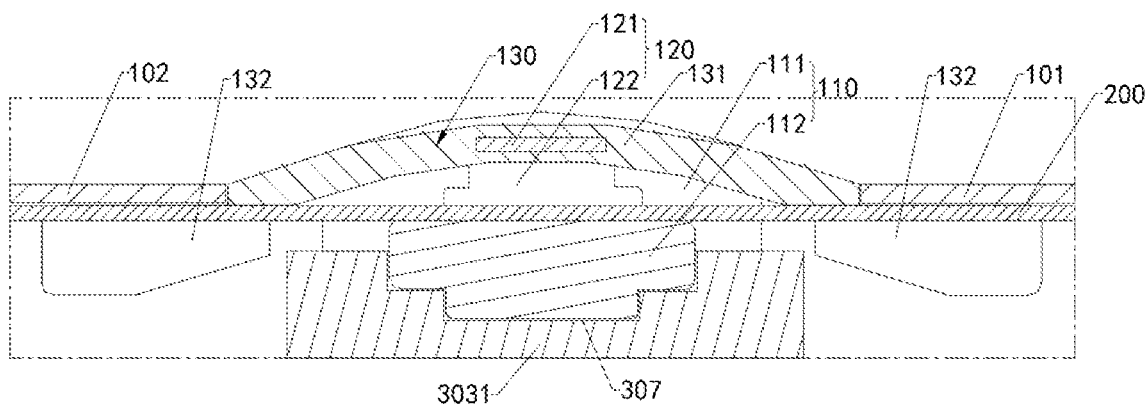
FIG. 19 is a partial cross sectional schematic view obtained through cutting along a position IV-IV in FIG. 17.

Refer to FIG. 17, FIG. 18, and FIG. 19. FIG. 17 is a schematic enlarged view of a position I shown in FIG. 1. FIG. 18 is a schematic diagram of a position relationship between the edge protection structure 100 shown in FIG. 8 and another structure of the foldable display terminal 1000. FIG. 19 is a partial cross sectional schematic view obtained through cutting along a position IV-IV in FIG. 17. In this implementation, the rigid member 110 of the edge protection structure 100 is located on one side of the side surface 204 of the display 200, and the protection part 131 of the edge protection structure 100 is located on one side of the display surface 203 of the display 200. To be specific, the protection part 131 is located on a side that is of the display 200 and that backs onto the rotating shaft assembly 303, and covers the edge of the bending region 2001 of the display 200. In this case, the edge of the bending region 2001 of the display 200 can be wrapped by the rigid member 110 and the protection part 131 of the soft rubber member 130, to prevent the edge of the bending region 2001 of the display 200 from being exposed. This improves the appearance effect of the foldable display terminal 1000, and can reduce the case that external water, dust, and the like penetrate into the display 200 or the foldable display terminal 1000 through the edge of the bending region 2001 of the display 200, thereby improving reliability of the display 200 and the foldable display terminal 1000.

In addition, the edge of the bending region of the display 200 is wrapped by the rigid member 110 and the soft rubber member 130. Therefore, when the foldable display terminal 1000 is collided, an edge position of the bending region 2001 of the display 200 is protected by the edge protection structure 100, and therefore is unlikely to be damaged due to the collision. This further improves reliability of the foldable display terminal 1000. In some implementations of this application, there is a specific gap between the edge of the bending region 2001 of the display 200 and the rigid member 110. When the foldable display terminal 1000 is collided, collision force acts on the rigid member 110, and is also unlikely to be transferred to the display 200 to damage the display 200. This further improves reliability of the foldable display terminal 1000.

Figure 20:
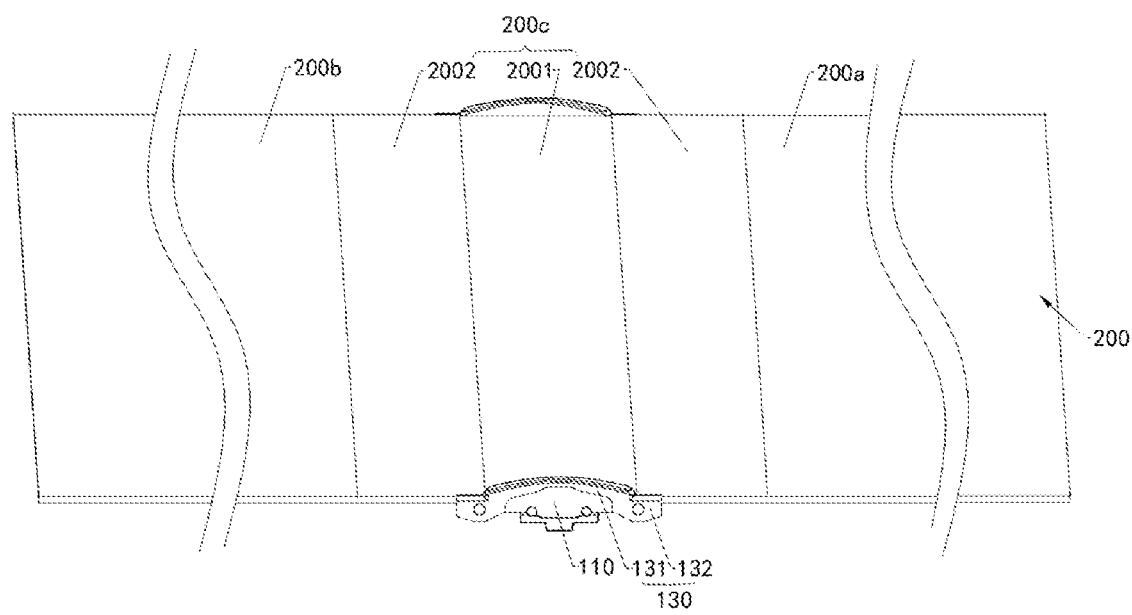
FIG. 20 is a schematic diagram of a structure state of a display and an edge protection structure of a foldable display terminal according to an implementation of this application when the foldable display terminal is in the unfolded state shown in FIG. 1.
Figure 21:
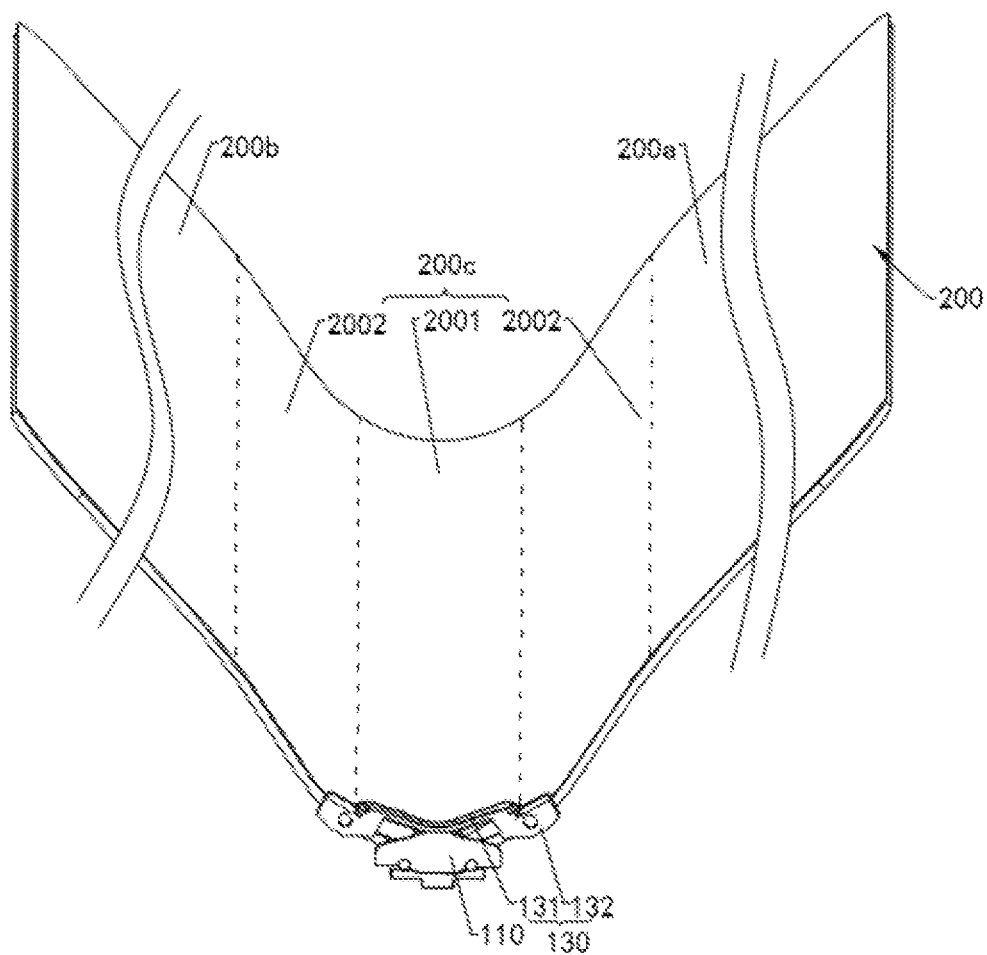
FIG. 21 is a schematic diagram of a structure state of a display and an edge protection structure of a foldable display terminal according to an implementation of this application when the foldable display terminal is folded to the intermediate state shown in FIG. 2.
Figure 22:
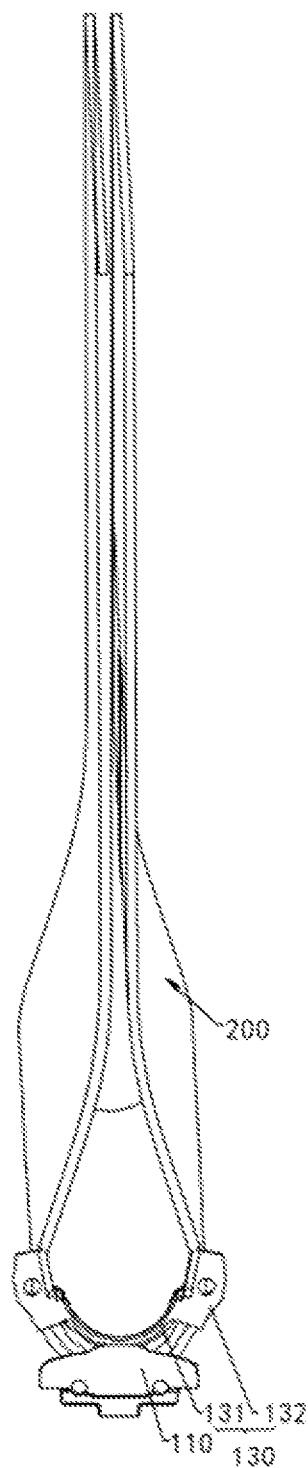
FIG. 22 is a schematic diagram of a structure state of a display and an edge protection structure of a foldable display terminal according to an implementation of this application when the foldable display terminal is folded to the fully closed state shown in FIG. 3.

In this implementation of this application, the rigid member 110 of the edge protection structure 100 is made of a material with high strength (for example, a metal material), and can achieve good anti-collision effect, to achieve good protection effect for the display 200. In addition, in this implementation of this application, the soft rubber member 130 of the edge protection structure 100 is made of a soft rubber material having elastic deformation performance, and the protection part 131 of the soft rubber member 130 covers the edge of the bending region 2001 of the display 200. When the foldable display terminal 1000 is folded, the ends of the first body 301 and the second body 302 of the foldable display terminal 1000 that are away from the rotating shaft assembly 303 are close to each other, to drive the display 200, that is fastened to the first body 301 and the second body 302, to fold. In this implementation, when the display 200 is folded, the protection part 131 covering the edge of the rotating shaft region 200c of the display 200 can be bent and deformed with the display 200. In this implementation, the soft rubber member 130 is made of the elastically deformable soft rubber material, basically does not affect a state of the display 200 when the display 200 is bent, but can correspondingly change a shape with the bending state of the display 200 when the display 200 is bent. Therefore, when the display 200 in this implementation of this application is fully folded, the first fastening region 200a and the second fastening region 200b of the display 200 can be attached together, and the rotating shaft region 200c of the display 200 can be naturally bent in a water drop shape. In other words, in this implementation, the edge protection structure 100 disposed in the foldable display terminal 1000 is provided, to protect the edge of the bending region 100c of the display 100 of the foldable display terminal 1000, and improve the appearance effect of the foldable display terminal 1000, without affecting folding of the display 100 of the foldable display terminal 100 and reliability of the display 200. Refer to FIG. 20 to FIG. 22. FIG. 20 is a schematic diagram of a structure state of the display 200 and the edge protection structure 100 of the foldable display terminal 1000 according to an implementation of this application when the foldable display terminal 1000 is in the unfolded state shown in FIG. 1. FIG. 21 is a schematic diagram of a structure state of the display 200 and the edge protection structure 100 of the foldable display terminal 1000 according to an implementation of this application when the foldable display terminal 1000 is folded to the intermediate state shown in FIG. 2. FIG. 22 is a schematic diagram of a structure state of the display 200 and the edge protection structure 100 of the foldable display terminal 1000 according to an implementation of this application when the foldable display terminal 1000 is folded to the fully closed state shown in FIG. 3.

Refer to FIG. 18 and FIG. 19 again. In this implementation of this application, the two fastening parts 132 of the soft rubber member 130 are respectively a first fastening part and a second fastening part. The first fastening part is disposed between the first rotating shaft of the rotating shaft assembly 303 and the first border, and is located on a surface that is of the first edge protector 101 and that faces the display 200. The second fastening part is disposed between the second rotating shaft of the rotating shaft assembly 303 and the second border of the second body 302, and is located on a surface that is of the second edge protector 102 and that faces the display 200. In this implementation, the two fastening parts 132 (namely, the first fastening part and the second fastening part) of the soft rubber member 130 are respectively pressed by the first edge protector 101 and the second edge protector 102. Therefore, a problem that the two ends of the protection part 131 tilt because the protection part 131 generates plastic deformation after being folded and unfolded with the display 200 for a plurality of times can be avoided.

Refer to FIG. 18. In some implementations of this application, there is a gap L between the first rotating shaft and the first border of the first body 301 and a gap L between the second rotating shaft and the second border of the second body 302. The gap L is greater than a thickness d of the fastening part 132. This facilitates assembly of the fastening part 132. However, the gap L cannot be excessively large, to limit the fastening part 132 to specific space. This prevents the fastening part 132 from being possibly deformed and stuck between the border 3041 and the rotating shaft 3032 in a process of folding or unfolding the foldable display terminal 1000, thereby ensuring the appearance effect of the foldable display terminal 1000 and protection effect for the edge of the rotating shaft region 200c of the display 200. In some implementations of this application, the gap L is less than two times the thickness d of the fastening part 132.

Figure 23:
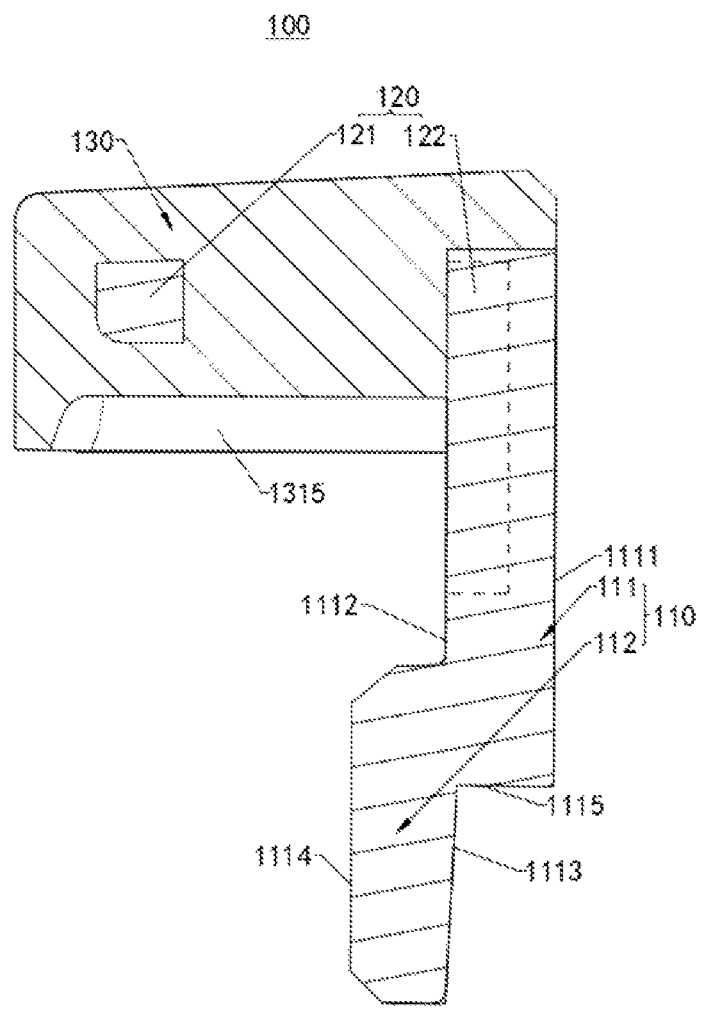
FIG. 23 is a cross sectional view of an edge protection structure according to a fourth implementation of this application.

FIG. 23 is a cross sectional view of the edge protection structure 100 according to a fourth implementation of this application. A structure of the edge protection structure 100 in this implementation is basically the same as the structure of the edge protection structure 100 shown in FIG. 10. A difference between the edge protection structure 100 in this implementation and the edge protection structure 100 shown in FIG. 10 lies in that, in this implementation, the second part 122 of the connector 120 and the connecting end 111 of the rigid member 110 are an integrated structure obtained in a manner of integrated molding, and the formed rigid member 110 and the formed connector 120 do not need to be fastened together in a fastening manner, for example, an adhesive, welding, a screw, or a fastener. In this way the rigid member 110 and the connector 120 can be connected more firmly. In this implementation of this application, because the soft rubber member 130 and the first part 121 of the connector 120 are also an integrated structure obtained by using an integrated molding technology, the soft rubber member 130 and the rigid member 110 are more stably connected by using the connector 120. Specifically, in this implementation, the connector 120 and the rigid member 110 are made of a same type of metal material. The rigid member 110 and the connector 120 are obtained through integrated molding in a manner of metal injection molding (IIM), so that the connector 120 and the second part 122 of the rigid member 110 are an integrated structure, to connect the second part 122 of the connector 120 to the connecting end 111 of the rigid member 110. In this case, the first part 121 of the connector 120 protrudes from the surface of the rigid member 110. Then, the connector 120 and the rigid member 110 that are an integrated structure are put into a mold, and a fused soft rubber material is filled in the mold. After the fused soft rubber material is cooled and solidified, the soft rubber member 130 in this implementation is formed, and the first part 121 of the connector 120 is embedded in the soft rubber member 130. The soft rubber member 130 and the first part 121 of the connector 120 are formed into an integrated structure. It should be noted that, in this implementation, because the connector 120 and the rigid member 110 are a structure made of the same material, the second part 122 of the connector 120 and the rigid member 110 are formed as a whole when being integrated. In this case, the second part 122 of the connector 120 and the rigid member 110 are manually divided for ease of understanding, and no actual division interface exists. It may be understood that, in another implementation of this application, the integrated structure of the connector 120 and the rigid member 110 may be alternatively obtained in a manner, for example, computer numerical control machining molding or die casting molding.

Figure 24:
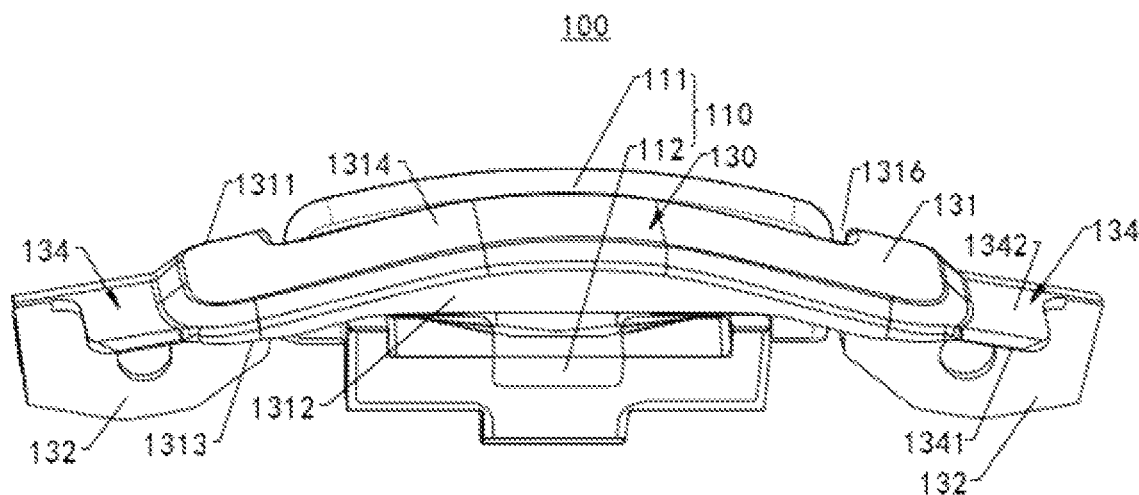
FIG. 24 is a schematic diagram of a structure of an edge protection structure according to a fifth implementation of this application.
Figure 25:
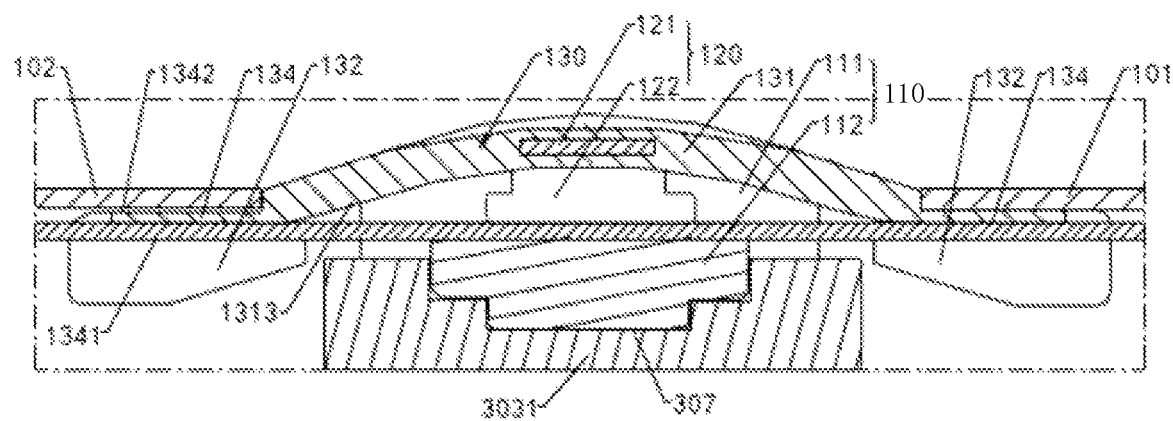
FIG. 25 is a partial cross sectional schematic view of a foldable display terminal when the edge protection structure shown in FIG. 24 is mounted in the foldable display terminal instead of an edge protection structure in FIG. 1 and the foldable display terminal is cut along a position IV-IV shown in FIG. 17.

Refer to FIG. 24 and FIG. 25. FIG. 24 is a schematic diagram of a structure of the edge protection structure 100 according to a fifth implementation of this application. FIG. 25 is a partial cross sectional schematic view of the foldable display terminal 1000 when the edge protection structure 100 shown in FIG. 24 is mounted in the foldable display terminal 1000 instead of the edge protection structure 100 in FIG. 1 and the foldable display terminal 1000 is cut along a position IV-IV shown in FIG. 17. The edge protection structure 100 in this implementation is basically the same as the edge protection structure 100 shown in FIG. 8. A difference between the edge protection structure 100 in this implementation and the edge protection structure 100 shown in FIG. 8 lies in that, in this implementation, the soft rubber member 130 of the edge protection structure 100 further includes two extension parts 134, and the two extension parts 134 are respectively connected to the two ends of the protection part 131. When the edge protection structure 100 in this implementation is applied to the foldable display terminal 1000, one extension part 134 of the soft rubber member 130 is pressed on the surface that is of the first edge protector 101 and that faces the display 200, and the other extension part 134 is pressed on the surface that is of the second edge protector 102 and that faces the display 200. This can further maintain a shape of the protection part 131, and avoid a problem that the two ends of the protection part 131 tilt because the protection part 131 is bent with the display 200 for a plurality of times.

In this implementation, a width of the extension part 134 is basically the same as a width of the protection part 131. A width direction of the extension part 134 and a width direction of the protection part 131 are both a direction from the first surface 1311 to the second surface 1312 of the protection part 131. In this implementation, the width of the extension part 134 is basically the same as the width of the protection part 131. Therefore, when the extension part 134 is pressed on the surface that is of the first edge protector 101 or the second edge protector 102 and that faces the display 200, positions of the protection part 131 in the width direction are stretched by the extension parts 134 connected to the two ends of the protection part 131. This ensures that the positions of the two ends of the protection part 131 are unlikely to tilt.

The extension part 134 includes a contact surface 1341 and a fastening surface 1342, and the contact surface 1341 faces the display 200 and is in contact with the display 200. The fastening surface 1342 is opposite to the contact surface 1341, and is in contact with the first edge protector 101 or the second edge protector 102. In this implementation, the contact surface 1341 is smoothly connected to the third surface 1313 of the protection part 131. This prevents the contact surface 31 and the third surface 1313 from generating a protrusion due to a large angle change at a position at which the contact surface 1341 is connected to the third surface 1313, to prevent the protrusion generated on the contact surface 31 and the third surface 1313 from generating large pressure for the display 200, so as to ensure that the display 200 is not damaged by the pressure of the soft rubber part 30.

Figure 26:
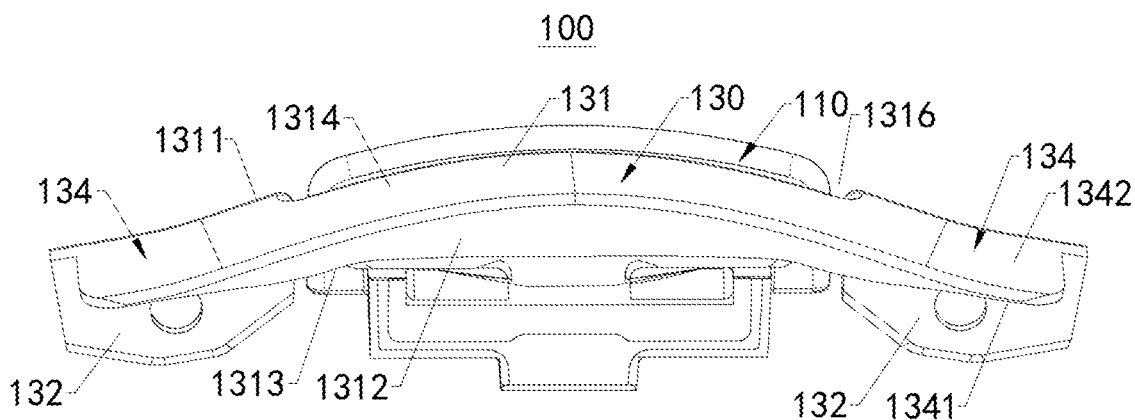
FIG. 26 is a schematic diagram of a structure of an edge protection structure according to a sixth implementation of this application.
Figure 27:
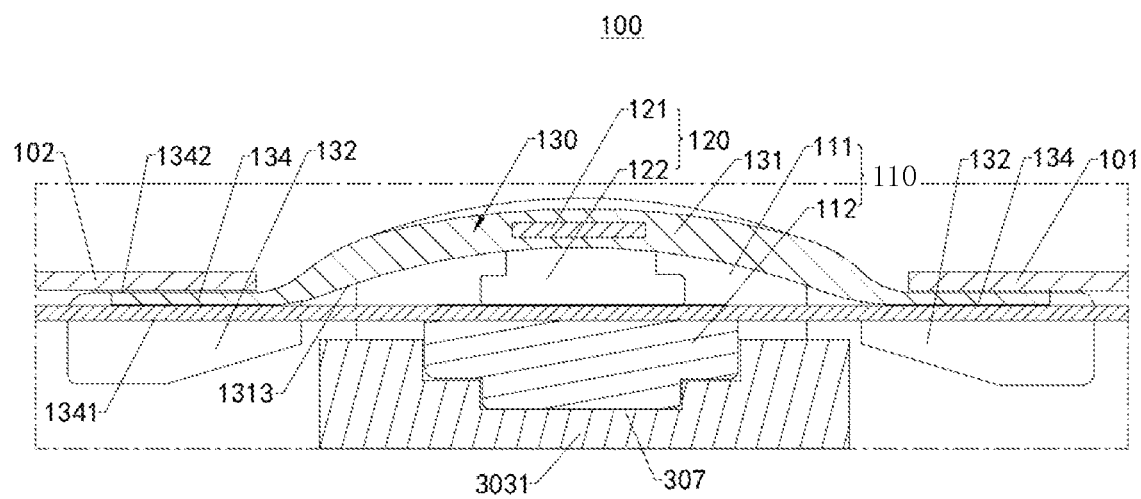
FIG. 27 is a partial cross sectional schematic view of a foldable display terminal when the edge protection structure shown in FIG. 26 is mounted in the foldable display terminal instead of an edge protection structure in FIG. 1 and the foldable display terminal is cut along a position IV-IV shown in FIG. 17.

Refer to FIG. 26 and FIG. 27. FIG. 26 is a schematic diagram of a structure of the edge protection structure 100 according to a sixth implementation of this application. FIG. 27 is a partial cross sectional schematic view of the foldable display terminal 1000 when the edge protection structure 100 shown in FIG. 26 is mounted in the foldable display terminal 1000 instead of the edge protection structure 100 in FIG. 1 and the foldable display terminal 1000 is cut along a position IV-IV shown in FIG. 17. The edge protection structure 100 in this implementation is basically the same as the edge protection structure 100 shown in FIG. 24. A difference between the edge protection structure 100 in this implementation and the edge protection structure 100 shown in FIG. 24 lies in that the fastening surface 341 of the extension part 134 is smoothly connected to the fourth surface 1314 of the protection part 131. This avoids a significant step change or angle change at a position at which the fastening surface 341 of the extension part 134 is connected to the fourth surface 1314 of the protection part 131, so that the edge protection structure 100 requires no high precision when being mounted on the rotating shaft assembly 303 and can still ensure that an outer surface of the foldable display terminal 1000 still has good appearance effect, to avoid a problem that an appearance is asymmetric or mounting of the first edge protector 101 or the second edge protector 102 is affected, because the edge protection structure 100 is mounted on the rotating shaft assembly 303 with low precision, when the position at which the fastening surface 341 of the extension part 134 is connected to the fourth surface 1314 of the protection part 131 has the significant step change or angle change.

Figure 28:
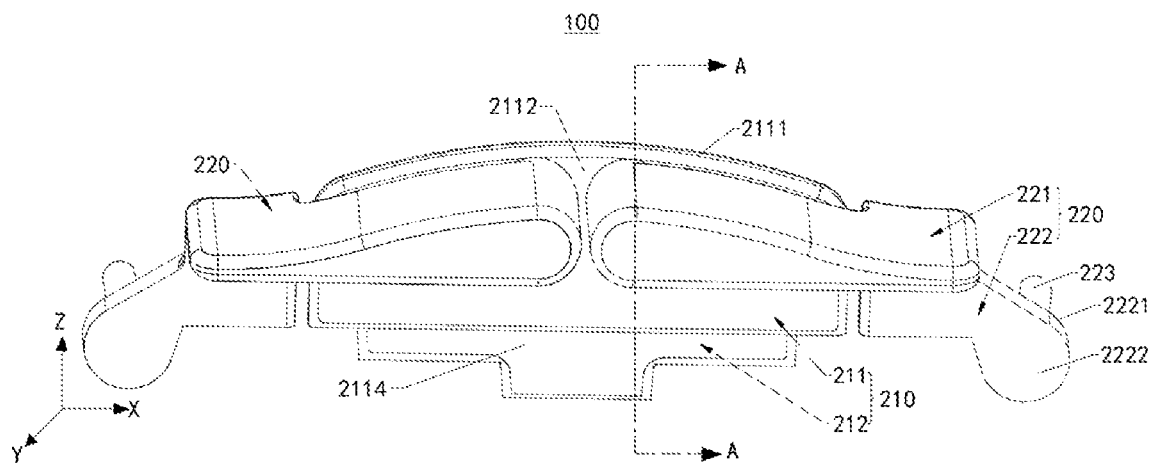
FIG. 28 is a schematic diagram of a structure of an edge protection structure according to a seventh implementation of this application.
Figure 29:
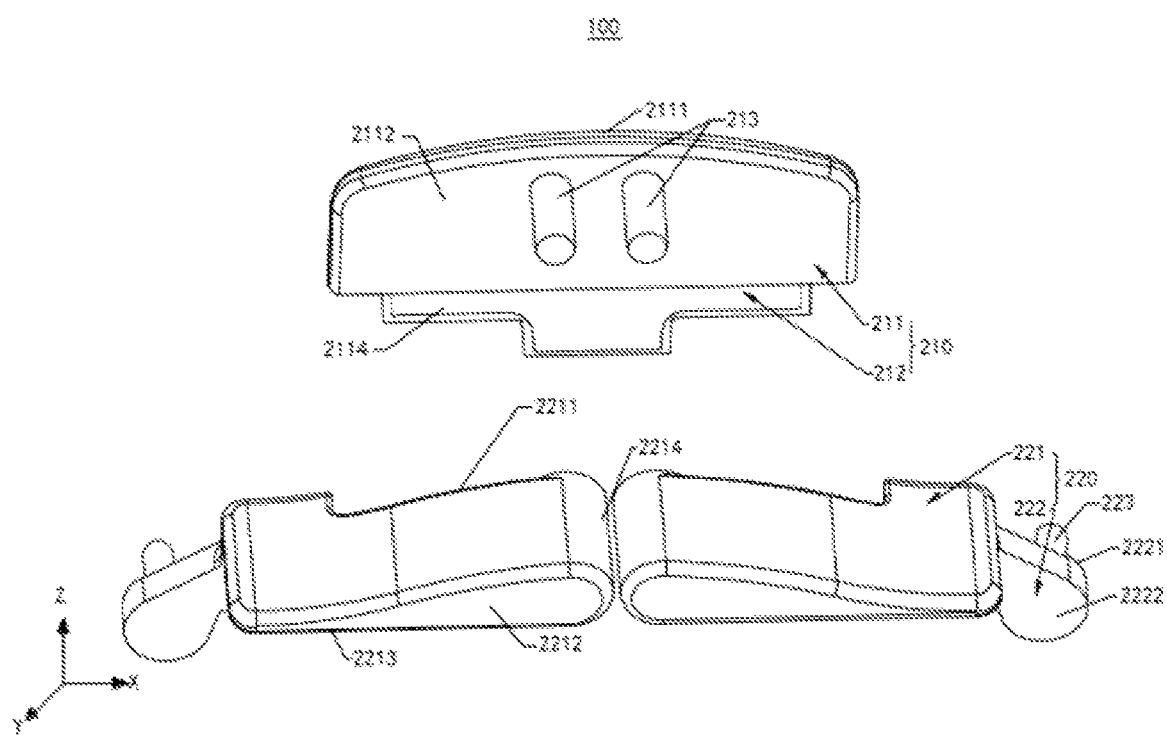
FIG. 29 is a schematic exploded view of the structure of the edge protection structure shown in FIG. 28.
Figure 30:
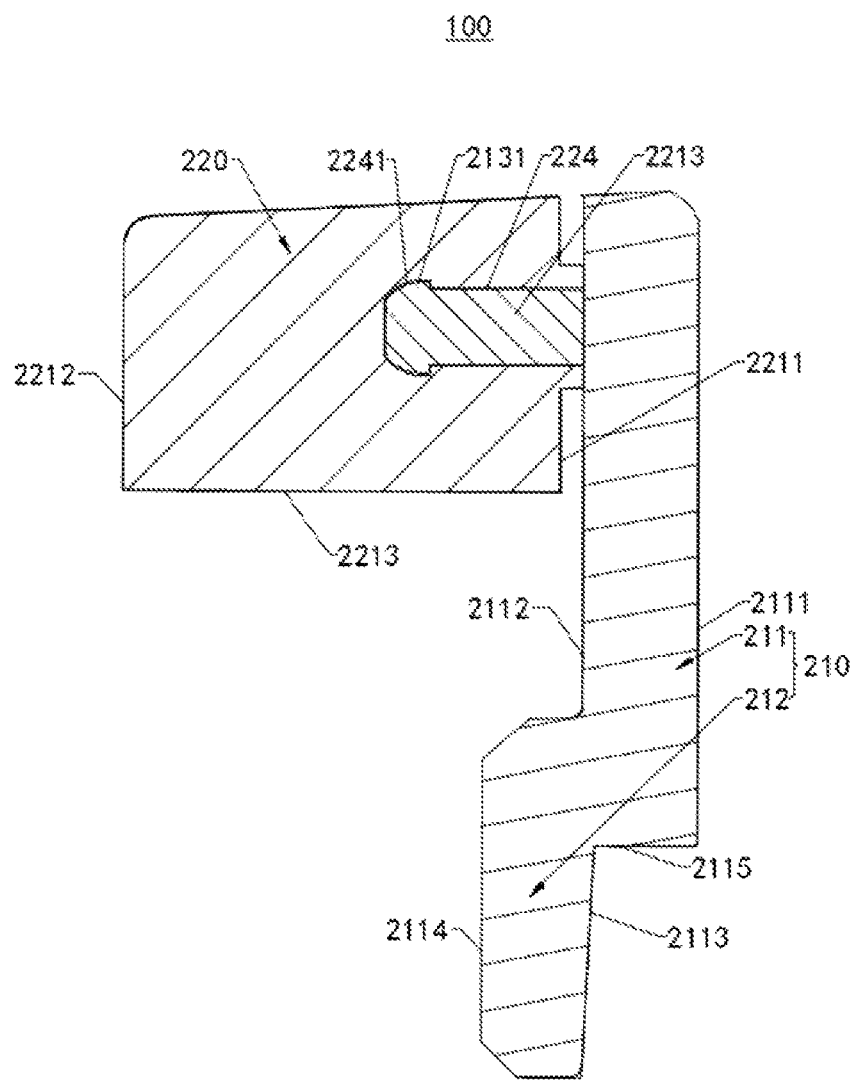
FIG. 30 is a cross sectional schematic view of the edge protection structure shown in FIG. 28 after the edge protection structure is cut along a position A-A.

In this application, the edge protection structure 100 may be alternatively another structure. Refer to FIG. 28, FIG. 29, and FIG. 30. FIG. 28 is a schematic diagram of a structure of the edge protection structure 100 according to a seventh implementation of this application. FIG. 29 is a schematic exploded view of the structure of the edge protection structure 100 shown in FIG. 28. FIG. 30 is a cross sectional schematic view of the edge protection structure 100 shown in FIG. 28 after the edge protection structure 100 is cut along a position A-A. In this implementation, the edge protection structure 100 includes a rigid member 210 and two rotating shaft members 220. One end of each of the two rotating shaft members 220 is rotatably connected to the rigid member 210, and the other end of each of the two rotating shaft members 220 is a free end. The rotating shaft member 220 can be rotated by using, as an axis, a position that is of the rotating shaft member 220 and that is connected to the rigid member 210. In this implementation, the rigid member 210 includes a connecting end 211 and a fastening end 212 connected to the connecting end 211. The fastening end 212 is configured to fixedly connect the rigid member 210, and the connecting end 211 is configured to connect the rotating shaft member 220. In this implementation of this application, the fastening end 212 and the connecting end 211 are an integrated structure. The fastening end 212 and the connecting end 211 are two parts divided for ease of describing a structure of the rigid member 210.

Figure 31:
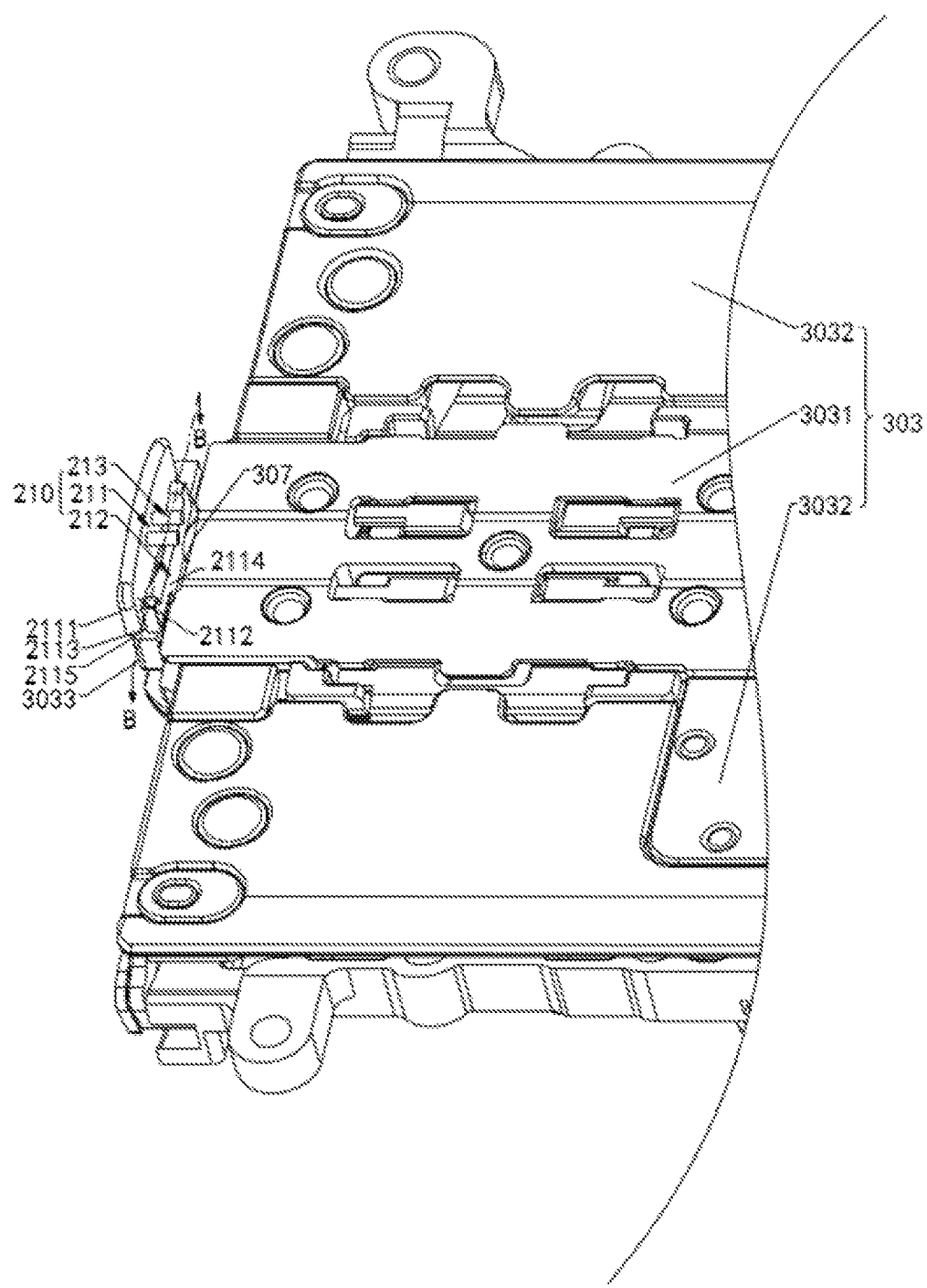
FIG. 31 is a schematic diagram of a partial structure when a rigid member of the edge protection structure shown in FIG. 28 is fastened to a rotating shaft assembly.
Figure 32:
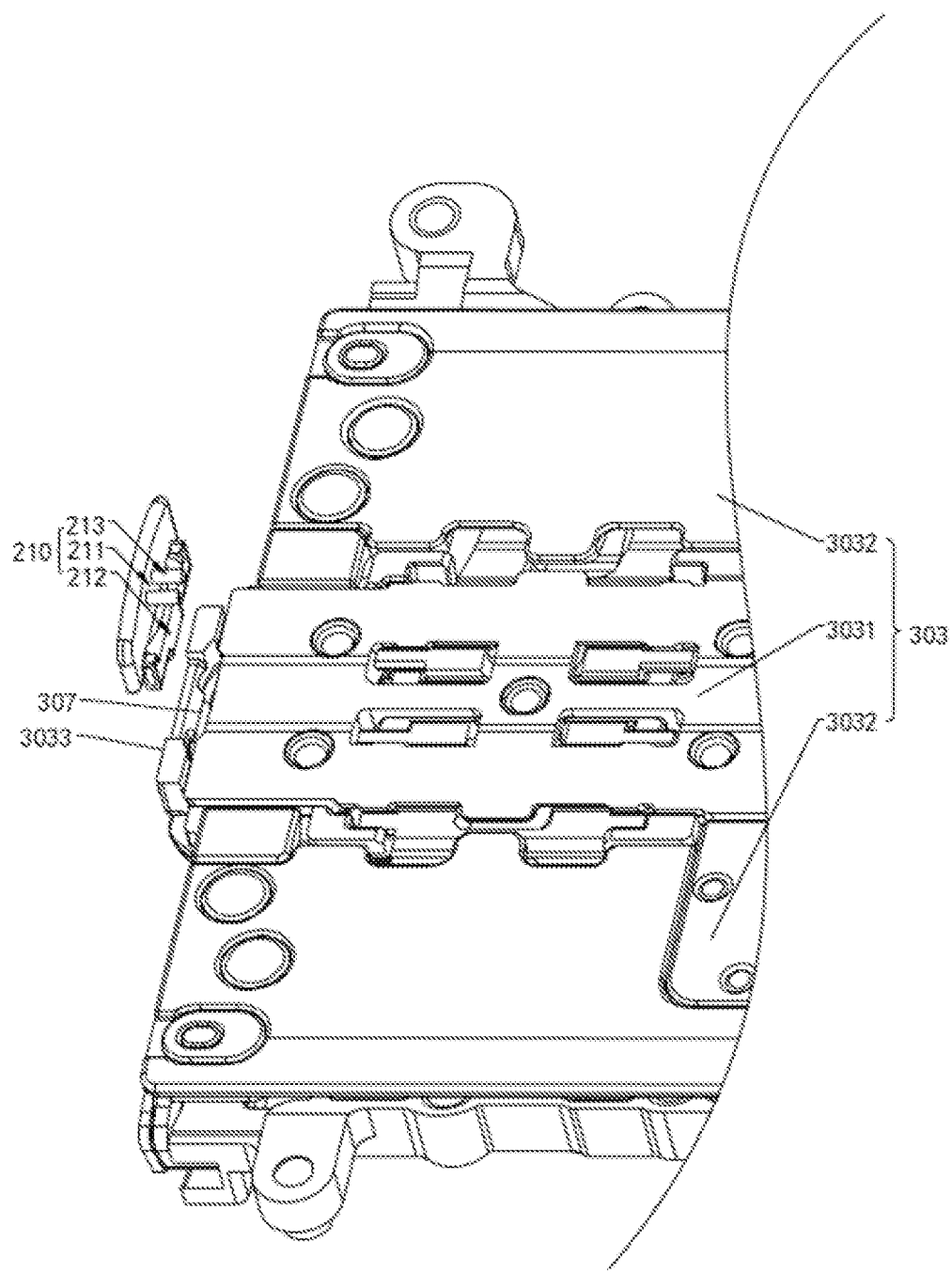
FIG. 32 is a schematic exploded view of a partial structure of a rigid member of the edge protection structure shown in FIG. 28 and a rotating shaft assembly.
Figure 33:
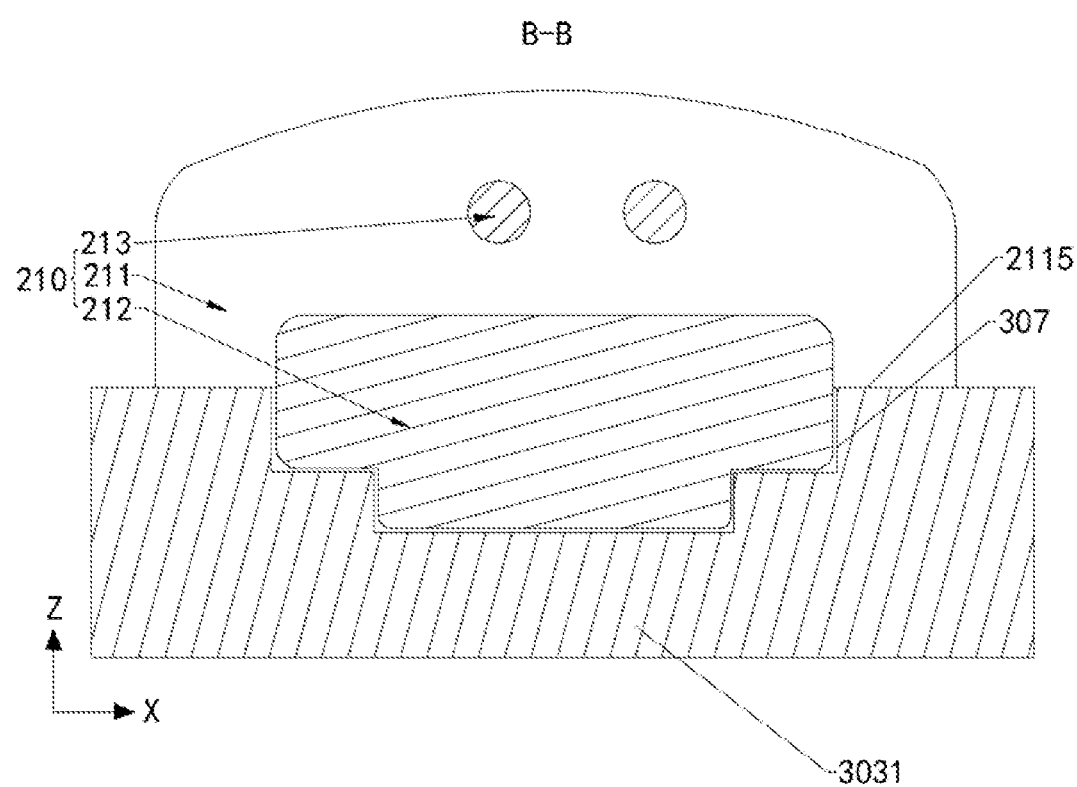
FIG. 33 is a cross sectional schematic view obtained through cutting along a position B-B in FIG. 31.

Refer to FIG. 31, FIG. 32, and FIG. 33. FIG. 31 is a schematic diagram of a partial structure when the rigid member 210 of the edge protection structure 100 shown in FIG. 28 is fastened to the rotating shaft assembly 303. FIG. 32 is a schematic exploded view of a partial structure of the rigid member 210 of the edge protection structure 100 shown in FIG. 28 and the rotating shaft assembly 303. FIG. 33 is a cross sectional schematic view obtained through cutting along a position B-B in FIG. 31. The fastening end 212 of the rigid member 210 is fastened to the stationary shaft 3031 of the rotating shaft assembly 303. In this way, the edge protection structure 100 is fastened to the rotating shaft assembly 303. In this implementation, the slots 307 are also disposed at the two ends of the stationary shaft 3031, and the fastening end 212 of the rigid member 210 is inserted into the slot 307 of the stationary shaft 3031 and fastened. This implements fastening between the rigid member 210 and the stationary shaft 3031. In this implementation, the fastening end 212 of the rigid member 210 is inserted into the slot 307, and is fastened to a slot wall of the slot 307 by using an adhesive. It may be understood that, in some other implementations of this application, the rigid member 210 may be alternatively fastened to the stationary shaft 3031 in another manner. For example, the rigid member 210 may be fastened to the stationary shaft 3031 in various manners such as buckling and screw fastening. Details are not described herein.

Refer to FIG. 30 again. A structure of the rigid member 210 in this implementation is basically the same as the structure of the rigid member 110 in the implementation shown in FIG. 10. In this implementation, the rigid member 210 is a plate-like structure. The connecting end 211 of the rigid member 210 includes a first surface 2111 and a second surface 2112 that are disposed opposite to each other. The first surface 2111 is closer to the outside of the foldable display terminal 1000 than the second surface 2112. The fastening end 212 of the rigid member 210 includes a third surface 2113 and a fourth surface 2114 that are disposed opposite to each other. The third surface 2113 is closer to the outside of the foldable display terminal 1000 than the fourth surface 2114. In this implementation, a stepped structure is formed at a position at which the connecting end 211 is connected to the fastening end 212 of the rigid member 210. To be specific, the first surface 2111 of the connecting end 211 and the third surface 2113 of the fastening end 212 are non-coplanarly disposed, and the first surface 2111 of the connecting end 211 is closer to the outside of the foldable display terminal 1000 than the third surface 2113 of the fastening end 212. The first surface 2111 of the connecting end 211 and the third surface 2113 of the fastening end 212 are connected by using a fifth surface 2115. Refer to FIG. 31 and FIG. 33. In this implementation, when the fastening end 212 of the rigid member 210 is inserted into the slot 307 of the stationary shaft 3031, the fifth surface 2115 of the rigid member 210 is in contact with a surface of the stationary shaft 3031. This ensures that the fastening end 212 of the rigid member 210 can be more stable when being inserted into the stationary shaft 3031. In addition, refer to FIG. 31 and FIG. 32. In some implementations, when the rigid member 210 is fastened to the stationary shaft 3031, the first surface 2111 of the connecting end 211 of the rigid member 210 is coplanar with an end surface 3033 of the stationary shaft 3031, so that the foldable display terminal 1000 can have a flat appearance, to have better appearance effect.

Refer to FIG. 33. In this implementation, a width of the fastening end 212 is less than a width of the connecting end 211. When the rigid member 210 is fastened to the stationary shaft 3031, a width direction of the fastening end 212 and a width direction of the connecting end 211 of the rigid member 210 are the same as a width direction of the stationary shaft 3031, and are a direction X in FIG. 33. When the fastening end 212 of the rigid member 210 is inserted into the slot 307 of the stationary shaft 3031, a part that is of the connecting end 211 and that exceeds the fastening end 212 in the width direction abuts against the surface of the stationary shaft 3031. This can further ensure that the fastening end 212 of the rigid member 210 can be more stable when being inserted into the slot 307 of the stationary shaft 3031, and is unlikely to shake to fall off.

Refer to FIG. 29 again. In this implementation, two connection columns 213 that are disposed at an interval and side by side are convexly disposed on the second surface 2112 of the rigid member 210, and an arrangement direction of the two connection columns 213 is the same as a width direction of the rigid member 210, and is an X-axis direction shown in FIG. 29. In addition, in this implementation, the connection column 213 is perpendicular to the second surface 2112 of the rigid member 210. In this implementation, the rigid member 210 and the connection column 213 protruding from the second surface 2112 of the rigid member 210 are an integral structure. This ensures a stable connection between the rigid member 210 and the connection column 213.

In this implementation, the rotating shaft member 220 includes a connecting rod 221 and a fastening part 222. The connecting rod 221 is a rod-like structure. One end of the connecting rod 221 is rotatably connected to the rigid member 210, and the other end of the connecting rod 221 is connected to the fastening part 222. The connecting rod 221 is rotatably connected to the rigid member 210, to implement a connection between the rotating shaft member 220 and the rigid member 210. When the foldable display terminal 1000 is in the unfolded state shown in FIG. 1, extension directions of the connecting rods 221 of the two rotating shaft members 220 are both the width direction of the rigid member 210 (namely, an X-axis direction shown in FIG. 8). In this implementation, a rotating shaft of the connecting rod 221 vertically intersects with the rigid member 210, that is, an extension direction of the rotating shaft of the connecting rod 221 is perpendicular to the second surface 2112 of the rigid member 210. It may be understood that, in another implementation of this application, the rotating shaft of the connecting rod 221 may alternatively intersect with the rigid member 210 at a specific angle, that is, an extension direction of the rotating shaft of the connecting rod 221 does not vertically intersect with the second surface 2112 of the rigid member 210.

In this implementation of this application, the connecting rod 221 and the fastening part 222 are an integrated structure obtained through integrated molding, and there is no clear boundary between the connecting rod 221 and the fastening part 222. The connecting rod 221 and the fastening part 222 of the integrated structure obtained in a molding manner of integrated molding can ensure a firmer connection relationship between the connecting rod 221 and the fastening part 222, and can simplify a molding process of the rotating shaft member 220.

In this implementation, the connecting rod 221 includes a first rod surface 2211 and a second rod surface 2212 that are arranged opposite to each other. The first rod surface 2211 faces the rigid member 210, and the second rod surface 2212 is away from the rigid member 210.

Refer to FIG. 29 and FIG. 30 together. In this implementation, a slotted hole 224 is disposed on the first rod surface 2211 toward the second rod surface 2212, and the slotted hole 224 is located at one end that is of the connecting rod 221 and that is away from the fastening part 222. The connection column 213 on the rigid member 210 can be embedded in the slotted hole 224, and can be rotated in the slotted hole 224. This implements rotation of the rotating shaft member 220 and the rigid member 210, thereby implementing rotation of the connecting rod 221 relative to the rigid member 210 by using the connection column 213 as a rotation axis, and implementing rotatable connection between the rotating shaft member 220 and the rigid member 210. In this implementation, the connection column 213 and the slotted hole 224 on the rotating shaft member 220 are both cylindrical, to facilitate rotation of the connection column 213 in the slotted hole 224.

In this implementation, an extension direction of the slotted hole 224 is perpendicular to the second surface 2112 of the rigid member 210, and the connection column 213 is perpendicular to the second surface 2112 of the rigid member 210. In this way, the connection column 213 is inserted into the slotted hole 224 to implement a connection between the connecting rod 221 and the rigid member 210. The rotating shaft of the connecting rod 221 is the connection column 213, and a direction of the rotating shaft of the connecting rod 221 is perpendicular to the rigid member 210.

It may be understood that, in some other implementations of this application, the connecting rod 221 may be alternatively rotatably connected to the rigid member 210 in another manner. For example, in some implementations, the connecting rod 221 and the rigid member 210 may be twisted by using a hinge, to implement the connection between the connecting rod 221 and the rigid member 210. Alternatively, in some implementations, a connection column 213 may be convexly disposed on the second surface 2112 of the rigid member 210, and a slotted hole 224 is disposed on an end that is of the connecting rod 221 and that is away from the fastening part 222. The connection column 213 is inserted into the slotted hole 224, and the connection column 213 can be rotated in the slotted hole 224. This implements a rotatable connection between the rotating shaft member 220 and the rigid member 210.

Refer to FIG. 30. In some implementations, a convex ring 2131 is further convexly disposed on a peripheral wall of the connection column 213, and a concave ring 2241 matching the convex ring 2131 is concavely disposed on an inner wall of the slotted hole 224. The convex ring 2131 is embedded in the concave ring 2241, to limit movement of the rotating shaft member 220 in an axial direction of the connection column 213. This ensures the stable connection between the rotating shaft member 220 and the rigid member 210, prevents the rotating shaft member 220 from being separated from the rigid member 210 in a rotation process, and does not affect rotation of the rotating shaft member 220 relative to the rigid member 210.

In some implementations, a surface of the convex ring 2131 may be a cambered surface. In this way, the connection column 213 can be more easily mounted into the slotted hole 224.

Refer to FIG. 30. In some implementations, there is a gap between the first rod surface 2211 and the rigid member 210. In this way, it can be ensured that no friction is generated between the connecting rod 221 and the rigid member 210 when the rotating shaft member 220 is rotated, to ensure smooth rotation of the rotating shaft member 220, and avoid damage caused by friction generated between the connecting rod 221 and the rigid member 210. In some implementations, the first rod surface 2211 of the connecting rod 221 is parallel to the second surface 2112 of the rigid member 210. This ensures that distances between positions of the first rod surface 2211 of the connecting rod 221 and positions of the second surface 2112 of the rigid member 210 are the same, and reduces a size of a gap between the connecting rod 221 and the rigid member 210, thereby reducing a case that external impurities such as water and dust enter the foldable display terminal 1000 through the gap between the connecting rod 221 and the rigid member 210.

The connecting rod 221 further includes a third rod surface 2213, and the third rod surface 2213 is connected between the first rod surface 2211 and the second rod surface 2212.

Figure 34:
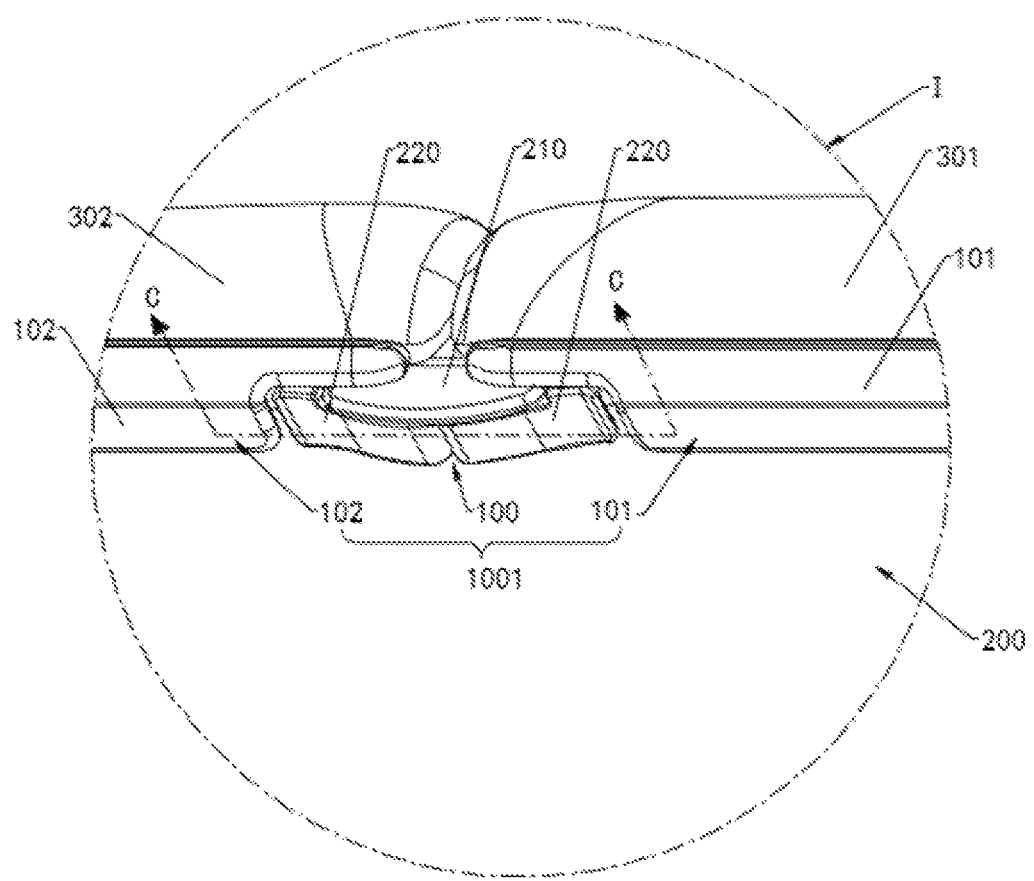
FIG. 34 is a schematic enlarged view of a position I of a foldable display terminal after an edge protection structure in the foldable display terminal shown in FIG. 1 is replaced with the edge protection structure shown in FIG. 28.
Figure 35:
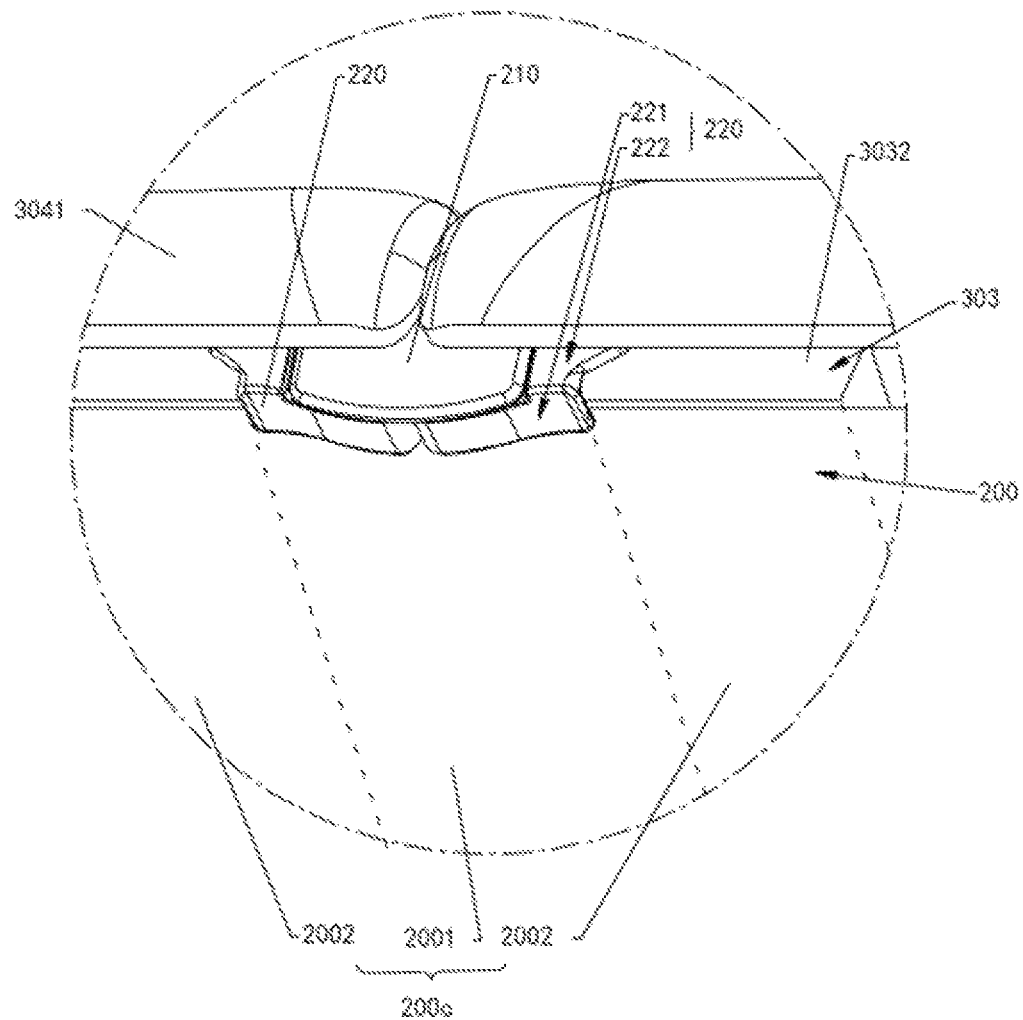
FIG. 35 is a schematic diagram of a position relationship between the edge protection structure shown in FIG. 28 and another structure of a foldable display terminal after an edge protection structure in the foldable display terminal shown in FIG. 1 is replaced with the edge protection structure.
Figure 36:
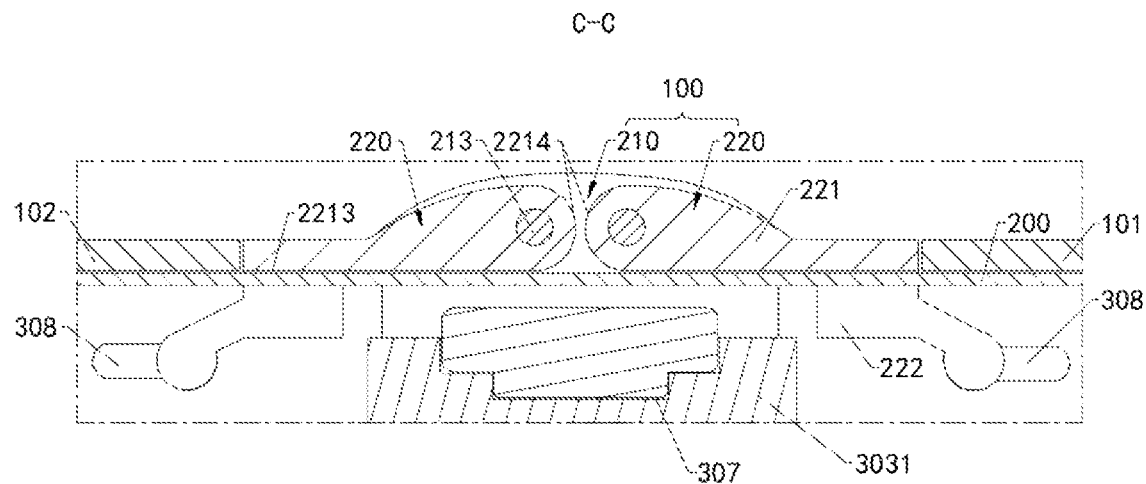
FIG. 36 is a partial cross sectional schematic view obtained through cutting along a position C-C in FIG. 34.

Refer to FIG. 34, FIG. 35, and FIG. 36. FIG. 34 is a schematic enlarged view of a position I of the foldable display terminal 1000 shown in FIG. 1 after the edge protection structure 100 in the foldable display terminal 1000 is replaced with the edge protection structure 100 shown in FIG. 28. FIG. 35 is a schematic diagram of a position relationship between the edge protection structure 100 shown in FIG. 28 and another structure of the foldable display terminal 1000 shown in FIG. 1 after the edge protection structure 100 in the foldable display terminal 1000 is replaced with the edge protection structure 100. FIG. 36 is a partial cross sectional schematic view obtained through cutting along a position C-C in FIG. 34. When the edge protection structure 100 is fastened to the rotating shaft assembly 303, the fastening end 212 of the rigid member 210 of the edge protection structure 100 is fastened to the stationary shaft 3031 of the rotating shaft assembly 303. The connecting ends 211 of the rigid members 210 of the two edge protection structures 100 are separately located on one side of the side surface 204 of the display 200, and are located in a length extension direction of the bending region 2001 of the display 200. The connecting rods 221 of the two edge protection structures 100 are both located on one side of the display surface 203 of the display 200. To be specific, the connecting rod 221 is located on a side that is of the display 200 and that is away from the stationary shaft 3031, and the third rod surface 2213 of the connecting rod 221 faces the display 200. The connecting rod 221 covers the edge of the bending region 2001 of the display 200. In this implementation of this application, the rigid member 210 is located on the side of the side surface 204 of the display 200, and is located in the length extension direction of the bending region 2001 of the display 200. The connecting rod 221 covers the edge of the bending region 2001 of the display 200, that is, the edge of the bending region 2001 of the display 200 can be wrapped by using the rigid member 210 and the connecting rod 221. This prevents the edge of the bending region 2001 of the display 200 from being exposed, improves the appearance effect of the foldable display terminal 1000, and prevents the edge of the bending region 2001 of the display 200 from being damaged due to a collision.

In addition, in some implementations of this application, there is a specific gap between the edge of the bending region 2001 of the display 200 and the rigid member 210. When the foldable display terminal 1000 is collided, collision force acts on the rigid member 210, and is also unlikely to be transferred to the display 200 to damage the display 200. This further improves reliability of the foldable display terminal 1000.

Refer to FIG. 36. In this implementation, the third rod surface 2213 is a plane. When the bending region 2001 of the display 200 is unfolded, each position of the third rod surface 2213 can be in contact with a surface that is of the display 200 and that backs onto the rotating shaft assembly 303. This reduces a gap between the display 200 and the connecting rod 221, thereby reducing a case that water, dust, and the like enter the foldable display terminal 1000 through the gap between the display 200 and the connecting rod 221. In addition, this can avoid a problem that the display 200 is damaged by the third rod surface 2213 because a protrusion position exists on the third rod surface 2213 and abuts against the display 200. It may be understood that, in some other implementations of this application, the third rod surface 2213 may be alternatively a cambered surface that is slightly convex toward the display 200 or slightly concave in a direction away from the display 200. When the bending region 2001 of the display 200 is unfolded, there is a slight distance between each position of the third rod surface 2213 and a surface that is of the display 200 and that faces the connecting rod 221. This ensures that the third rod surface 2213 does not partially squeeze the display 200 and damage the display 200.

Refer to FIG. 36 again. In some implementations of this application, the connecting rod 221 further includes an end surface 2214. The end surface 2214 is located at an end that is of the connecting rod 221 and that is connected to the rigid member 210, and connects the first rod surface 2211, the second rod surface 2212, and the third rod surface 2213. In this implementation, the end surface 2214 is a cambered surface using the rotating shaft of the connecting rod 221 as a central axis. The end surfaces 2214 of the connecting rods 221 of the two rotating shaft members 220 connected to the rigid member 210 are disposed opposite to each other. In this implementation, the end surface 2214 is a cambered surface. Therefore, it can be ensured that distances between the end surfaces 2214 are always the same in a process of rotating the two connecting rods 221, to ensure that the two rotating shaft members 220 connected to the rigid member 210 do not collide, and achieve good rotation effect.

Figure 37:
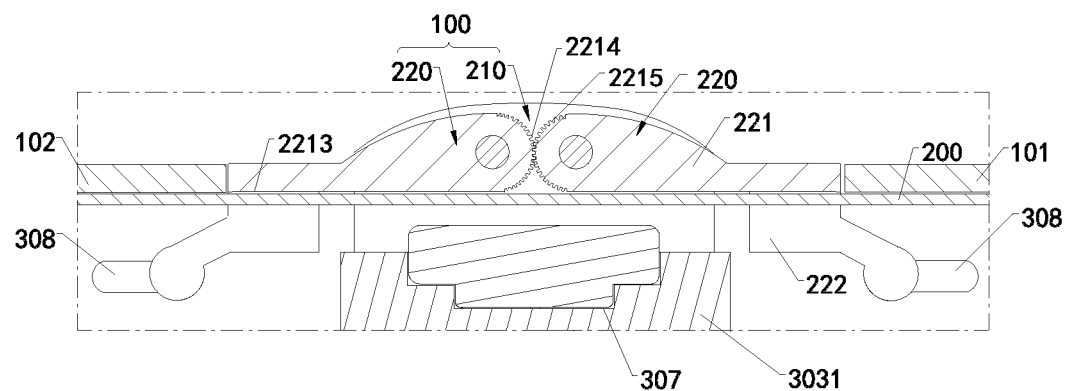
FIG. 37 is a partial cross sectional schematic view of the foldable display terminal shown in FIG. 34 after the foldable display terminal is cut along a position C-C.

FIG. 37 is a partial cross sectional schematic view of the foldable display terminal 1000 shown in FIG. 34 after the foldable display terminal 1000 is cut along a position C-C. A structure of the foldable display terminal 1000 in this implementation is basically the same as that of the foldable display terminal 1000 shown in FIG. 36, and a difference lies in that, in this implementation, matching engagement teeth 2215 are disposed on the end surfaces 2214 of the two connecting rods 221 of the edge protection structure 100 of the foldable display terminal 1000, and the engagement teeth 2215 on the cambered surfaces of the two connecting rods 221 are engaged with each other. As a result, when one rotating shaft member 220 is rotated, the other rotating shaft member 220 can be rotated synchronously. This achieves better rotation experience.

Refer to FIG. 28 and FIG. 29 again. The fastening part 222 includes a first surface 2221 and a second surface 2222 that are disposed opposite to each other. The first surface 2221 faces the rigid member 210, and the second surface 2222 is located on a side that is of the first surface 2221 and that is away from the rigid member 210. In this implementation, the second surface 2222 of the fastening part 222 is in contact with and connected to the first rod surface 2211 of the connecting rod 221, that is, the fastening part 222 is located on a side that is of the connecting rod 221 and that faces the rigid member 210. When the edge protection structure 100 is mounted in the foldable display terminal 1000, the connecting rod 221 covers the edge of the bending region 200 of the display 200. Because the fastening part 222 is located on the side that is of the connecting rod 221 and that faces the rigid member 210, the fastening part 222 can be always located between the display 200 and the border 304.

In this implementation, the fastening part 222 and the connecting rod 221 of the rotating shaft member 220 are made of a same material, and the fastening part 222 and the connecting rod 221 are an integrated structure obtained in a manner of integrated molding. A molding technology of the rotating shaft member 220 is simple, and a connection between the fastening part 222 and the connecting rod 221 is more stable. It should be noted that, in this implementation, because the fastening part 222 and the connecting rod 221 of the rotating shaft member 220 are an integrated structure formed by using the same material, there is no clear connection interface between the fastening part 222 and the connecting rod 221. Therefore, in this implementation, the fastening part 222 and the connecting rod 221 of the rotating shaft member 220 are actually two parts that are manually divided for ease of description. It may be understood that, in another implementation of this application, the fastening part 222 and the connecting rod 221 may be alternatively split structures that are connected in another connection manner, for example, welding, bonding, or a buckling connection.

Figure 37A:
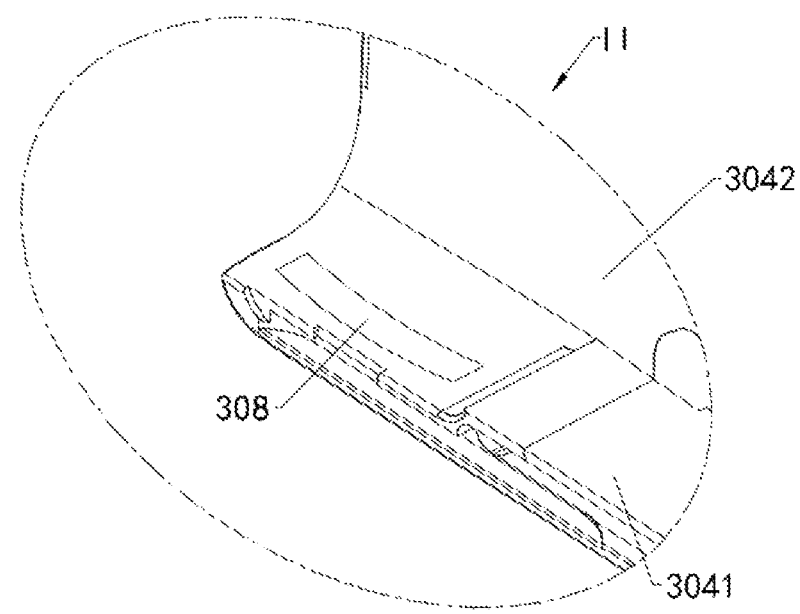
FIG. 37a is a schematic enlarged view of a first body of a foldable display terminal according to another implementation of this application at a position II shown in FIG. 6.

In this implementation of this application, a position-limiting protrusion 223 is further convexly disposed on the first surface 2221 of the fastening part 222, and the position-limiting protrusion 223 is located at an end that is of the fastening part 222 and that is away from the connecting rod 221. Refer to FIG. 6 and FIG. 37a together. FIG. 37a is a schematic enlarged view of the first body 301 of the foldable display terminal 1000 according to another implementation of this application at a position II shown in FIG. 6. In the foldable display terminal 1000 in this implementation of this application, a chute 308 is disposed at each of ends that are of the first section 3041A and the second section 3041B of the borders 3041 of the first body 301 and the second body 302 and that are close to the rotating shaft assembly 303. The chute 308 located on the first section 3041A and the chute 308 located on the second section 3041B are disposed opposite to each other.

Refer to FIG. 35 and FIG. 36 again. When the rigid member 210 of the edge protection structure 100 is fastened to the rotating shaft assembly 303, the rigid member 210 is located on the side of the side surface 204 of the display 200, and is located in the length extension direction of the bending region 2001 of the display 200. The connecting rod 221 of the rotating shaft member 220 is located on a side that is of the display 200 and that is away from the rotating shaft assembly 303. The fastening part 222 is located between the display 200 and the border 3041. In addition, the position-limiting protrusion 223 on the fastening part 222 is embedded in the chute 308 on the border 3041, and can slide in the chute 308. In this application, the fastening part 222 is located on the side that is of the connecting rod 221 and that faces the rigid member 210. Therefore, the fastening part 222 can be always located between the display 200 and the border 304, to ensure that the position-limiting protrusion 223 located on the fastening part 222 can be always located in the chute 308 on the border 3041, and can slide in the chute 308. In this implementation, the edge protection structures 100 are disposed on both sides of the bending region 2001 of the display 200. The position-limiting protrusions 223 of the two rotating shaft members 220 of the edge protection structure 100 located on one side of the bending region 2001 are respectively located in the chute 308 of the first section 3041A of the first border and the chute 308 of the first section 3041A of the second border. The position-limiting protrusions 223 of the two rotating shaft members 220 of the edge protection structure 100 located on the other side of the bending region 2001 are respectively located in the chute 308 of the second section 3041B of the first border and in the chute of the second section 3041B of the second border.

Figure 38:
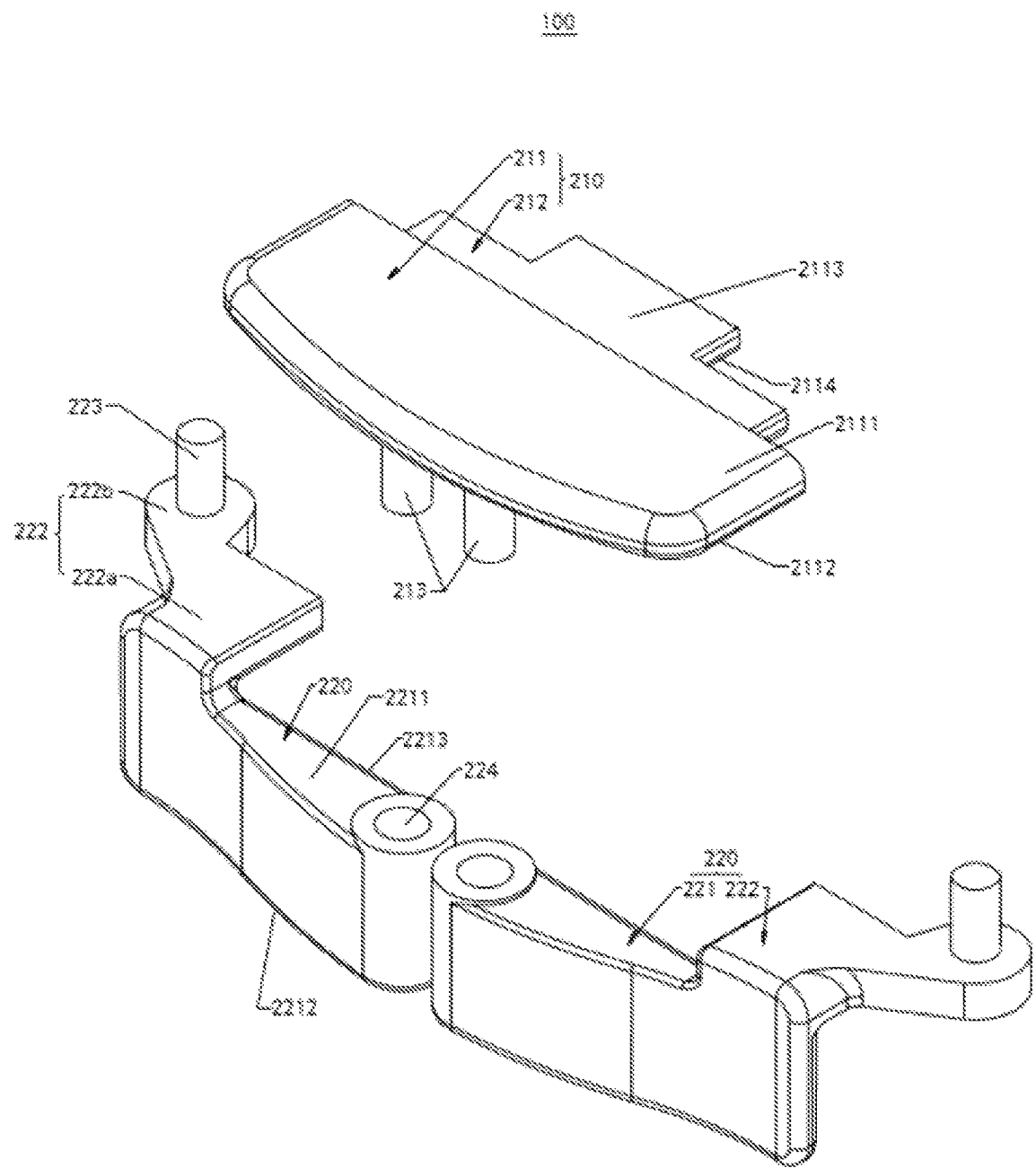
FIG. 38 is a schematic exploded view of a structure of the edge protection structure shown in FIG. 29 from another perspective.

FIG. 38 is a schematic exploded view of a structure of the edge protection structure 100 shown in FIG. 29 from another perspective. In this implementation, the fastening part 222 includes a first end 222a and a second end 222b that are disposed opposite to each other. The first end 222a of the fastening part 222 is connected to the connecting rod 221, and the position-limiting protrusion 223 is disposed at the second end 222b of the fastening end 212. In this implementation, the second end 222b is closer to a reference plane than the first end 222a, and the reference plane is located on a side that is of the fastening end 212 and that is away from the connecting end 211. In other words, when the foldable display terminal 1000 is unfolded to the unfolded state shown in FIG. 1, the second end 222b extends, relative to the first end 222a, in a direction from the display 200 to the screen support assembly 300 (namely, a positive direction of a Z axis in FIG. 1). This ensures that, in a process of folding the foldable display terminal 1000, the fastening part 222 is always located between the display 200 and the border 3041, and the position-limiting protrusion 223 on the fastening part 222 is embedded in the chute 308 on the border 3041. It should be noted that the reference plane in this application is not an actual surface, but is a virtual plane defined to clearly describe relative positions of the end that is of the fastening part 222 and on which the position-limiting protrusion 223 is disposed and the end that is of the fastening part 222 and that is connected to the connecting rod 221.

In this implementation, a track of the chute 308 is correspondingly designed based on a movement track of the position-limiting protrusion 223 of the edge protection structure 100 when the foldable display terminal 1000 is bent. In this way, when the foldable display terminal 1000 is bent, the bending region 2001 of the display 200 is bent, and when being folded by using the rotating shaft assembly 303 as the axis, the first body 301 and the second body 302 can drive the position-limiting protrusion 223 of the rotating shaft member 220 to correspondingly slide in the chute 308, and drive the rotating shaft member 220 to correspondingly rotate. As a result, it is ensured that rotation of the rotating shaft member 220 and folding of the display 200 are always synchronous in the process of folding the foldable display terminal 1000. The rotating shaft member 220 does not need to be pushed by the display 200 to rotate, that is, there is no acting force between the display 200 and the rotating shaft member 220. This avoids a case that acting force is generated between the display 200 and the rotating shaft member 220 to possibly cause damage to the display 200. In this implementation, the chute 308 is a slightly curved free curve.

Figure 39:
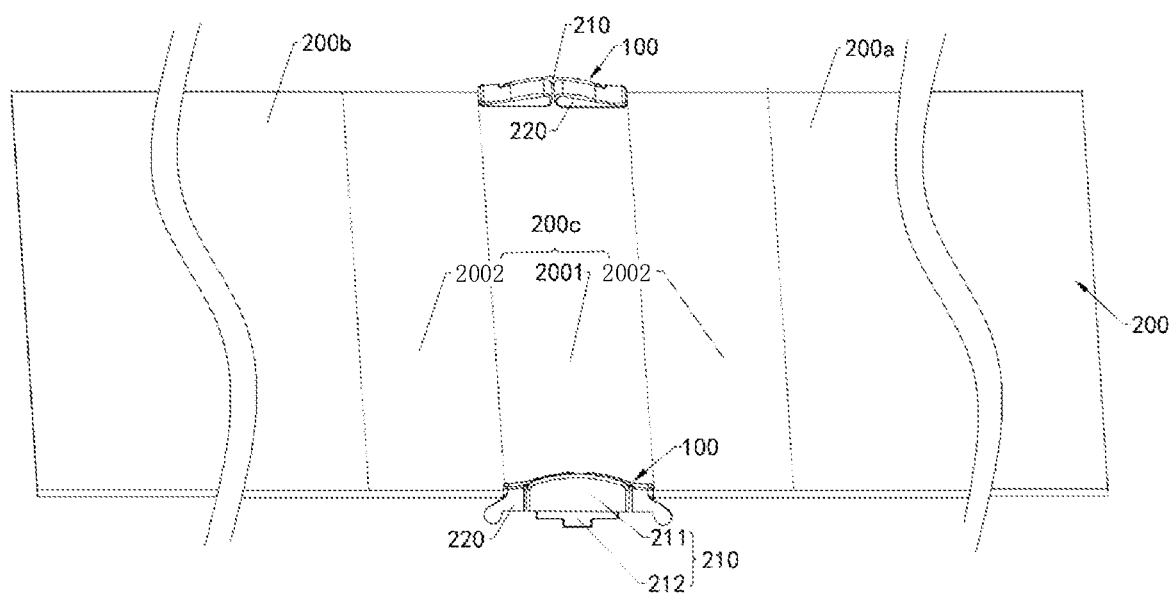
FIG. 39 is a schematic diagram of a structure state of a display of a foldable display terminal and the edge protection structure shown in FIG. 28 when an edge protection structure of the foldable display terminal shown in FIG. 1 is replaced with the edge protection structure and the foldable display terminal is in the unfolded state shown in FIG. 1.
Figure 40:
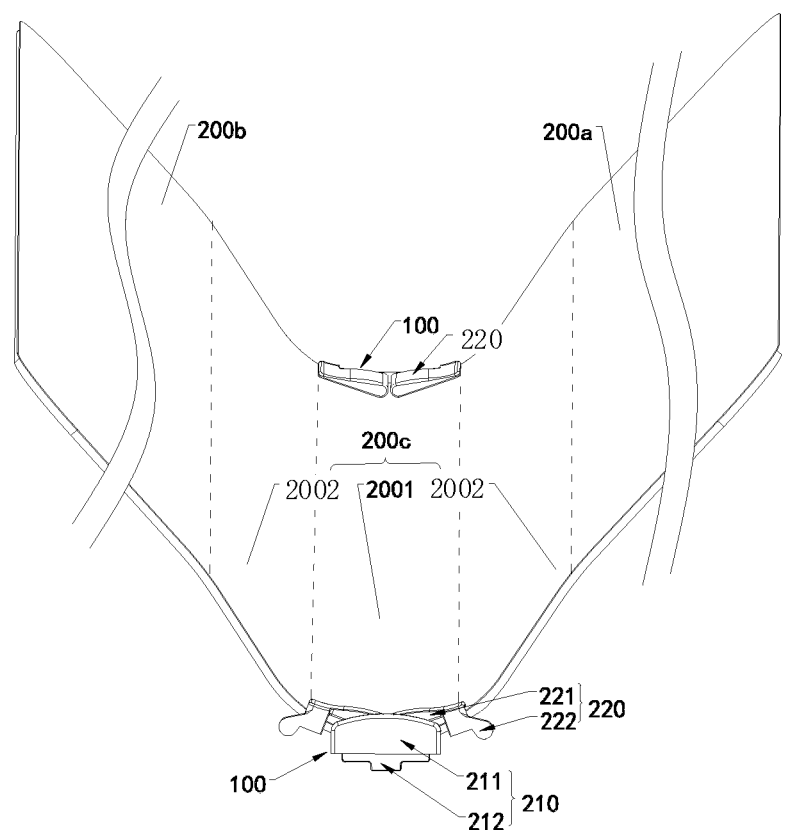
FIG. 40 is a schematic diagram of a structure state of a display of a foldable display terminal and the edge protection structure shown in FIG. 28 when an edge protection structure of the foldable display terminal in FIG. 1 is replaced with the edge protection structure and the foldable display terminal is folded to the intermediate state shown in FIG. 2.
Figure 41:
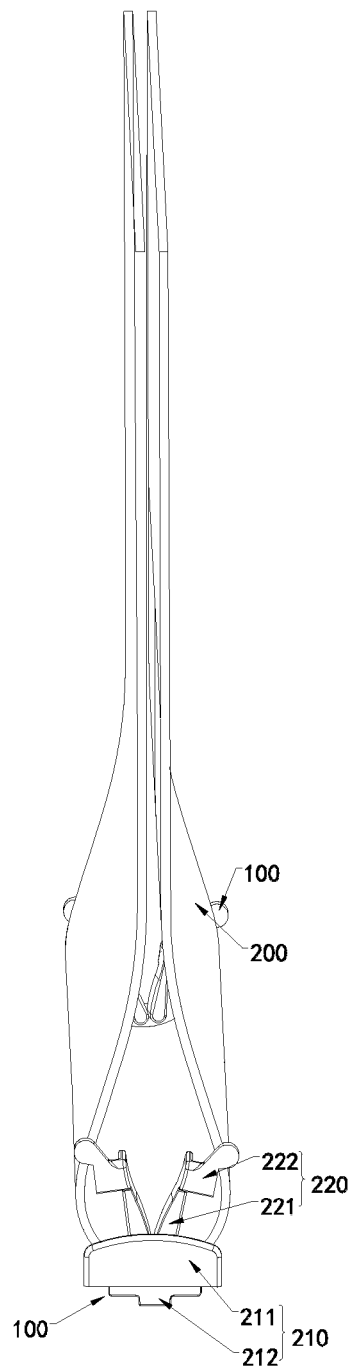
FIG. 41 is a schematic diagram of a structure state of a display of a foldable display terminal and the edge protection structure shown in FIG. 28 when an edge protection structure of the foldable display terminal in FIG. 1 is replaced with the edge protection structure and the foldable display terminal is folded to the fully closed state shown in FIG. 3.

Refer to FIG. 39 to FIG. 41. FIG. 39 is a schematic diagram of a structure state of the display 200 of the foldable display terminal 1000 shown in FIG. 1 and the edge protection structure 100 shown in FIG. 28 when the edge protection structure 100 of the foldable display terminal 1000 is replaced with the edge protection structure 100 and the foldable display terminal 1000 is in the unfolded state shown in FIG. 1. FIG. 40 is a schematic diagram of a structure state of the display 200 of the foldable display terminal 1000 in FIG. 1 and the edge protection structure 100 shown in FIG. 28 when the edge protection structure 100 of the foldable display terminal 1000 is replaced with the edge protection structure 100 and the foldable display terminal 1000 is folded to the intermediate state shown in FIG. 2. FIG. 41 is a schematic diagram of a structure state of the display 200 of the foldable display terminal 1000 in FIG. 1 and the edge protection structure 100 shown in FIG. 28 when the edge protection structure 100 of the foldable display terminal 1000 is replaced with the edge protection structure 100 and the foldable display terminal 1000 is folded to the fully closed state shown in FIG. 3. In this implementation, when the foldable display terminal 1000 is in different states, there is no acting force between the display 200 and the rotating shaft member 220. When the foldable display terminal 1000 is bent, the rotating shaft region of the display 200 can be naturally bent, and the position-limiting protrusion 223 of the rotating shaft member 220 of the edge protection structure 100 slides in the chutes 308 of the first body 301 and the second body 302. In this way, the first body 301 and the second body 302 drive the rotating shaft member 220 of the edge protection structure 100 to rotate relative to the rigid member 210. In this implementation, when the display 200 is fully folded, the first fastening region 200a and the second fastening region 200b of the display 200 can be attached together, and the rotating shaft region 200c of the display 200 can be naturally bent. This prevents the display 200 from being damaged due to excessive folding, and can ensure a life of the display 200.

In this implementation of this application, the rigid member 210 and the rotating shaft member 220 are both made of a material having specific strength. Specifically, in this implementation, the rigid member 210 and the rotating shaft member 220 may be both metal members made of a metal material. The metal material for forming the rigid member 210 and the rotating shaft member 220 may be various types of metal materials such as stainless steel, cast iron, and aluminum, or alloy materials. It may be understood that, in another implementation of this application, the rigid member 210 and the rotating shaft member 220 may be alternatively mechanical members made of another type of material. For example, in some implementations, the rigid member 210 or the rotating shaft member 220 may be a fine ceramic member made of a fine ceramic material. In this implementation, the rigid member 210 and the rotating shaft member 220 both have specific strength, to have good anti-collision effect, and ensure that the bending region 2001 of the display 200 is unlikely to be damaged due to a collision. In addition, the rigid member 210 or the rotating shaft member 220 is made of a material with high strength, and can reduce damage caused by the collision or wear and prolong a service life of the edge protection structure 100.

In this implementation, the rigid member 210 and the rotating shaft member 220 may be both obtained in a manner of metal injection molding (metal injection molding, MIM). In this implementation, the rigid member 210 with high dimensional precision can be obtained through metal injection molding, to help the edge protection structure 100 fit another structure of the foldable display terminal 1000. In addition, the rigid member 210 obtained through metal injection molding has uniform organization and high relative density at all positions, to have high strength, so as to achieve better protection effect for the edge of the display 200. In addition, surface finish of the rigid member 210 is good, so that the foldable display terminal 1000 can have the good appearance effect. It may be understood that, in another implementation of this application, the rigid member 210 may be alternatively formed by using another technology, for example, formed in a manner, for example, computer numerical control (Computer numerical control, CNC) machining forming or die casting molding.

In some implementations of this application, surfaces of the rigid member 210 and the rotating shaft member 220 each may be coated with a plating layer, to further improve appearance effect of the edge protection structure 100. For example, in some implementations, the plating layer on the surface of the rigid member 210 has a same color as the rear cover of the foldable display terminal 1000. In this way, the foldable display terminal 1000 has a uniform appearance color, to have the better appearance effect. In some implementations, the plating layer can further prevent external water, oxygen, and the like from corroding the rigid member 210, to improve quality of the foldable display terminal 1000.

In this application, the plating layer may be formed through evaporation by using an evaporation technology, or may be formed through deposition in a manner, for example, vapor deposition. A manner of forming the plating layer is not specifically limited herein.

In this implementation of this application, the edge protection structure 100 is fastened to the rotating shaft assembly 303. The rigid member 210 of the edge protection structure 100 is located on the side of the side surface 204 of the display 200. The rigid member 210 is located in the length extension direction of the bending region 2001 of the display 200. The connecting rod 221 covers the edge of the bending region 2001 of the display 200. In other words, the edge of the bending region 2001 of the display 200 is wrapped by using the rigid member 210 and the connecting rod 221. This prevents the edge of the bending region 2001 of the display 200 from being exposed, improves the appearance effect of the foldable display terminal 1000, and prevents the edge of the bending region 2001 of the display 200 from being damaged due to the collision. In addition, the position-limiting protrusions 223 of the edge protection structure 100 are mounted in the chutes 308 of the first body 301 and the second body 302. In this way, in a process of folding or unfolding the foldable display terminal 1000, the first body 301 and the second body 302 push the rotating shaft member 220 of the edge protection structure 100 to rotate. This prevents the acting force from being generated between the bending region 2001 of the display 200 and the rotating shaft member 220, thereby ensuring that the bending region 2001 of the display 200 can be naturally bent, and ensuring the life of the display 200.

Figure 42:
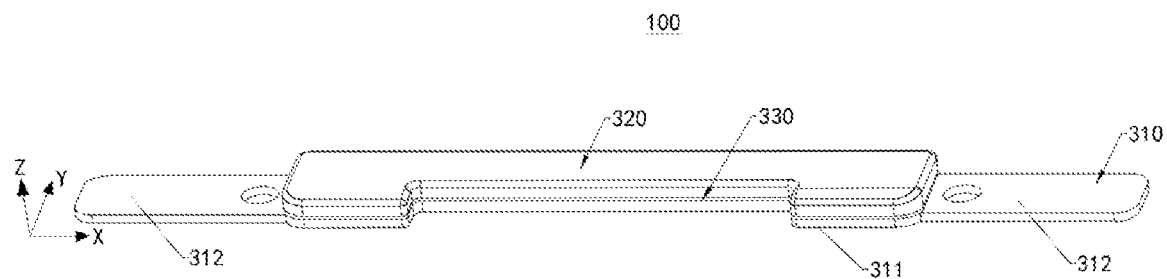
FIG. 42 is a schematic diagram of a structure of an edge protection structure according to an eighth implementation of this application.
Figure 43:
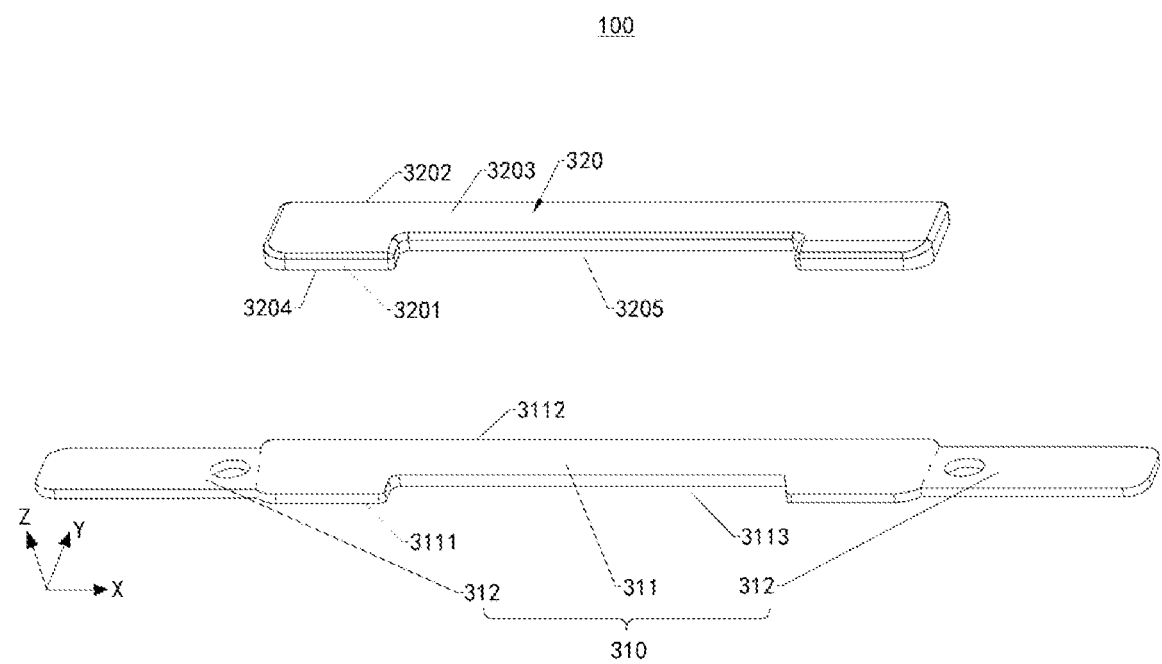
FIG. 43 is a schematic exploded view of the structure of the edge protection structure shown in FIG. 42.
Figure 44:
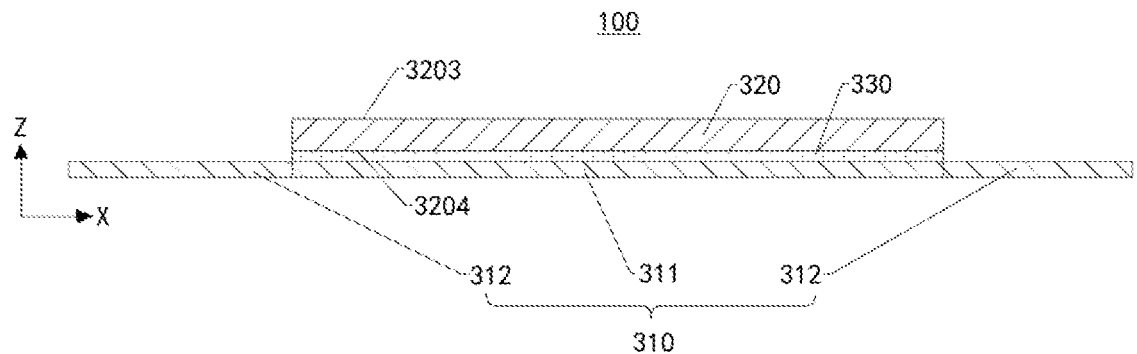
FIG. 44 is a cross sectional schematic view of the edge protection structure shown in FIG. 42.

Refer to FIG. 42, FIG. 43, and FIG. 44. FIG. 42 is a schematic diagram of a structure of the edge protection structure 100 according to an eighth implementation of this application. FIG. 43 is a schematic exploded view of the structure of the edge protection structure 100 shown in FIG. 42. FIG. 44 is a cross sectional schematic view of the edge protection structure 100 shown in FIG. 42. In this implementation, the edge protection structure 100 includes an elastic sheet 310 and a flexible member 320. The elastic sheet 310 includes a first section 311, a second section 312, and a third section 313. The second section 312 and the third section 313 are respectively connected to two sides of the first section 311. The flexible member 320 is stacked on the elastic sheet 310 and covers the first section 311 of the elastic sheet 310.

Figure 45:
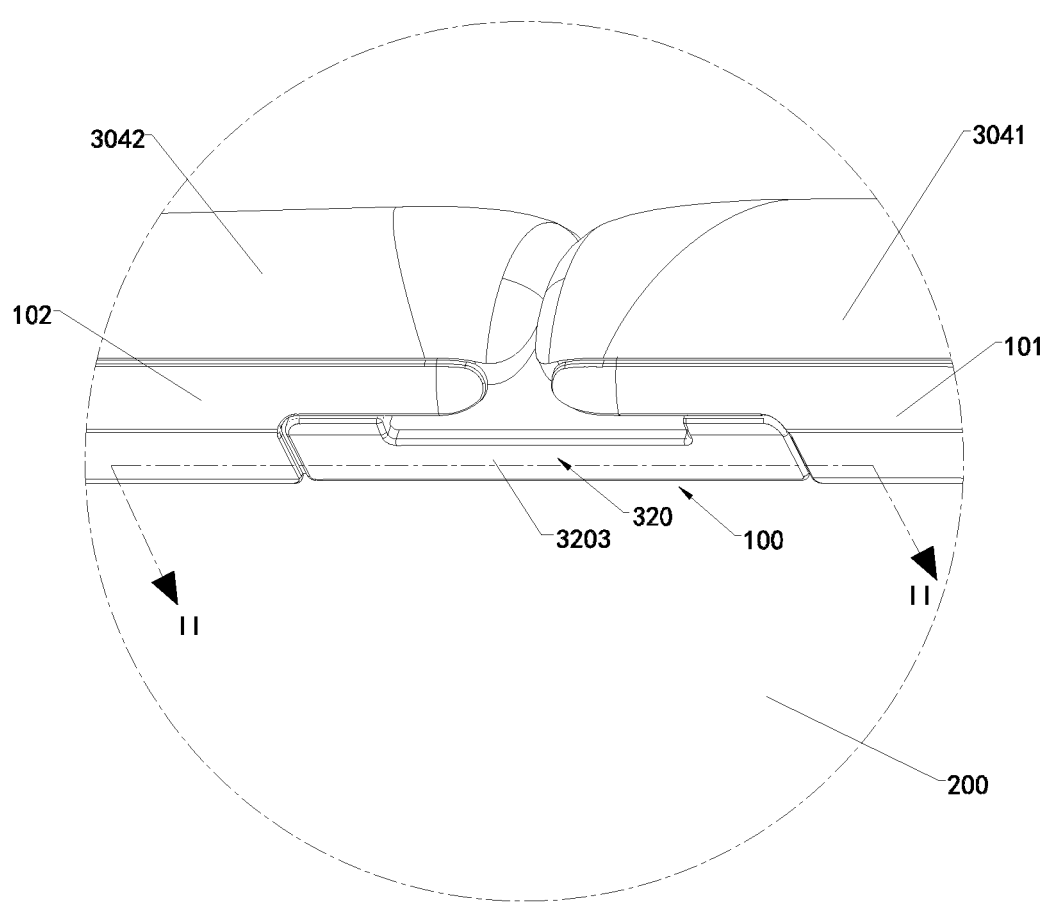
FIG. 45 is a schematic enlarged view of a position I of a foldable display terminal after an edge protection structure in the foldable display terminal shown in FIG. 1 is replaced with the edge protection structure shown in FIG. 42.
Figure 46:
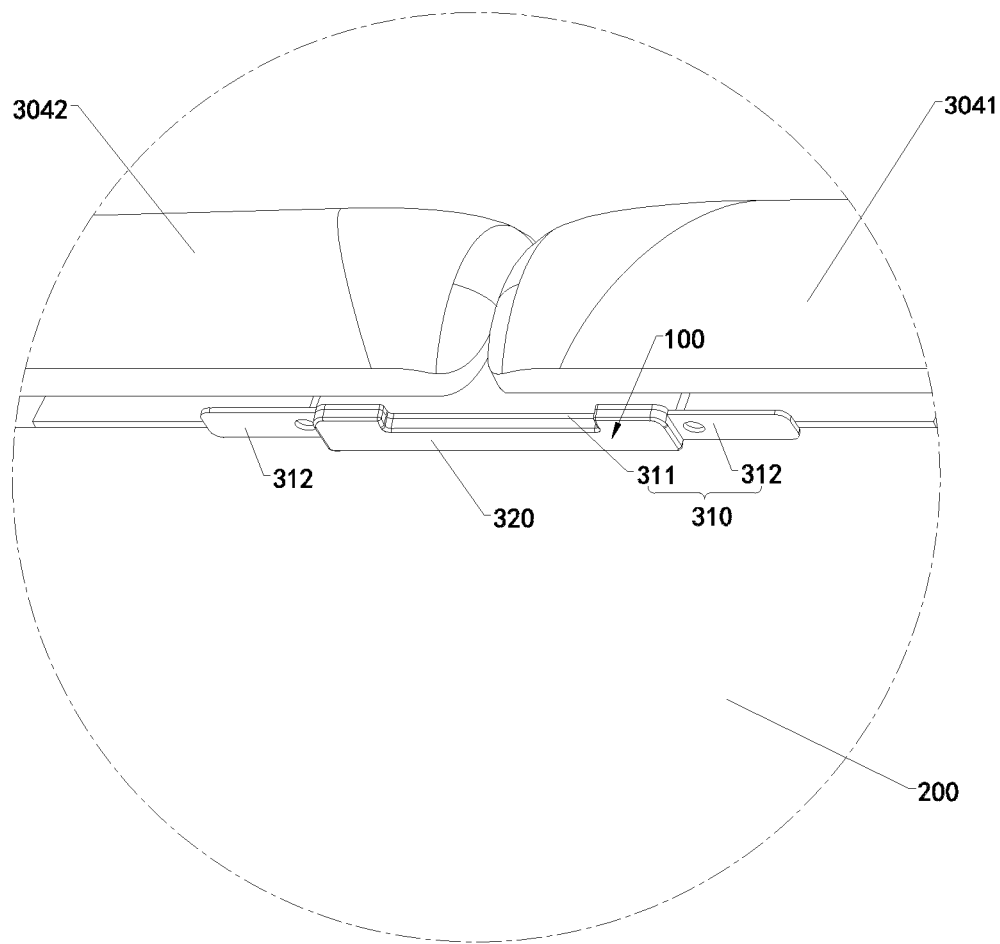
FIG. 46 is a schematic diagram of a position relationship between the edge protection structure and another structure of the foldable display terminal shown in FIG. 45.
Figure 47:
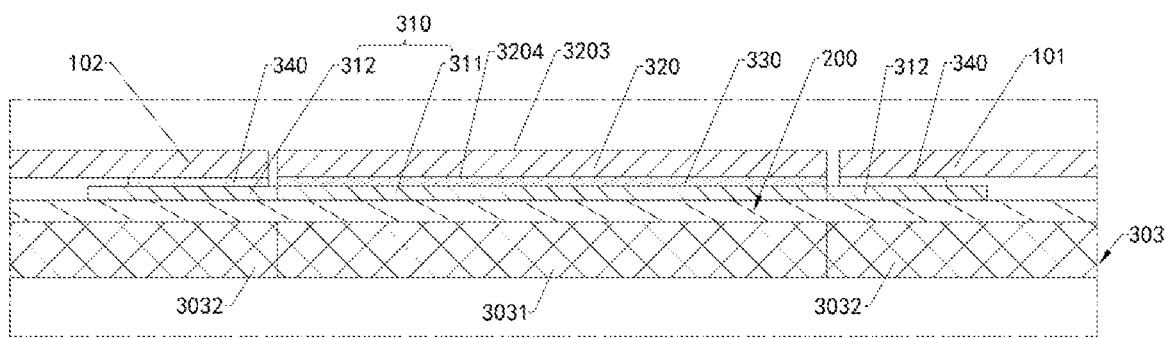
FIG. 47 is a cross sectional schematic view obtained through cutting from a position II-II shown in FIG. 45.

Refer to FIG. 45, FIG. 46, and FIG. 47. FIG. 45 is a schematic enlarged view of a position I of the foldable display terminal 1000 shown in FIG. 1 after the edge protection structure 100 in the foldable display terminal 1000 is replaced with the edge protection structure 100 shown in FIG. 42. FIG. 46 is a schematic diagram of a position relationship between the edge protection structure 100 and another structure of the foldable display terminal 1000 shown in FIG. 45. FIG. 47 is a cross sectional schematic view obtained through cutting from a position II-II shown in FIG. 45. When the edge protection structure 100 is mounted in the foldable display terminal 1000, the edge protection structure 100 is located on a side that is of the display 200 and that is away from the screen support assembly 300, and the edge protection structure 100 corresponds to an edge position of the display 200. Specifically, the first section 311 of the elastic sheet 310 and the flexible member 320 are opposite to the bending region 2001 of the display 200, and cover the edge of the bending region 2001 of the display 200. In this way, the edge protection structure 100 covers the edge of the bending region 2001 of the display 200, to prevent the edge of the bending region 2001 from being exposed, and improve the appearance effect of the foldable display terminal 1000. In addition, the bending region 2001 of the display 200 is covered with the flexible member 320 and the first section 311 of the edge protection structure 100. Therefore, when the bending region 2001 of the display 200 is collided, the flexible member 320 and the first section 311 of the edge protection structure 100 can protect the bending region 2001 of the display 200, to prevent the edge of the bending region 2001 of the display 200 from being damaged due to the collision.

The second section 312 of the elastic sheet 310 is located on a side that is of the first edge protector 101 and that faces the display 200, and is fastened to the first edge protector 101. The third section 313 is located on a side that is of the second edge protector 102 and that faces the display 200, and is fastened to the second edge protector 102. In other words, the second section 312 of the elastic sheet 310 is inserted into a gap between the first edge protector 101 and the display 200, and is fastened to the first edge protector 101. The third section 313 of the elastic sheet 310 is inserted into a gap between the second edge protector 102 and the display 200, and is fastened to the second edge protector 102. This implements mounting of the edge protection structure 100 in the foldable display terminal 1000.

Figure 48:
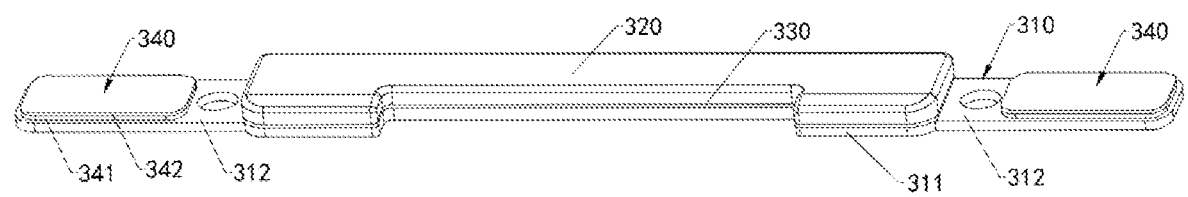
FIG. 48 is a schematic diagram of a structure of an edge protection structure according to a ninth implementation of this application.

FIG. 48 is a schematic diagram of a structure of the edge protection structure 100 according to a ninth implementation of this application. In some implementations of this application, the edge protection structure 100 further includes a bonding layer 340. The bonding layer 340 is stacked on the surface that is of the fastening part and that is away from the display 200. In some implementations, the bonding layer 340 is stacked on surfaces of the second section 312 and the third section 313 of the elastic sheet 310, and the bonding layer 340 and the flexible member 320 are located on a same side of the elastic sheet 310. In some implementations, the bonding layer 340 includes an adhesive layer 341 and a release film layer 342, and the release film layer 342 is located on a side that is of the adhesive layer 341 and that is away from the elastic sheet 310. When the edge protection structure 100 is mounted in the foldable display terminal 1000, the release film layer 342 of the bonding layer 340 is removed, so that the second section 312 is bonded and fastened to the first edge protector 101 and the third section 313 is bonded and fastened to the second edge protector 102 by using the adhesive layer 341.

It may be understood that, in another implementation of this application, the second section 312 and the third section 313 may be alternatively fastened to the first edge protector 101 and the second edge protector 102 in another fastening manner, for example, buckling fastening or screw fastening.

In this implementation of this application, lengths of the second section 312 and the third section 313 fall within a specific range. This avoids a case that the second section 312 or the third section 313 is excessively long and occupies excessive internal space of the foldable display terminal 1000, and can also avoid a case that the second section 312 is excessively long and excessively pulls the first edge protector 101 in a bending process or the third section 313 is excessively long and excessively pulls the second edge protector 102 in a bending process. In addition, the lengths of the second section C12 and the third section 313 also need to be prevented from being excessively short, to avoid a problem that the second section 312 is separated from the first edge protector 101 in the bending process, and avoid a problem that the third section 313 is separated from the second edge protector 102 in the bending process.

Figure 49:
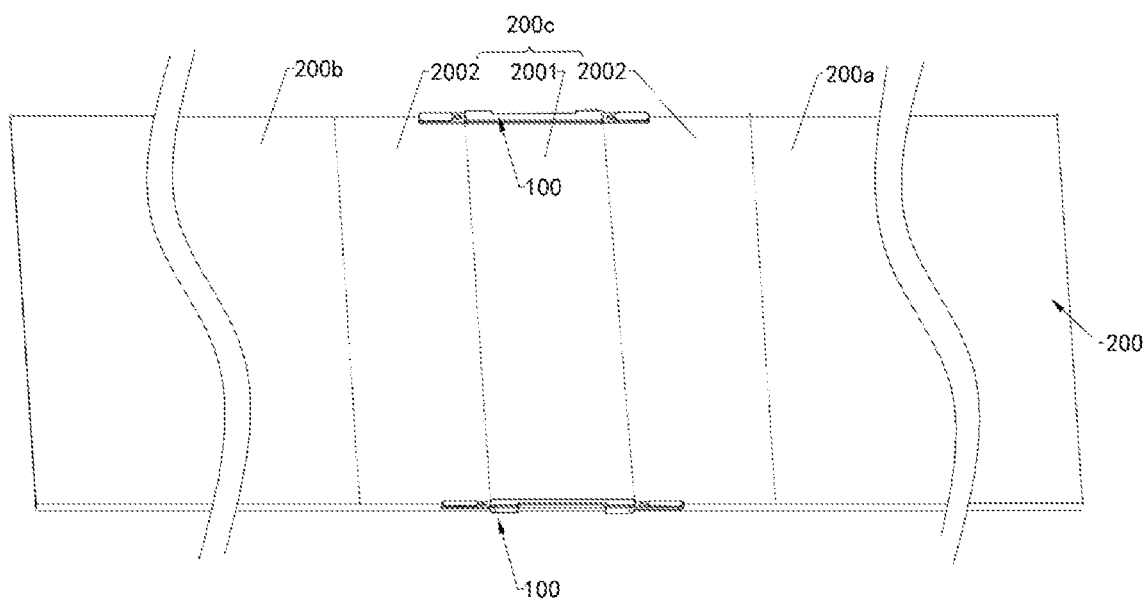
FIG. 49 is a schematic diagram of a structure state of a display of a foldable display terminal according to an implementation of this application and the edge protection structure shown in FIG. 42 when an edge protection structure of the foldable display terminal in FIG. 1 is replaced with the edge protection structure and the foldable display terminal is in the unfolded state shown in FIG. 1.
Figure 50:
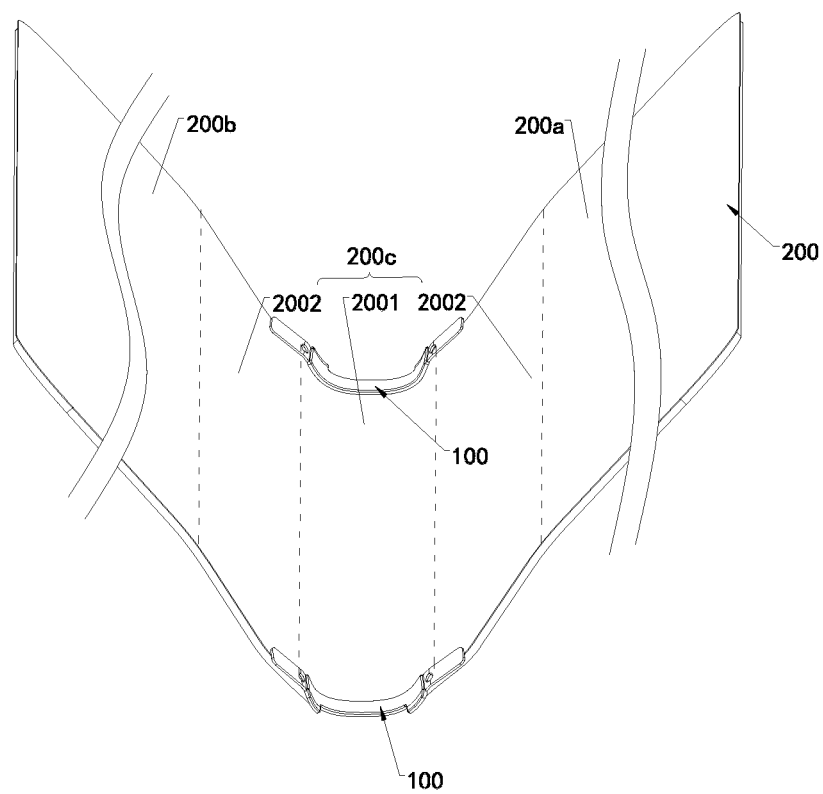
FIG. 50 is a schematic diagram of a structure state of a display of a foldable display terminal according to an implementation of this application and the edge protection structure shown in FIG. 42 when an edge protection structure of the foldable display terminal in FIG. 1 is replaced with the edge protection structure and the foldable display terminal is folded to the intermediate state shown in FIG. 2.
Figure 51:
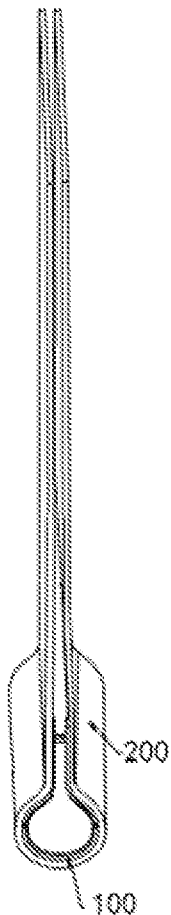
FIG. 51 is a schematic diagram of a structure state of a display of a foldable display terminal according to an implementation of this application and the edge protection structure shown in FIG. 42 when an edge protection structure of the foldable display terminal in FIG. 1 is replaced with the edge protection structure and the foldable display terminal is folded to the fully closed state shown in FIG. 3.

When the foldable display terminal 1000 is folded, and the ends of the first body 301 and the second body 302 of the foldable display terminal 1000 that are away from the rotating shaft assembly 303 are close to each other, to drive the display 200, that is fastened to the first body 301 and the second body 302, to fold, an end that is of the first edge protector 10 and that is away from the rotating shaft assembly 300 can be close to an end that is of the second edge protector 20 and that is away from the rotating shaft assembly 300. The first edge protector 10 and the second edge protector 20 can drive the first section 311 and the flexible member 320 of the elastic sheet 310 of the edge protection structure 100 to bend, to implement synchronous bending of the edge protection structure 100 and the display 200. In this application, the elastic sheet 310 and the flexible member 320 of the edge protection structure 100 both have good bending performance, basically do not affect a state of the display 200 when the display 200 is bent, but can correspondingly change shapes with the bending state of the display 200 when the display 200 is bent. Therefore, when the display 200 in this implementation of this application is fully folded, the first fastening region 200*a* and the second fastening region 200*b* of the display 200 can be attached together, and the rotating shaft region 200*c* of the display 200 can be naturally bent. In other words, in this application, the edge protection structure 100 disposed in the foldable display terminal 1000 is provided, to protect the edge of the bending region 100*c* of the display 100 of the foldable display terminal 1000, and improve the appearance effect of the foldable display terminal 1000, without affecting folding of the display 100 of the foldable display terminal 100 and reliability of the display 200. Refer to FIG. 49 to FIG. 51.

FIG. 49 is a schematic diagram of a structure state of the display 200 of the foldable display terminal 1000 according to an implementation of this application and the edge protection structure 100 shown in FIG. 42 when an edge protection structure 100 of the foldable display terminal 1000 in FIG. 1 is replaced with the edge protection structure 100 and the foldable display terminal 1000 is in the unfolded state shown in FIG. 1. FIG. 50 is a schematic diagram of a structure state of the display 200 of the foldable display terminal 1000 according to an implementation of this application and the edge protection structure 100 shown in FIG. 42 when an edge protection structure 100 of the foldable display terminal 1000 in FIG. 1 is replaced with the edge protection structure 100 and the foldable display terminal 1000 is folded to the intermediate state shown in FIG. 2. FIG. 51 is a schematic diagram of a structure state of the display 200 of the foldable display terminal 1000 according to an implementation of this application and the edge protection structure 100 shown in FIG. 42 when an edge protection structure 100 of the foldable display terminal 1000 in FIG. 1 is replaced with the edge protection structure 100 and the foldable display terminal 1000 is in the fully closed state shown in FIG. 3.

In this implementation of this application, elasticity of the elastic sheet 310 is greater than elasticity of the flexible member 320. This ensures that the edge protection structure 100 still does not generate large deformation after being bent for a plurality of times, to ensure a bending life of the edge protection structure 100. In some implementations, flexibility of the elastic sheet 310 is less than flexibility of the flexible member 320. The flexibility of the elastic sheet 310 is less than the flexibility of the flexible member 320, to provide good support effect for the flexible member 320. In addition, the flexibility of the flexible member 320 is good, to reduce impact of the flexible member 320 on bending performance of the edge protection structure 100. In addition, when the edge protection structure 100 is mounted in the foldable display terminal 1000, the flexible member 320 is located on a side that is of the elastic sheet 310 and that is away from the flexible member 320. In other words, the flexible member 320 is closer to the outside of the foldable display terminal 1000 than the elastic sheet 310. When the foldable display terminal 1000 is collided, a collision position is usually located on the flexible member 320. Because the flexible member 320 has good flexibility, the flexible member 320 can achieve good buffer effect, to prevent acting force generated by the collision from being transferred to the display 200 through the elastic sheet 310, so as to implement a good protection function for the display 200.

In this implementation, the elastic sheet 310 may be a high-modulus plastic sheet or a metal sheet. For example, the elastic sheet 310 may be a high-modulus polyethylene terephthalate (polyethylene terephthalate, PET) sheet, a high-modulus polyimide (polyimide, PI) sheet, or a steel sheet. It may be understood that the elastic sheet 310 in this application may be alternatively made of another material that can implement elastic deformation. The another material is not enumerated herein. The elastic sheet 310 is thin, so that the elastic sheet 310 can have specific elasticity, and therefore can be bent with the foldable display terminal 1000 for a plurality of times, to ensure a service life of the elastic sheet 310. In addition, the elastic sheet 310 is thin, so that the elastic sheet 310 can have the specific elasticity, can also reduce synchronous bending of the edge protection structure 100 with the display 200, to avoid a case that interaction force is generated between the edge protection structure 100 and the display 200 to damage the display 200, and can also avoid impact on folding effect of the foldable display terminal 1000. In some implementations, a thickness of the elastic sheet 310 may be less than or equal to 0.1 mm.

In this application, the flexible member 320 may be made of a material, for example, silica gel, a thermoplastic elastomer (thermoplastic elastomer, TPE), thermoplastic polyurethane (thermoplastic polyurethane, TPU), polyvinyl chloride (polyvinyl chloride, PVC) soft rubber, or rubber (for example, silicone rubber, natural rubber, cis-1,4-polybutadiene rubber, styrene-butadiene rubber, or ethylene propylene rubber). It may be understood that the soft rubber member 30 in this application may be alternatively made of another flexible material. The another material is not enumerated herein.

Refer to FIG. 42, FIG. 43, and FIG. 44 again. In this implementation, the elastic sheet 310 is a thin metal sheet, the flexible member 320 is a plastic member, and the flexible member 320 is adhered to the elastic sheet 310 by using an adhesive layer 330. It may be understood that, in another implementation of this application, the flexible member 320 and the elastic sheet 310 may be alternatively fastened in another manner. For example, in some implementations of this application, the flexible member 320 and the elastic sheet 310 may be obtained through integrated molding. Specifically, the elastic sheet 310 is first formed, then the elastic sheet 310 is put into a mold, and next, a plastic material is injected into the mold to form the flexible member. In other words, the elastic sheet 310 and the flexible member 320 are integrally formed in an injection molding manner to form an integrated structure. The flexible member 320 and the elastic sheet 310 are formed in a manner of integrated molding to obtain the integrated structure, so that a connection between the flexible member 320 and the elastic sheet 310 can be firmer.

In some implementations, a surface of the edge protection structure 100 may be coated with a plating layer, to improve appearance effect of the edge protection structure 100. For example, in some implementations, the surface of the edge protection structure 100 or a surface of the flexible member 320 of the edge protection structure 100 is covered with a plating layer. In this way, the edge protection structure 100 or the flexible member 320 of the edge protection structure 100 can have a same color as the rear cover of the foldable display terminal 1000, so that the foldable display terminal 1000 has a uniform appearance color, to have better appearance effect. In some implementations, the plating layer can further prevent external water, oxygen, and the like from corroding the edge protection structure 100, to improve quality of the foldable display terminal 1000.

In this application, the plating layer may be formed through evaporation by using an evaporation technology, or may be formed through deposition in a manner, for example, vapor deposition. A manner of forming the plating layer is not specifically limited herein.

In some implementations of this application, a surface smoothness degree of the elastic sheet 310 is greater than a surface smoothness degree of the flexible member 320. In this application, when the edge protection structure 100 is mounted in the foldable display terminal 1000, the elastic sheet 310 of the edge protection structure 100 is stacked on the display 200 and is in contact with the edge of the display 200. In this implementation of this application, when the surface smoothness degree of the elastic sheet 310 is high, friction force between the elastic sheet 310 and the display 200 can be reduced, to avoid pulling between the elastic sheet 310 and the display 200 due to the friction force in a process of bending the foldable display terminal 1000. This ensures smooth bending of the foldable display terminal 1000, avoids damage to the display 200 due to pulling between the elastic sheet 310 and the display 200, and improves reliability of the foldable display terminal 1000.

In this implementation of this application, the elastic sheet 310 may be obtained in a molding manner, for example, roll pressing, by using a material, for example, polyethylene terephthalate (polyethylene terephthalate, PET), high-modulus polyimide (polyimide, PI), or a steel sheet. In this way, a sheet with high surface smoothness performance and a small thickness can be obtained. In this implementation of this application, the flexible member 320 is obtained in a molding manner, for example, injection molding, by using a material, for example, rubber or silica gel, so that the flexible member 320 required in this application can be obtained in a simple molding manner. It may be understood that, in this implementation of this application, the flexible member 320 and the elastic sheet 310 that has the small thickness and a smooth surface may be alternatively produced by using another production method. This is not specifically limited herein.

Refer to FIG. 42, FIG. 43, and FIG. 44 again. In some implementations of this application, a width of the middle position of the first section 311 is less than widths of two sides of the first section 311 that are close to the second section 312 and the third section 313. In this implementation, a width direction of the first section 311 is a Y direction shown in FIG. 42, and is the same as the Y direction shown in FIG. 4. In this implementation of this application, the width of the middle position of the first section 311 is less than the widths of the two sides of the first section 311 that are close to the second section 312 and the third section 313. In this way, bending performance of the middle position of the first section 311 can be better than bending performance of the two sides of the first section 311 that are close to the second section 312 and the third section 313, and when the foldable display terminal 1000 is folded, a bending position of the edge protection structure 100 is at the middle position of the first section 311. This reduces bending of two ends of the first section 311 that are connected to the second section 312 and the third section 313, and reduces pulling of the first section 311 for the second section 312 and the third section 313, thereby reducing a risk that the second section 312 is separated from the first edge protector 101 under force and a risk that the third section 313 is separated from the second edge protector 102 under force. In addition, when the foldable display terminal 1000 is bent, a bending degree of the middle position of the bending region 1001 of the display 100 is greatest. In this implementation of this application, the bending performance of the middle position of the first section 311 is better than the bending performance of the two ends of the first section 311 that are closed to the second section 312 and the third section 313, and the middle position of the first section 311 is opposite to the middle position of the bending region 1001. This ensures that the edge protection structure 100 can be bent and deformed synchronously with the display 200, without generating large acting force for the display 200 to damage the display 200.

Refer to FIG. 43. In some implementations of this application, the first section 311 includes a first surface 3111 and a second surface 3112 that are disposed opposite to each other in the width direction. The middle position of the first surface 3111 is concavely disposed toward the second surface 3112 to form a notch 3113. In this way, the width of the middle position of the first section 311 is less than the widths of the two sides of the first section 311 that are close to the second section 312 and the third section 313. It may be understood that, in some other implementations of this application, the first surface 3111 may be a cambered surface that is concave toward the second surface 3112. In this way, the width of the middle position of the first section 311 is less than the widths of the two sides of the first section 311 that are close to the second section 312 and the third section 313.

In some implementations of this application, widths of the second section 312 and the third section 313 are basically the same as a width of the first section 311. It should be noted that, in this application, that the widths of the second section 312 and the third section 313 are basically the same as the width of the first section 311 means that the widths of the second section 312 and the third section 313 may be basically the same as the width of the first section 311, or the widths of the second section 312 and the third section 313 may be slightly greater than or less than the width of the first section 311. In the implementation shown in FIG. 42, the widths of the second section 312 and the third section 313 are slightly less than the width of the first section 311. Width directions of the second section 312, the third section 313, and the first section 311 are the same, and are all perpendicular to a direction in which the second section 312 and the third section 313 are connected the first section 311, namely, the Y-axis direction shown in FIG. 4. In this application, the second section 312 and the third section 313 are connected to the two sides of the first section 311. Therefore, when the second section 312 and the third section 313 that are on the two sides of the first section 311 are respectively fastened to the side that is of the first edge protector 101 and that faces the display 200 and the side that is of the second edge protector 102 and that faces the display 200, the first section 311 can be tightened by using the second section 312 and the third section 313. In addition, the widths of the second section 312 and the third section 313 are basically the same as the width of the first section 311. Therefore, each position of the first section 311 in the width direction can be tightened by fastening the second section 312 and the third section 313, to avoid a problem that each position tilts after being bent for a plurality of times.

When the bending region 2001 of the display 200 is bent, the first section 311 of the soft rubber member is also bent synchronously with the display 200. After the first section 311 is bent with the display 200 for a plurality of times, the first section 311 is likely to generate plastic deformation. As a result, the two ends of the first section 311 tilt in a direction away from the display 200. In this implementation, the two ends of the first section 311 are fastened by using the second section 312 and the third section 313, to avoid the problem that the two ends of the first section 311 tilt after being bent for a plurality of times.

In some implementations, a width of the middle position of the flexible member 320 is less than widths of two ends of the flexible member 320 that are close to the second section 312 and the third section 313. In this implementation, width directions of the flexible member 320 and the elastic sheet 310 are the same, and are both the Y direction shown in FIG. 42. In this implementation of this application, the width of the middle position of the flexible member 320 is less than the widths of the two sides of the flexible member 320 that are close to the second section 312 and the third section 313. As a result, bending performance of the middle position of the flexible member 320 is better than bending performance of the two sides of the flexible member 320 that are close to the second section 312 and the third section 313. Because the width of the middle position of the flexible member 320 is small, bending of the flexible member 320 occurs in the middle position of the flexible member 320 as much as possible. After the edge protection structure 100 is bent for a plurality of times, the flexible member 320 at the bending position of the edge protection structure 100 may be separated from the second section 312 and the third section 313. In this implementation of this application, bending of the flexible member 320 can occur in the middle position of the flexible member 320 as much as possible. Therefore, separation between the two ends of the flexible member 320 and the elastic sheet 310 can be avoided, to avoid a problem that the two ends of the flexible member 320 tilt, so as to ensure the appearance effect of the foldable display terminal 1000. In addition, when the foldable display terminal 1000 is bent, the bending degree of the middle position of the bending region 1001 of the display 100 is greatest. In this implementation of this application, the bending performance of the middle position of the flexible member 320 is better than the bending performance of the two ends of the flexible member 320 that are close to second section 312 and the third section 313, and the middle position of the flexible member 320 is opposite to the middle position of the bending region 1001. This ensures that the edge protection structure 100 can be bent and deformed synchronously with the display 200, without generating large acting force for the display 200 to damage the display 200.

Specifically, refer to FIG. 43. In some implementations of this application, the flexible member 320 includes a first surface 3201 and a second surface 3202 that are disposed opposite to each other in the width direction. The middle position of the first surface 3201 is concavely disposed toward the second surface 3202 to form a notch 3205. In this way, the width of the middle position of the flexible member 320 is less than the widths of the two sides of the flexible member 320 that are close to the second section 312 and the third section 313. It may be understood that, in some other implementations of this application, the first surface 3201 may be a cambered surface that is concave toward the second surface 3202. In this way, the width of the middle position of the flexible member 320 is less than the widths of the two sides of the flexible member 320 that are close to the second section 312 and the third section 313.

Figure 52:
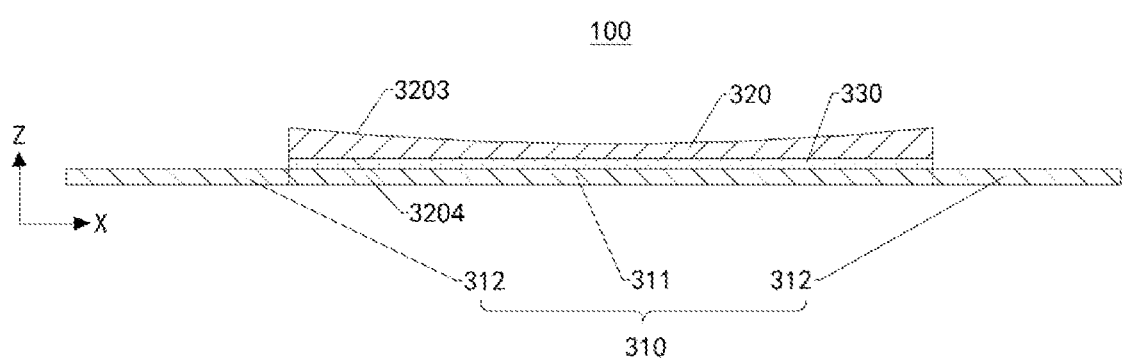
FIG. 52 is a cross sectional schematic view of an edge protection structure according to a tenth implementation of this application.

In some implementations, a thickness of the middle position of the flexible member 320 is less than thicknesses of the two ends of the flexible member 320 that are close to the second section 312 and the third section 313. In this way, the bending performance of the middle position of the flexible member 320 can be further improved. A thickness direction of the flexible member 320 is a Z-axis direction shown in FIG. 44. FIG. 52 is a cross sectional schematic view of the edge protection structure 100 according to a tenth implementation of this application. In this implementation, the thickness direction of the flexible member 320 is a Z-axis direction in FIG. 49. The flexible member 320 includes a third surface 3203 and a fourth surface 3204 that are disposed opposite to each other in the thickness direction. The third surface 3203 is away from the elastic sheet 310 relative to the fourth surface 3204, and the third surface 3203 is a cambered surface that is concave toward the fourth surface 3204. In this way, the thickness of the middle position of the flexible member 320 can be less than the thicknesses of the two ends of the flexible member 320 that are close to the second section 312 and the third section 313. As a result, the bending performance of the middle position of the flexible member 320 is better than the bending performance of the two ends of the flexible member 320 that are close to the second section 312 and the third section 313. It may be understood that, in some other implementations of this application, the fourth surface 3204 may be a cambered surface that is concave toward the third surface 3203. In this way, the thickness of the middle position of the flexible member 320 is less than the thicknesses of the two sides of the flexible member 320 that are close to the second section 312 and the third section 313. In some implementations, the first section 311 of the elastic sheet 310 may also be cambered, and the first section 311 of the elastic sheet 310 is attached to the cambered fourth surface 3204. It may be understood that, in some other implementations of this application, another manner, for example, disposing a groove or a through hole at the middle position of the flexible member may be used, so that the thickness of the middle position of the flexible member 320 is less than the thicknesses of the two sides of the flexible member 320 that are close to the second section 312 and the third section 313. Details are not described herein.

Refer to FIG. 45 and FIG. 47. In some implementations of this application, when the edge protection structure 100 is mounted in the foldable display terminal 1000, the third surface 3203 of the flexible member 320 is coplanar with a surface that is of the first edge protector 101 or the second edge protector 102 and that is away from the display 200. In this way, the foldable display terminal 1000 can have a flatter outer surface, to improve the appearance effect of the foldable display terminal 1000.

In some implementations of this application, the width of the first section 311 can be less than a width of the protector 20. In other words, when the protector 20 covers the first section 311 of the elastic sheet 310, an edge of the protector 20 in a width direction extends out of an edge of the first section 311. When the edge protection structure 100 is collided, collision force acts on the protector 20. Because the protector 20 is a flexible structure that is more flexible than the elastic sheet 310, the protector 20 can generate a better buffer function for the collision force, to prevent the collision force from acting on the elastic sheet 310, so as to avoid a case that the collision force is transferred to the display 200 through the elastic sheet 310 to damage the display 200.

In this implementation of this application, the flexible member 320 and the first section 311 of the elastic sheet 310 of the edge protection structure 100 cover the edge of the bending region 2001 of the display 200. This can prevent the bending region 2001 of the display 200 from being exposed, to improve the appearance effect of the foldable display terminal 1000. In addition, the flexible member 320 and the first section 311 of the elastic sheet 310 of the edge protection structure 100 cover the edge of the bending region 2001 of the display 200. This can protect the edge of the bending region 2001 of the display 200, and prevent the edge of the bending region 2001 of the display 200 from being damaged due to a collision, thereby improving reliability of the foldable display terminal 1000.

Figure 53:
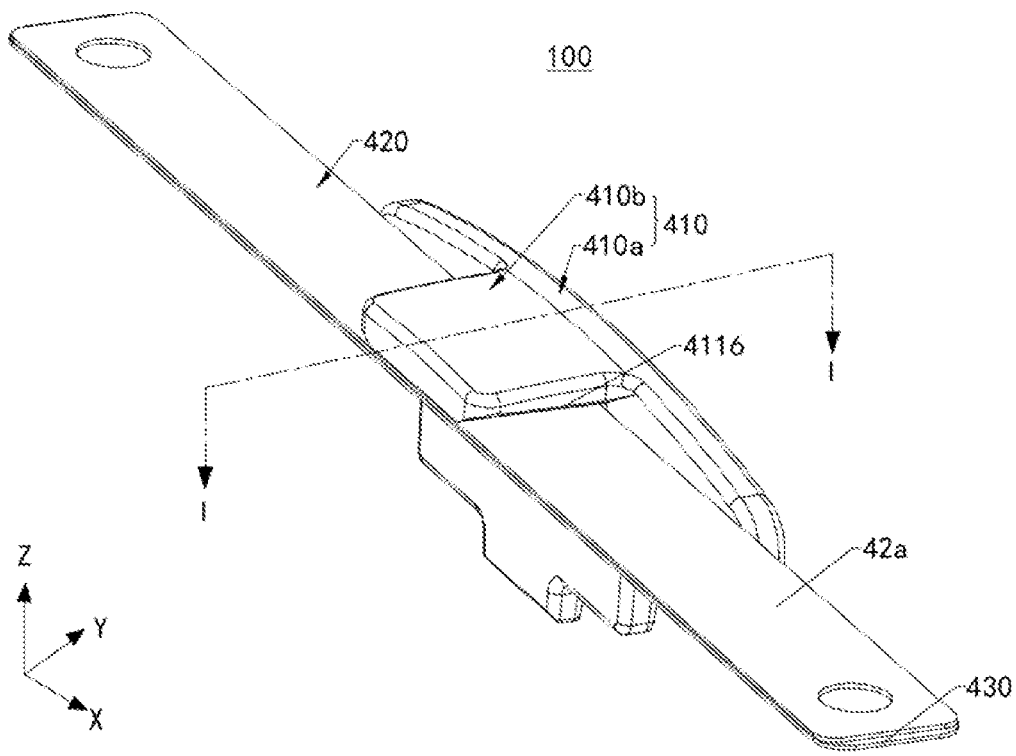
FIG. 53 is a schematic diagram of a structure of an edge protection structure according to an eleventh implementation of this application.
Figure 54:
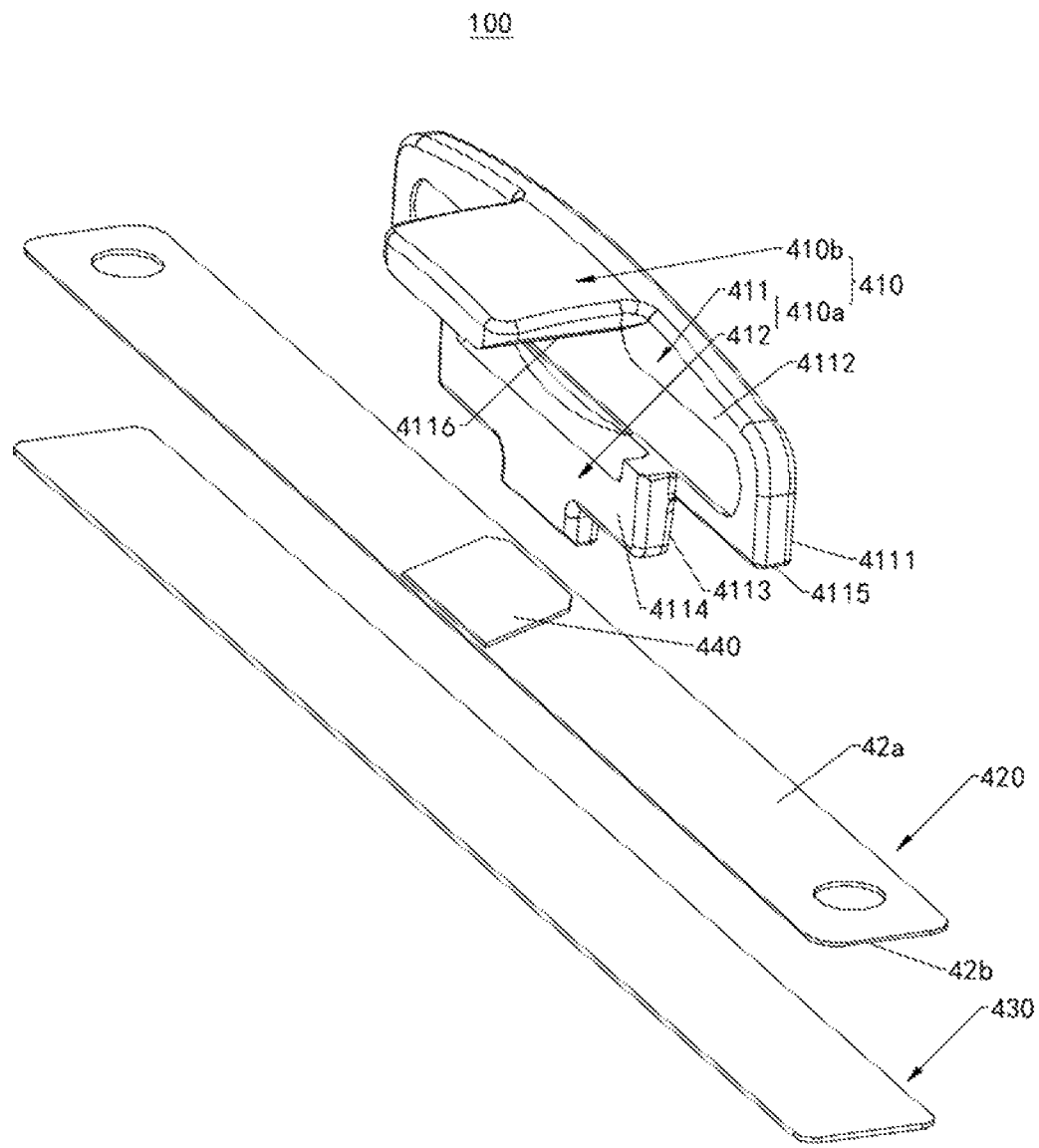
FIG. 54 is a schematic exploded view of the structure of the edge protection structure shown in FIG. 53.
Figure 55:
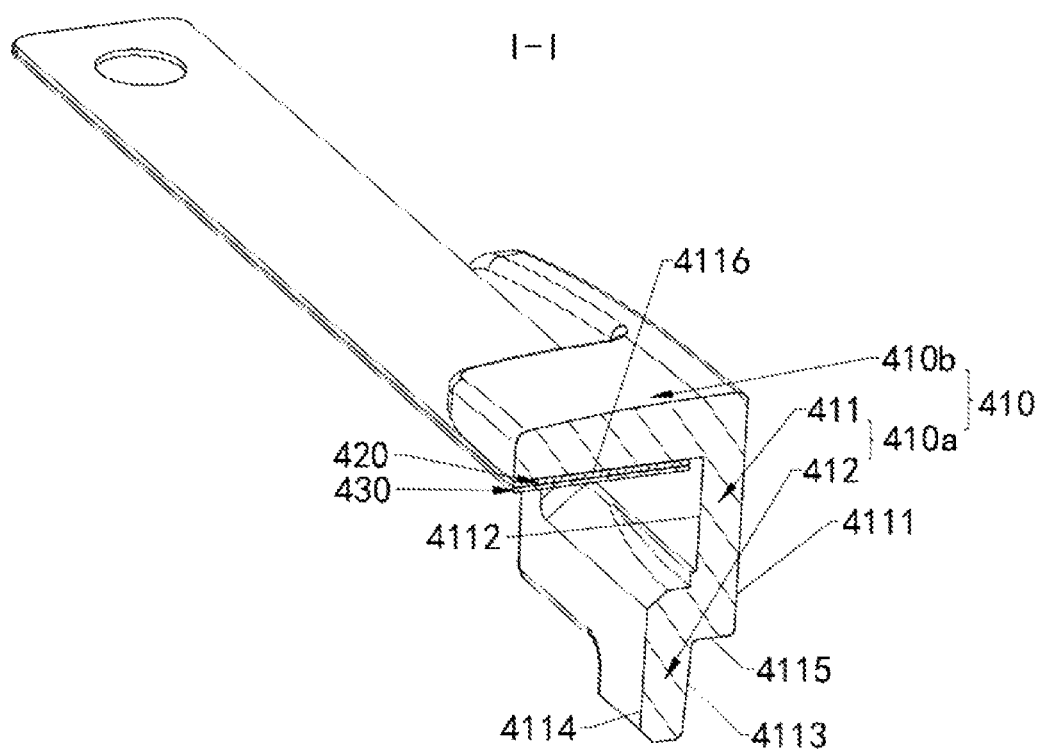
FIG. 55 is a cross sectional schematic view of the edge protection structure shown in FIG. 53.

Refer to FIG. 53, FIG. 54, and FIG. 55. FIG. 53 is a schematic diagram of a structure of the edge protection structure 100 according to an eleventh implementation of this application. FIG. 54 is a schematic exploded view of the structure of the edge protection structure 100 shown in FIG. 53. FIG. 55 is a cross sectional schematic view of the edge protection structure 100 shown in FIG. 53. In this implementation, the edge protection structure 100 includes a rigid member 410 and an elastic sheet 420 connected to the rigid member 410.

In this implementation of this application, the rigid member 410 includes a rigid plate 410a and a bump 410b. The rigid plate 410a includes a connection surface. When the edge protection structure 100 is mounted on the rotating shaft assembly 303, the connection surface of the rigid plate 410a faces the side surface 204 of the display 200. The bump 410b is fastened to the connection surface and protrudes in a direction away from the connection surface. In this implementation, the rigid plate 410a and the bump 410b are an integrated structure made of a same material by using an integrated molding technology. This can ensure that a connection between the rigid plate 410a and the bump 410b is firmer, and can simplify a molding technology of the rigid member 410. It may be understood that, in some other implementations of this application, the rigid plate 410a and the bump 410b may be alternatively fastened in another manner, for example, welding or bonding. This is not specifically limited herein.

In this implementation, the rigid member 410 may be a metal member made of a metal material, and has high strength. In some implementations, the metal material for forming the rigid member 410 may be various types of metal materials such as stainless steel, cast iron, and aluminum, or alloy materials. It may be understood that, in another implementation of this application, the rigid member 410 may be alternatively a mechanical member made of another type of material. For example, in some implementations, the rigid member 410 may be a fine ceramic member made of a fine ceramic material.

In this implementation of this application, the rigid member 410 may be obtained in a manner of metal injection molding (metal injection molding, MIM). In this implementation, the rigid member 410 with high dimensional precision can be obtained through metal injection molding, to help the edge protection structure 100 fit another structure of the foldable display terminal 1000. In addition, the rigid member 410 obtained through metal injection molding has uniform organization and high relative density at all positions, to have high strength, so as to achieve better protection effect for the edge of the display 200. In addition, surface finish of the rigid member 410 is good, so that the foldable display terminal 1000 can have the good appearance effect. It may be understood that, in another implementation of this application, the rigid member 410 may be alternatively formed by using another technology, for example, formed in a manner, for example, computer numerical control (Computer numerical control, CNC) machining forming or die casting molding.

In some implementations of this application, a surface of the rigid member 410 may be coated with a plating layer, to further improve appearance effect of the edge protection structure 100. For example, in some implementations, the plating layer on the surface of the rigid member 410 has a same color as the rear cover 305 of the foldable display terminal 1000. In this way, the foldable display terminal 1000 has a uniform appearance color, to have better appearance effect. In some implementations, the plating layer can further prevent external water, oxygen, and the like from corroding the rigid member 410, to improve quality of the foldable display terminal 1000.

In this application, the plating layer may be formed through evaporation by using an evaporation technology, or may be formed through deposition in a manner, for example, vapor deposition. A manner of forming the plating layer is not specifically limited herein.

Figure 53A:
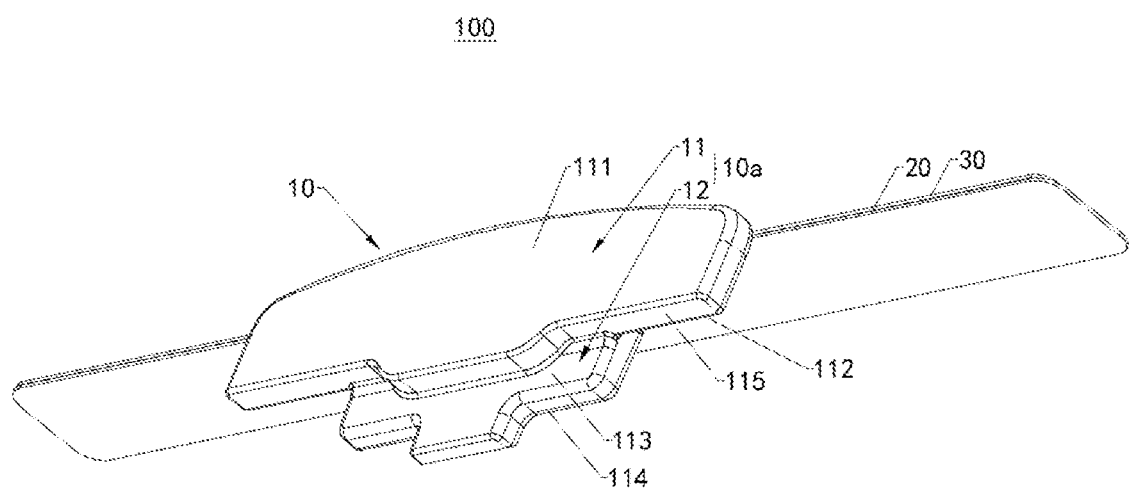
FIG. 53a is a schematic diagram of a structure of the edge protection structure shown in FIG. 53 from another perspective.

Refer to FIG. 53*a* and FIG. 54. FIG. 53*a* is a schematic diagram of a structure of the edge protection structure 100 shown in FIG. 53 from another perspective. In this implementation, a structure of the rigid plate 410*a* is basically the same as that of the rigid member 110 shown in FIG. 10. The rigid plate 410*a* is of a plate-like structure, and the rigid plate 410*a* includes a connecting end 411 and a fastening end 412 connected to the connecting end 411. The connecting end 411 of the rigid plate 410*a* includes a first surface 4111 and a second surface 4112 that are disposed opposite to each other. The first surface 4111 is closer to the outside of the foldable display terminal 1000 than the second surface 4112. The bump 410*b* protrudes from the second surface 4112. The fastening end 412 of the rigid plate 410*a* includes a third surface 4113 and a fourth surface 4114 that are disposed opposite to each other. The third surface 4113 is closer to the outside of the foldable display terminal 1000 than the fourth surface 4114. In this implementation, a stepped structure is formed at a position at which the connecting end 411 is connected to the fastening end 412 of the rigid plate 410*a*. To be specific, the first surface 4111 of the connecting end 411 and the third surface 4113 of the fastening end 412 are non-coplanarly disposed, and the first surface 4111 of the connecting end 411 is closer to the outside of the foldable display terminal 1000 than the third surface 4113 of the fastening end 412. The first surface 4111 of the connecting end 411 and the third surface 4113 of the fastening end 412 are connected by using a fifth surface 4115. In this implementation, the second surface 4112 and the fourth surface 4114 both face the side surface of the display 200, and the second surface 4112 and the fourth surface 4114 jointly constitute the connection surface of the rigid plate 410*a*.

Figure 56:
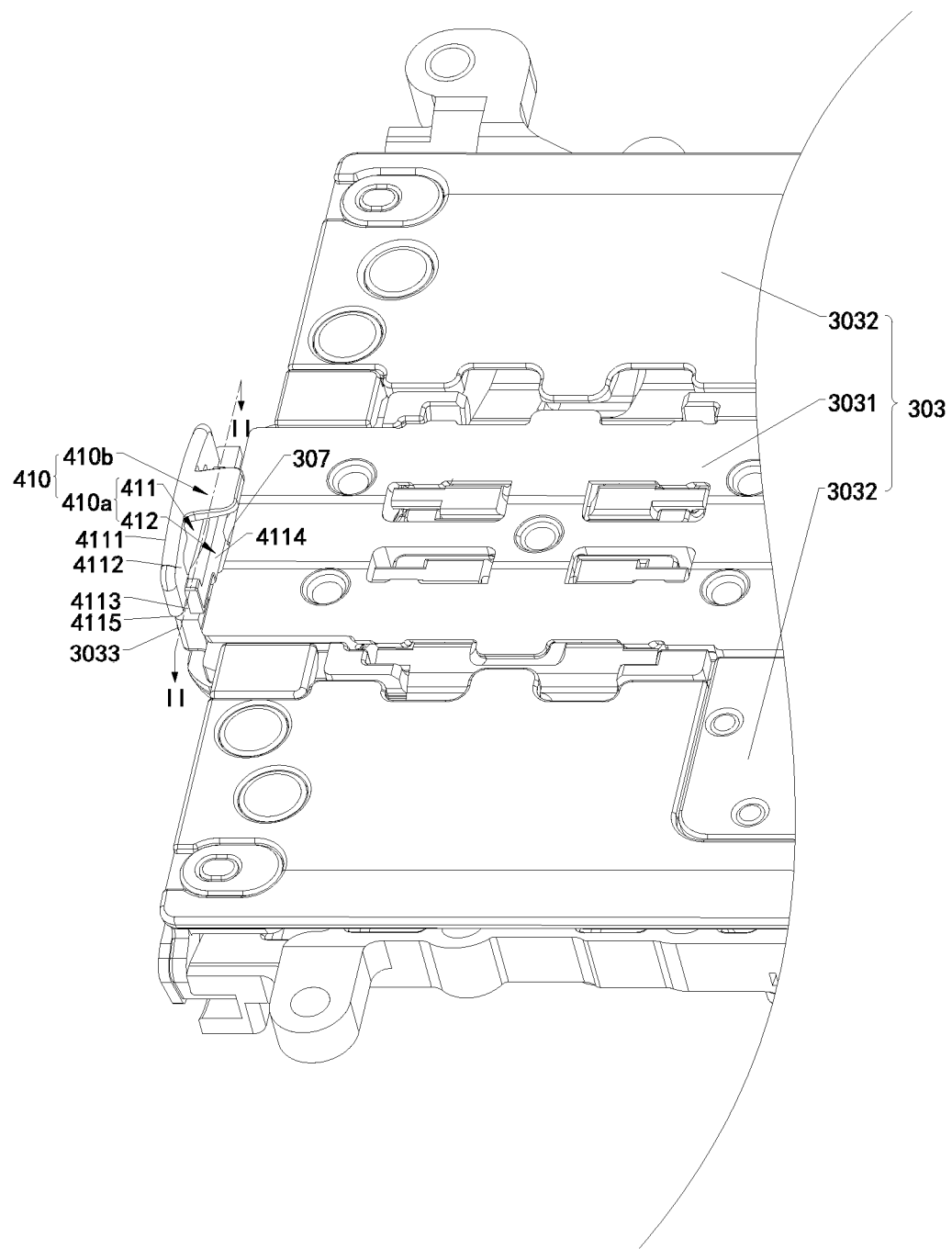
FIG. 56 is a schematic diagram of a partial structure when a rigid member of the edge protection structure shown in FIG. 55 is fastened to a rotating shaft assembly.
Figure 57:
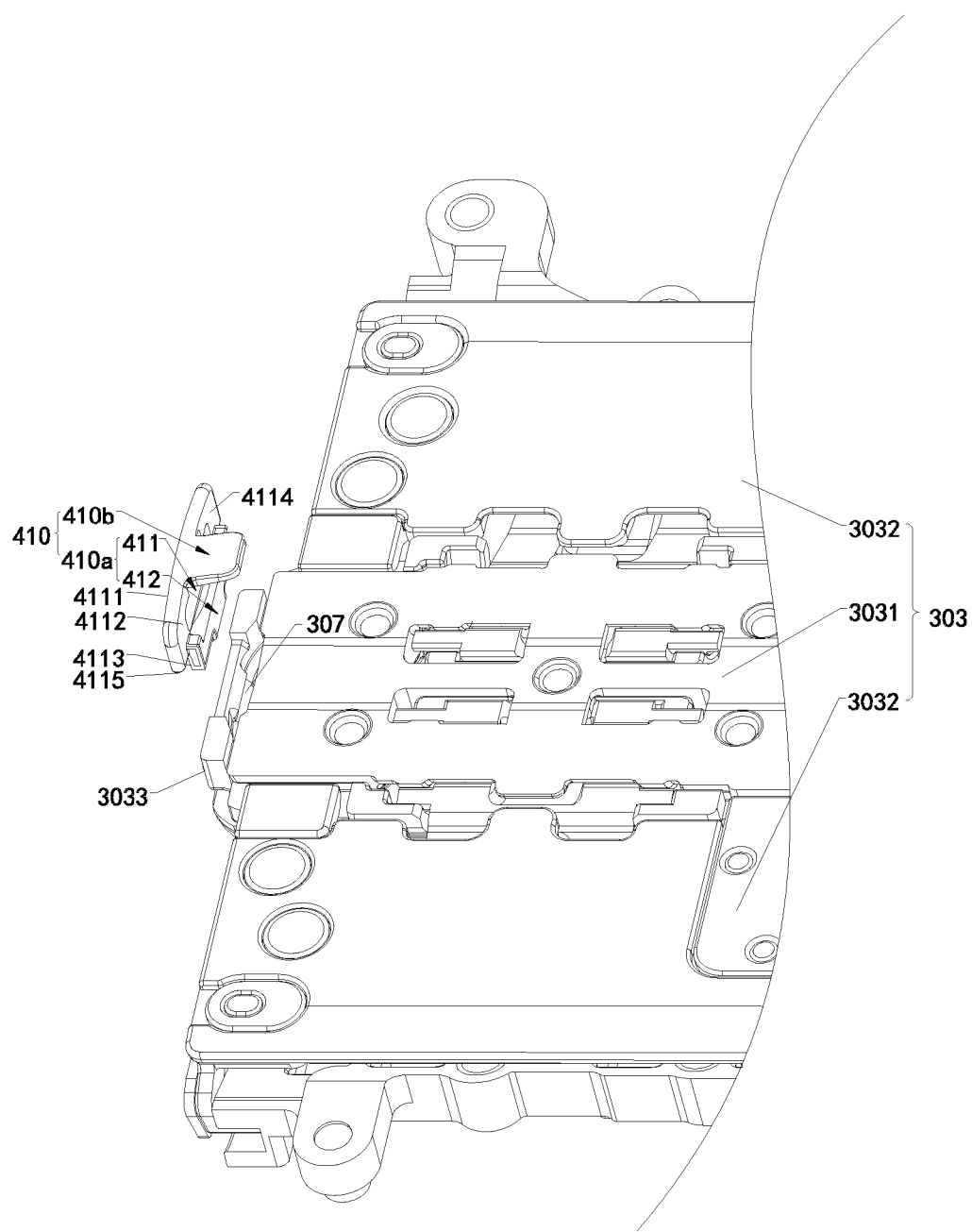
FIG. 57 is a schematic exploded view of a partial structure of a rigid member of the edge protection structure shown in FIG. 55 and a rotating shaft assembly.
Figure 58:
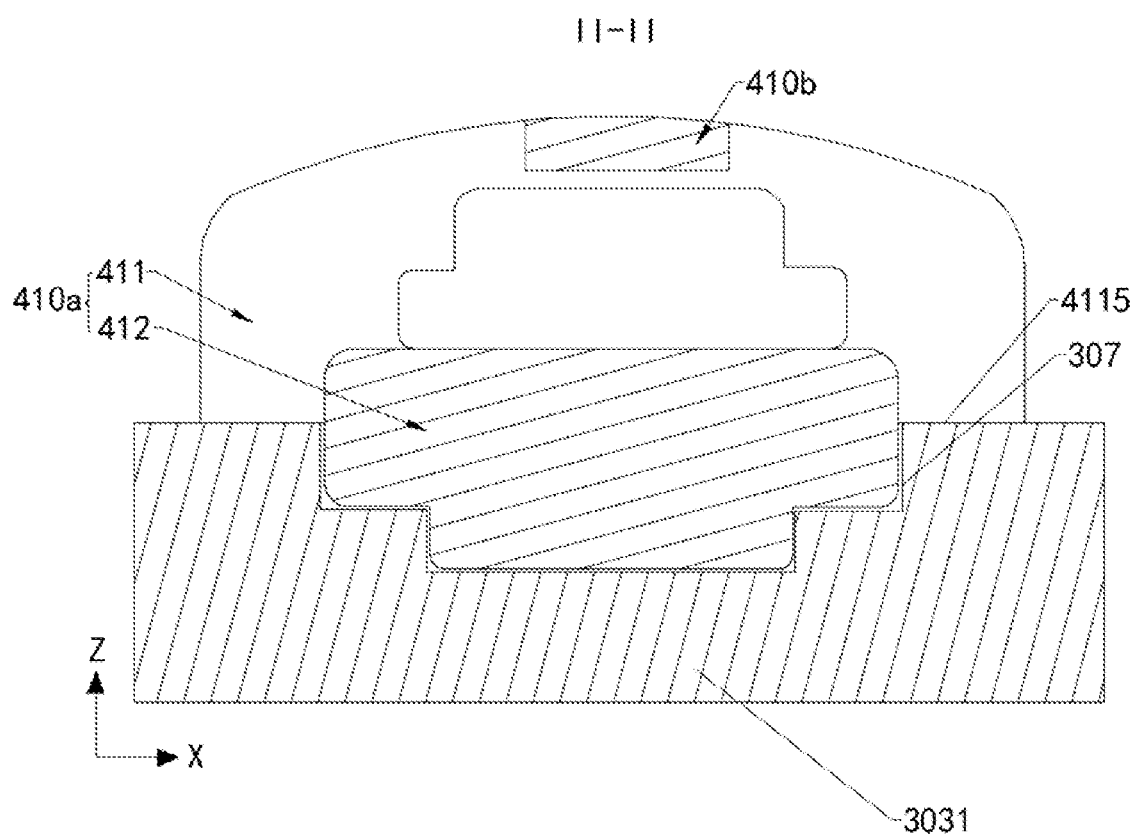
FIG. 58 is a cross sectional schematic view of a position II-II in FIG. 56.

Refer to FIG. 56, FIG. 57, and FIG. 58. FIG. 56 is a schematic diagram of a partial structure when the rigid member 410 of the edge protection structure 100 shown in FIG. 55 is fastened to the rotating shaft assembly 303. FIG. 57 is a schematic exploded view of a partial structure of the rigid member 410 of the edge protection structure 100 shown in FIG. 55 and the rotating shaft assembly 303. FIG. 58 is a cross sectional schematic view of a position II-II in FIG. 56. In this implementation, the fastening end 412 of the rigid member 410 is fastened to the stationary shaft 3031 of the rotating shaft assembly 303. In this way, the edge protection structure 100 is fastened to the rotating shaft assembly 303. In this implementation, slots 307 are disposed at two ends of the stationary shaft 3031, and the fastening end 412 of the rigid member 410 is inserted into the slot 307 and fastened. In this implementation, the fastening end 412 of the rigid member 410 is inserted into the slot 307, and is fastened to a slot wall of the slot 307 by using an adhesive. It may be understood that, in some other implementations of this application, the rigid member 410 may be alternatively fastened to the stationary shaft 3031 in another manner. For example, the rigid member 410 may be fastened to the stationary shaft 3031 in various manners such as buckling and screw fastening. Details are not described herein.

In this implementation of this application, when the fastening end 412 of the rigid member 410 is inserted into the slot 307 of the stationary shaft 3031, the fifth surface 4115 of the rigid member 410 is in contact with a surface of the stationary shaft 3031. This ensures that the fastening end 412 of the rigid member 410 can be more stable when being inserted into the stationary shaft 3031, and is unlikely to shake to fall off.

Refer to FIG. 58. In some implementations, a width of the fastening end 412 is less than a width of the connecting end 411, and a width direction of the fastening end 412 and a width direction of the connecting end 411 are the same, and are both an X-axis direction shown in FIG. 58. When the fastening end 412 of the rigid plate 410*a* is inserted into the slot 307 of the stationary shaft 3031, a part that is of the connecting end 411 and that exceeds the fastening end 412 in the width direction abuts against the surface of the stationary shaft 3031. This can further ensure that the fastening end 412 of the rigid member 410 can be more stable when being inserted into the slot 307 of the stationary shaft 3031, and is unlikely to shake to fall off.

Refer to FIG. 56 and FIG. 57. In some implementations, when the rigid member 410 is fastened to the stationary shaft 12, the first surface 4111 of the connecting end 411 of the rigid member 410 is coplanar with an end surface 3033 of the stationary shaft 3031, so that the foldable display terminal 1000 can have a flat appearance, to have the better appearance effect.

Refer to FIG. 53 and FIG. 54 again. The bump 410*b* protrudes from a side that is of the second surface 4112 and that is away from the fastening end 412. The bump 410*b* includes a fastening surface 4116. The fastening surface 4116 faces the display surface 203 of the display 200. In this implementation, the fastening surface 4116 may be perpendicular to the second surface 4112. The elastic sheet 420 is in contact with the fastening surface 4116 and is fastened to the fastening surface 4116. In this implementation, an adhesive layer 440 is disposed between the elastic sheet 420 and the bump 410*b*, and the elastic sheet 420 and the bump 410*b* are fastened by using the adhesive layer 440. The adhesive layer 440 may be various types of fastening adhesives. For example, in an implementation of this application, the adhesive layer 440 is a hot melt adhesive film layer, and the elastic sheet 420 and the bump 410*b* are fastened together by using the hot melt adhesive film layer. It may be understood that, in another implementation of this application, the elastic sheet 420 may be alternatively fastened to the bump 410*b* through clamping by using a buckle or in another manner. This is not specifically limited herein.

In this implementation of this application, the elastic sheet 420 is a strip sheet, and includes a first surface 42*a* and a second surface 42*b* that are disposed opposite to each other. The fastening surface 4116 of the bump 410*b* is in contact with the first surface 42*a* of the elastic sheet 420, and is fastened to the middle position of the elastic sheet 420. In this application, the elastic sheet 420 has elasticity, and can generate elastic deformation. The elasticity of the elastic sheet 420 is greater than elasticity of the rigid member 410. The bump 410*b* is fastened to the middle position of the elastic sheet 420. The elastic sheet 420 may be bent by using the bump 410*b* as an axis. To be specific, the elastic sheet 420 can be folded and bent by using, as an axis, a position at which the elastic sheet 420 and the bump 410*b* are fastened, so that two ends of the elastic sheet 420 are close to or far away from each other.

In this implementation of this application, the elastic sheet 420 has the elasticity, and may be made of a hyperelastic shape memory alloy or a high-modulus plastic material. The hyperelastic shape memory alloy (Shape Memory Alloy, SMA) has a capability of hyperelastic deformation, generates deformation under an action of external force, and is likely to restore after the external force is unloaded. In some implementations, for the hyperelastic shape memory alloy, a martensitic transformation temperature (Ms) is less than or equal to 40° C., more than 10% of room-temperature tissues are parent-phase austenitic tissues, and an elastic deformation amount is 1% to 10%. In this implementation of this application, the hyperelastic shape memory alloy may include but is not limited to a nickel-titanium base (nickel-titanium, nickel-titanium-niobium, nickel-titanium-palladium, and the like) alloy, a copper base (copper-gold-zinc, copper-aluminum, copper-tin, and the like) alloy, an iron base (iron-palladium, iron-manganese-silicon, iron-nickel-cobalt-titanium, iron-nickel-cobalt-aluminum-tantalum-boron, and the like) alloy, a nickel base (nickel-manganese-gallium, nickel-iron-gallium, and the like) alloy, a cobalt-base (cobalt-nickel, cobalt-manganese, and the like) alloy, and another alloy system, for example, a gold-cadmium hyperelastic shape memory alloy.

In some implementations, the elastic sheet 420 may be alternatively made of a high-modulus plastic material. For the elastic sheet 420, an elastic modulus Em≥2000 MPa. For example, in some implementations of this application, the elastic sheet 420 may be a high-modulus polyethylene terephthalate (polyethylene terephthalate, PET) sheet or a high-modulus polyimide (polyimide, PI) sheet. It may be understood that the elastic sheet 420 in this application may be alternatively made of another material that can implement elastic deformation. The another material is not enumerated herein. In this application, the elastic sheet 420 may be thin, so that the elastic sheet 420 can have good elasticity. As a result, the elastic sheet 420 can have better bending performance, and can be bent with the foldable display terminal 1000 for a plurality of times, to ensure a service life of the elastic sheet 420. In addition, the elastic sheet 420 is thin, so that the elastic sheet 420 can have specific elasticity, can also ensure synchronous bending of the edge protection structure 100 with the display 200, to avoid a case that interaction force is generated between the edge protection structure 100 and the display 200 to damage the display 200, and can also avoid impact on folding effect of the foldable display terminal 1000. In some implementations of this application, a thickness of the elastic sheet 420 may be less than or equal to 0.1 mm, that is, the thickness of the elastic sheet 420 is small. This prevents the elastic sheet 420 from increasing a thickness of the foldable display terminal 1000.

Figure 59:
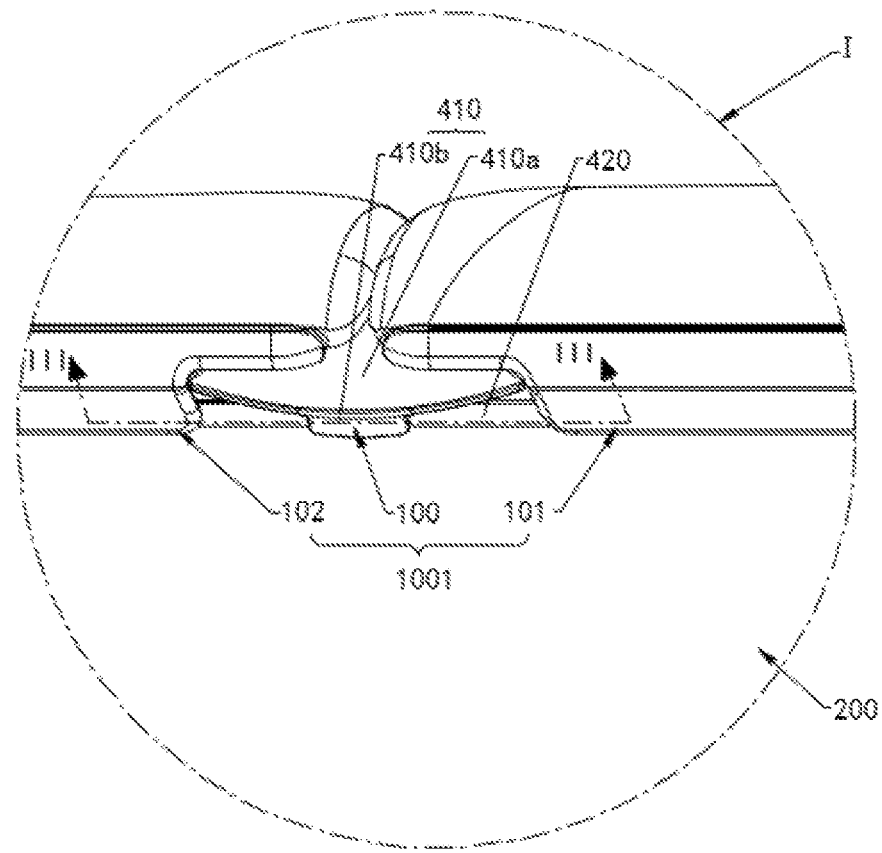
FIG. 59 is a schematic enlarged view of a position I of a foldable display terminal after an edge protection structure in the foldable display terminal shown in FIG. 1 is replaced with the edge protection structure shown in FIG. 53.
Figure 60:
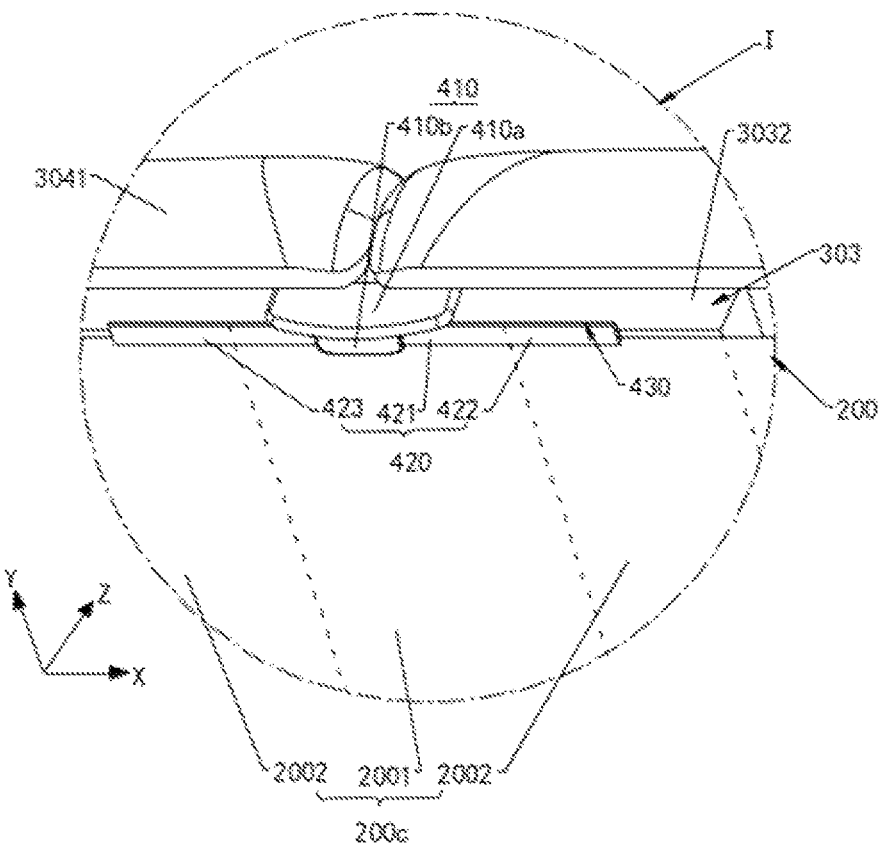
FIG. 60 is a schematic diagram of a position relationship between the edge protection structure shown in FIG. 53 and another structure of a foldable display terminal.
Figure 61:
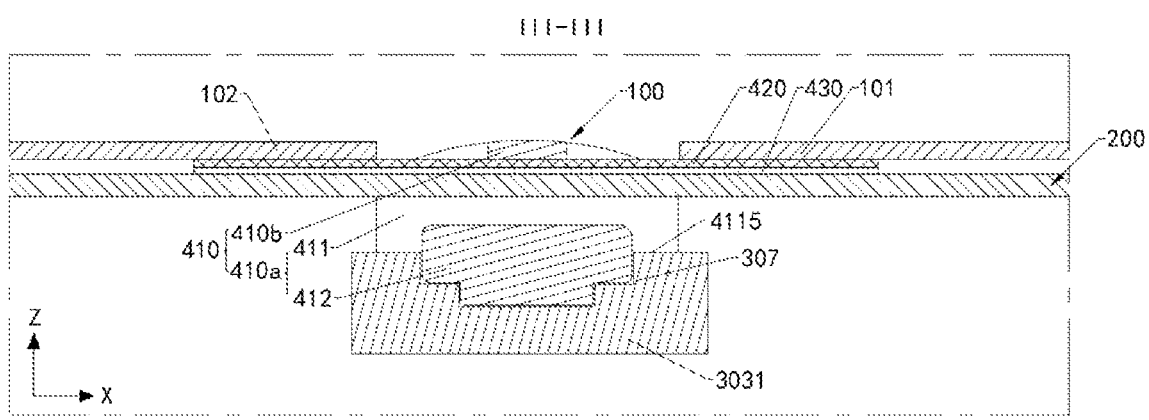
FIG. 61 is a partial cross sectional schematic view obtained through cutting along a position III-III in FIG. 59.

Refer to FIG. 59, FIG. 60, and FIG. 61. FIG. 59 is a schematic enlarged view of a position I of the foldable display terminal 1000 shown in FIG. 1 after the edge protection structure 100 in the foldable display terminal 1000 is replaced with the edge protection structure 100 shown in FIG. 53. FIG. 60 is a schematic diagram of a position relationship between the edge protection structure 100 shown in FIG. 53 and another structure of the foldable display terminal 1000. FIG. 61 is a partial cross sectional schematic view obtained through cutting along a position III-III in FIG. 59. In this implementation of this application, when the edge protection structure 100 is mounted in the foldable display terminal 1000, the rigid plate 410a of the edge protection structure 100 is disposed on one side of the side surface 204 of the display 200, the connection surface of the rigid plate 410a faces the side surface 204 of the display 200, and the rigid plate 410a is located in a length extension direction of the bending region 2001. The elastic sheet 420 of the edge protection structure 100 covers edges of the bending region 2001 of the display 200 and a part of the connection region 2002. The length extension direction of the bending region 2001 is a Y direction in FIG. 60. In this implementation, an arrangement direction of the first fastening region 200a, the bending region 2001, and the second fastening region 200b of the display 200 vertically intersect with the length extension direction of the bending region 2001. In this implementation of this application, the elastic sheet 420 of the edge protection structure 100 includes a first section 421, a second section 422, and a third section 423. The second section 422 and the third section 423 are respectively connected to two sides of the first section 421. It should be noted that, in this implementation of this application, there is no clear boundary between the first section 421, the second section 422, and the third section 423, and the first section 421, the second section 422, and the third section 423 are different regions obtained by dividing the elastic sheet 420 for ease of description. The first section 421 is a region that is of the elastic sheet 420 and that is opposite to the bending region 2001 of the display 200, and the first section 421 covers the edge of the bending region 2001. The second section 422 is a region that is of the elastic sheet 420 and that is opposite to one connection region 2002 of the display 200. The third section 423 is a region that is of the elastic sheet 420 and that is opposite to the other connection region 2002 of the display 200. In this application, the rigid plate 410a is disposed on the side of the side surface 204 of the display 200, and the rigid plate 410a is disposed in the length extension direction of the bending region 2001. The elastic sheet 420 is located on one side of the display surface 203 of the display 200, and the first section 421 of the elastic sheet 420 covers the edge of the bending region 2001 of the display 200. As a result, the edge of the bending region 2001 of the display 200 can be wrapped by the rigid plate 410a and the elastic sheet 420, to prevent the edge of the bending region 2001 from being exposed, and improve the appearance effect of the foldable display terminal 1000. In addition, when the bending region 2001 of the display 200 is collided, the rigid plate 410a and the first section 421 of the edge protection structure 100 can protect the bending region 2001 of the display 200. This prevents the edge of the bending region 2001 of the display 200 from being damaged due to the collision, thereby improving reliability of the display 200 and the foldable display terminal 1000.

Refer to FIG. 59 and FIG. 61. In this implementation of this application, the second section 422 of the elastic sheet 420 is located between the first edge protector 101 and the display 200, and the third section 423 of the elastic sheet 420 is located between the second edge protector 102 and the display 200. In other words, the two ends of the elastic sheet 420 can be pressed by using the first edge protector 101 and the second edge protector 102. This prevents the two ends of the elastic sheet 420 from tilting.

In this implementation of this application, lengths of the second section 422 and the third section 423 fall within a specific range. This avoids a case that the second section 422 and the third section 423 are excessively long and occupy excessive internal space of the foldable display terminal 1000, and can also avoid a case that the second section 422 is excessively short and is separated between the first edge protector 101 and the display 200 in a bending process or the third section 423 is excessively short and is separated between the second edge protector 10 and the display 200 in a bending process.

Figure 62:
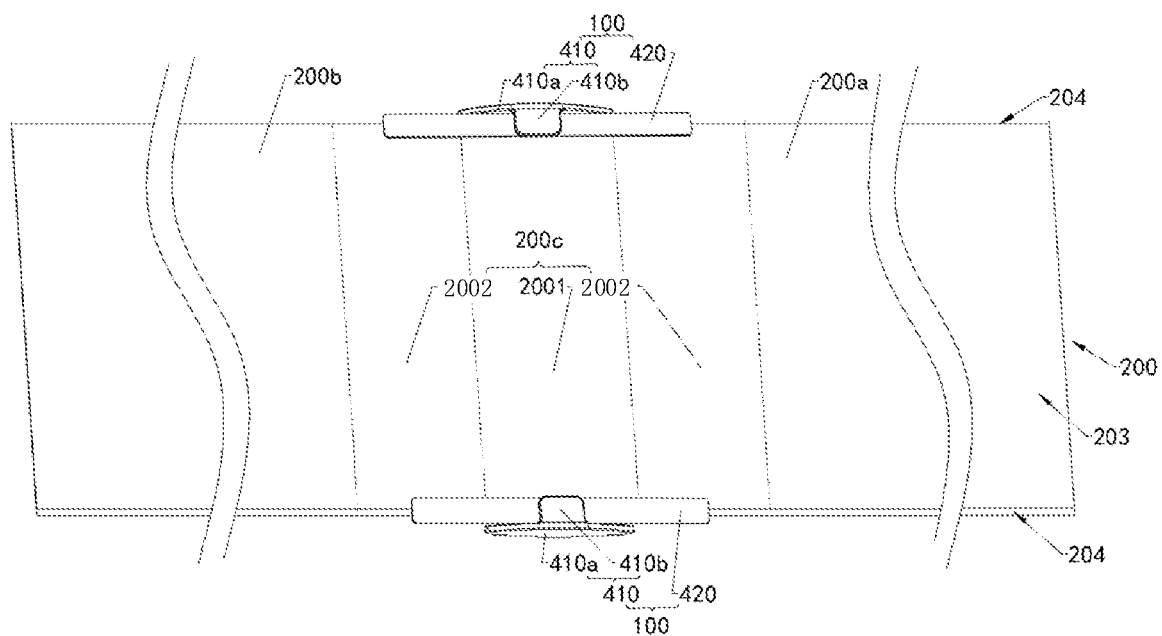
FIG. 62 is a schematic diagram of a structure state of a display of a foldable display terminal and the edge protection structure shown in FIG. 53 when an edge protection structure of the foldable display terminal in FIG. 1 is replaced with the edge protection structure and the foldable display terminal is in the unfolded state shown in FIG. 1.
Figure 63:
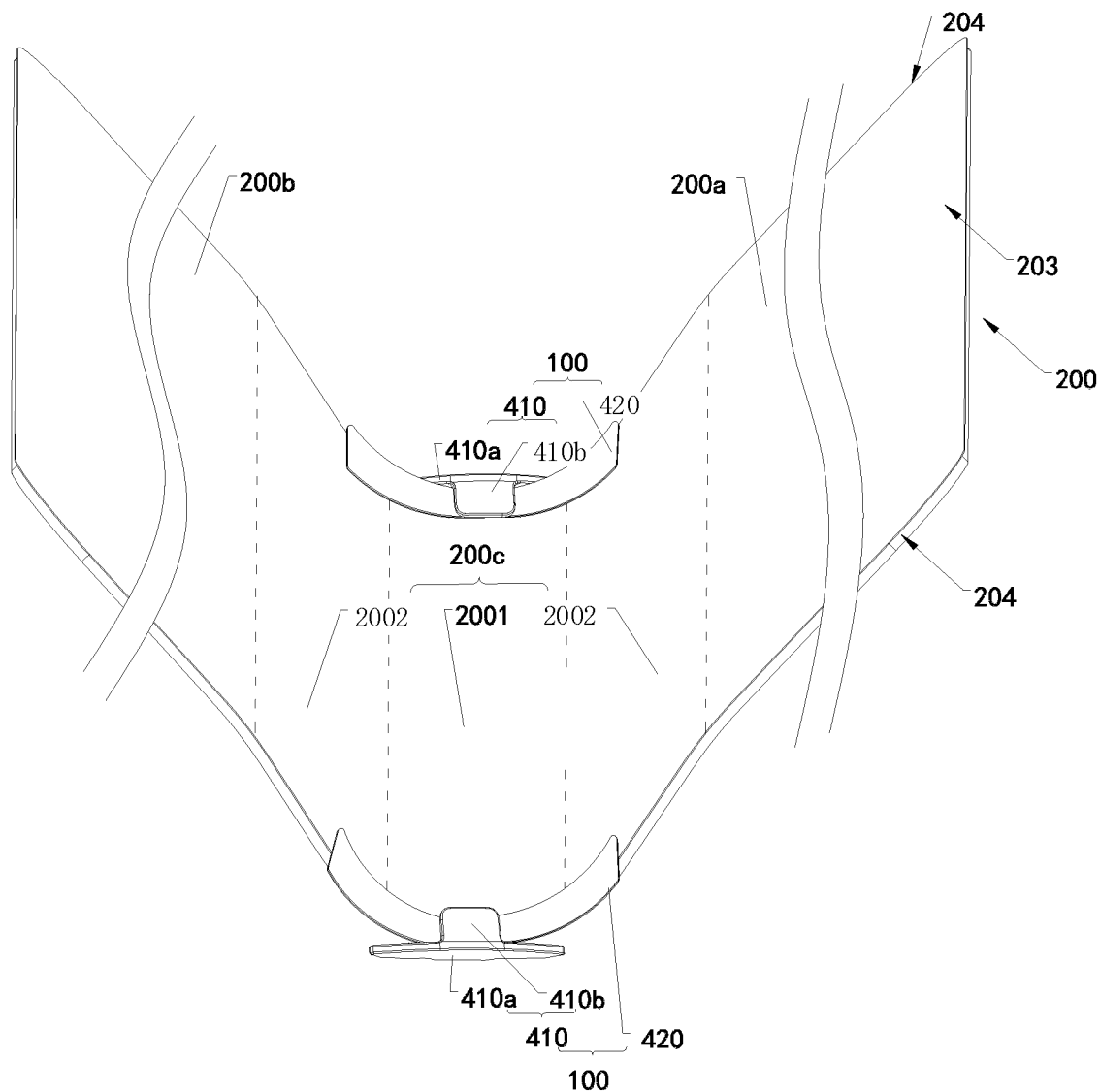
FIG. 63 is a schematic diagram of a structure state of a display of a foldable display terminal and the edge protection structure shown in FIG. 53 when an edge protection structure of the foldable display terminal in FIG. 1 is replaced with the edge protection structure and the foldable display terminal is folded to the intermediate state shown in FIG. 2.
Figure 64:
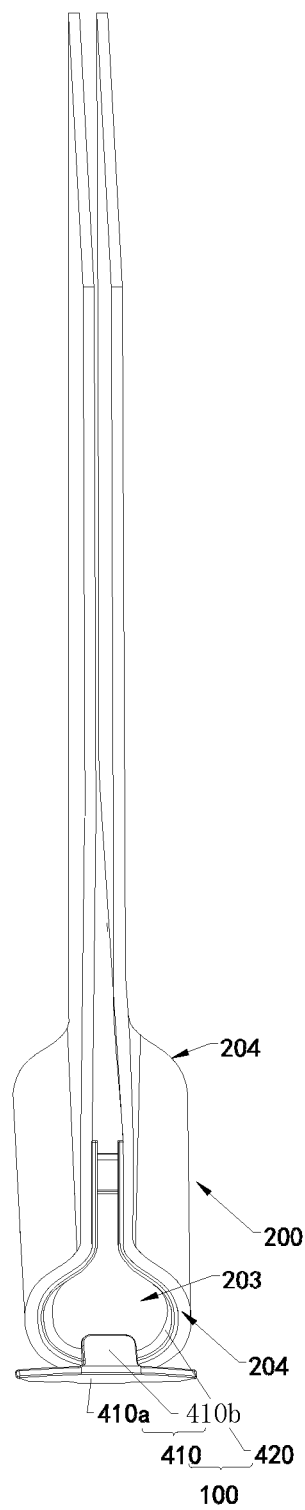
FIG. 64 is a schematic diagram of a structure state of a display of a foldable display terminal and the edge protection structure shown in FIG. 53 when an edge protection structure of the foldable display terminal in FIG. 1 is replaced with the edge protection structure and the foldable display terminal is folded to the fully closed state shown in FIG. 3.

Refer to FIG. 62 to FIG. 64. FIG. 62 is a schematic diagram of a structure state of the display 200 of the foldable display terminal 1000 in FIG. 1 and the edge protection structure 100 shown in FIG. 53 when the edge protection structure 100 of the foldable display terminal 1000 is replaced with the edge protection structure 100 and the foldable display terminal 1000 is in the unfolded state shown in FIG. 1. FIG. 63 is a schematic diagram of a structure state of the display 200 of the foldable display terminal 1000 in FIG. 1 and the edge protection structure 100 shown in FIG. 53 when the edge protection structure 100 of the foldable display terminal 1000 is replaced with the edge protection structure 100 and the foldable display terminal 1000 is folded to the intermediate state shown in FIG. 2. FIG. 64 is a schematic diagram of a structure state of the display 200 of the foldable display terminal 1000 in FIG. 1 and the edge protection structure 100 shown in FIG. 53 when the edge protection structure 100 of the foldable display terminal 1000 is replaced with the edge protection structure 100 and the foldable display terminal 1000 is folded to the fully closed state shown in FIG. 3. When the foldable display terminal 1000 is folded, the ends of the first body 301 and the second body 302 of the foldable display terminal 1000 that are away from the rotating shaft assembly 303 are close to each other, to drive the display 200, that is fastened to the first body 301 and the second body 302, to fold. In this implementation, when the display 200 is folded, the elastic sheet 420 covering the edge of the rotating shaft region 200*c* of the display 200 can be bent and deformed with the display 200. In this implementation, the elastic sheet 420 is made of the elastically deformable material, basically does not affect a state of the display 200 when the display 200 is bent, but can correspondingly change a shape with the bending state of the display 200 when the display 200 is bent. Therefore, when the display 200 in this implementation of this application is fully folded, the first fastening region 200*a* and the second fastening region 200*b* of the display 200 can be attached together, to implement a good folding form. In other words, in this implementation, the edge protection structure 100 disposed in the foldable display terminal 1000 is provided, to protect the edge of the bending region 2001 of the display 200 of the foldable display terminal 1000, and improve the appearance effect of the foldable display terminal 1000, without affecting folding effect of the display 200 of the foldable display terminal 1000 and reliability of the display 200.

Refer to FIG. 53 and FIG. 54 again. In some implementations of this application, the edge protection structure 100 further includes a smooth layer 430, and the smooth layer 430 covers the second surface 42*b* of the elastic sheet 420. A smoothness degree of a surface that is of the smooth layer 430 and that is away from the elastic sheet 420 is greater than a smoothness degree of a surface of the elastic sheet 420. When the edge protection structure 100 is mounted in the foldable display terminal 1000, the second surface 42*b* of the elastic sheet 420 faces the display 200, and the second surface 42*b* can be in contact with the display 200. In this implementation of this application, the second surface 42*b* of the elastic sheet 420 is covered with the smooth layer with higher smoothness degree, so that the smooth layer 430 is in contact with the display 200 when the edge protection structure 100 is mounted in the foldable display terminal 1000. Because the smooth layer 430 has a smooth surface, frictional acting force between the edge protection structure 100 and the display 200 can be reduced. This ensures that a process of bending or unfolding the foldable display terminal 1000 is smoother, and prevents the display 200 from being damaged due to frictional acting force between the elastic sheet 420 and the display 200.

Figure 65:
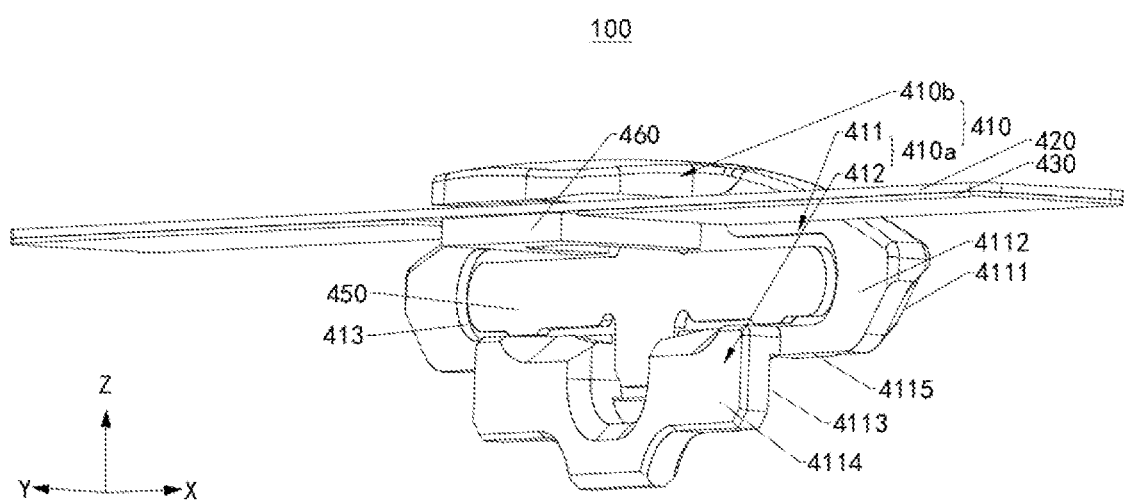
FIG. 65 is a schematic diagram of a structure of an edge protection structure according to a twelfth implementation of this application.
Figure 66:
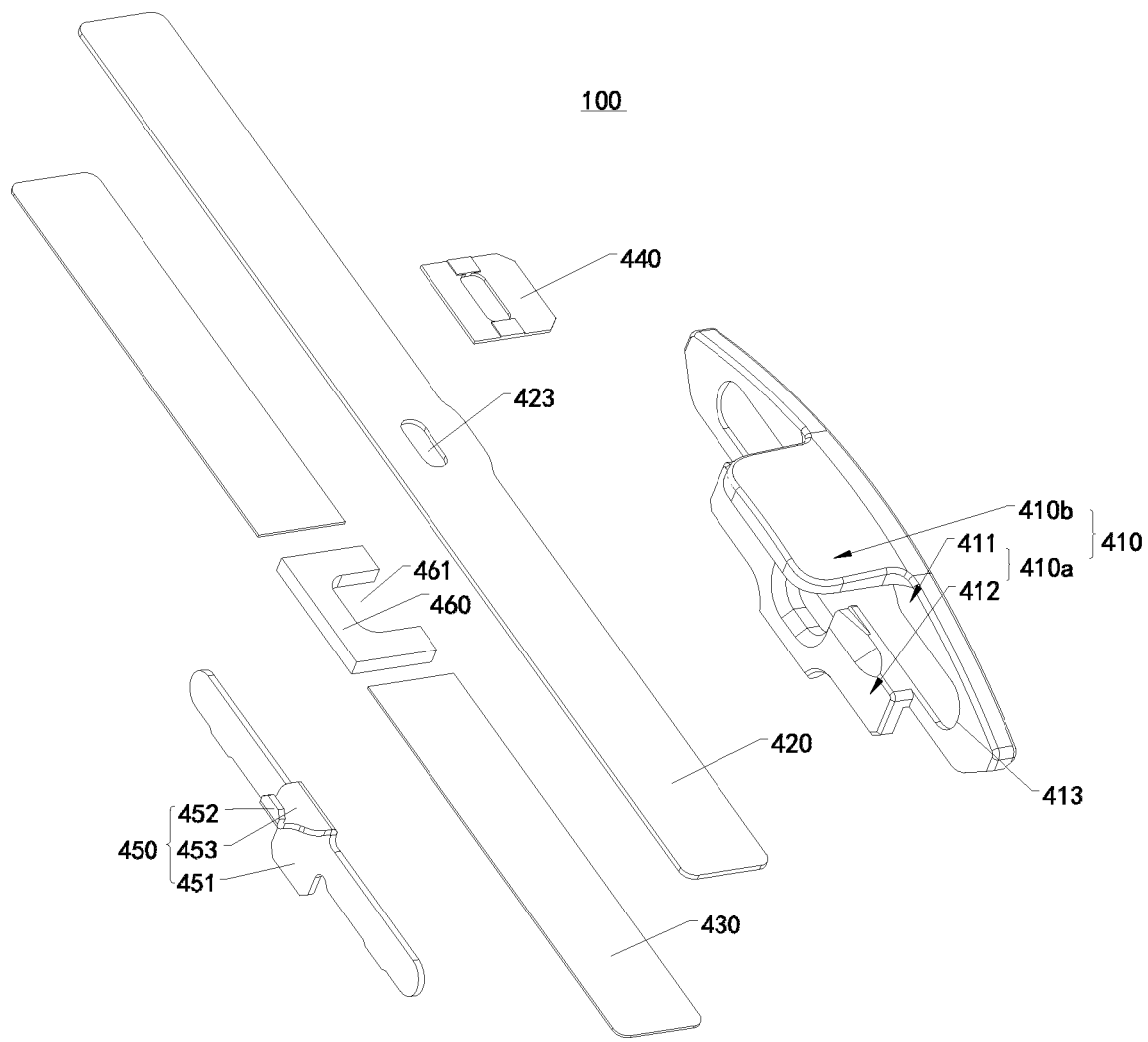
FIG. 66 is a schematic exploded view of the edge protection structure shown in FIG. 65.
Figure 67:
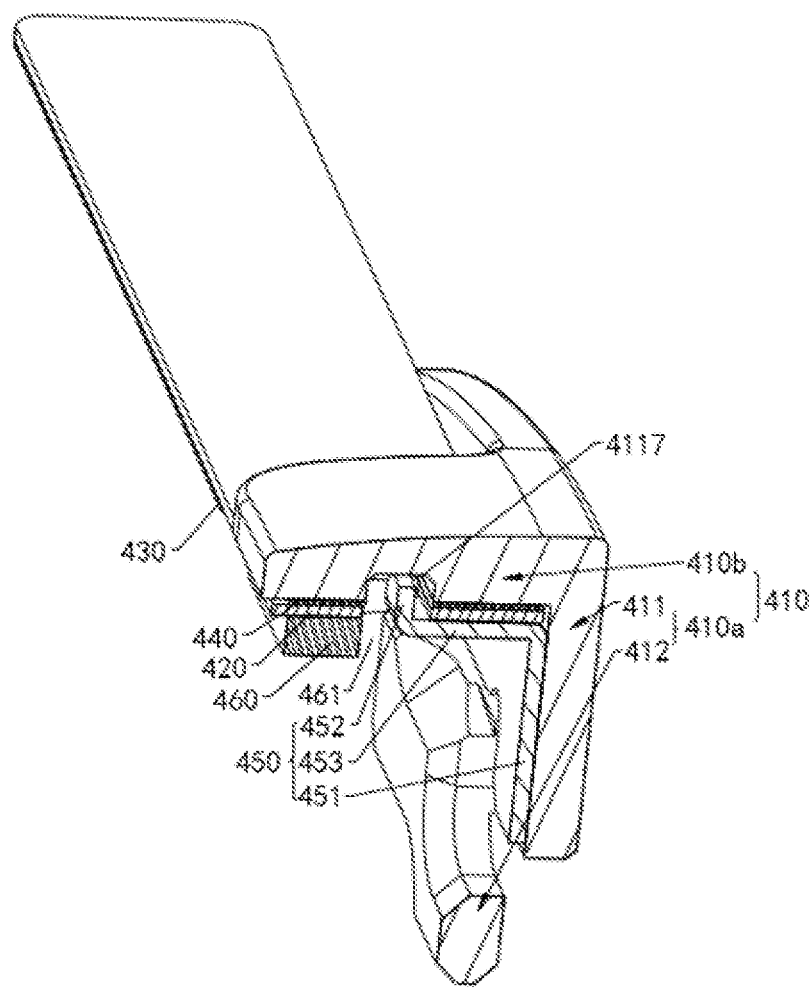
FIG. 67 is a cross sectional schematic view of the edge protection structure shown in FIG. 65.

Refer to FIG. 65, FIG. 66, and FIG. 67. FIG. 65 is a schematic diagram of a structure of the edge protection structure 100 according to a twelfth implementation of this application. FIG. 66 is a schematic exploded view of the edge protection structure 100 shown in FIG. 65. FIG. 67 is a cross sectional schematic view of the edge protection structure 100 shown in FIG. 65. A structure of the edge protection structure 100 in this implementation is basically the same as the structure of the edge protection structure 100 shown in FIG. 53, and includes the rigid member 410, the elastic sheet 420, the smooth layer 430, and the adhesive layer 440. A difference between the edge protection structure 100 in this implementation and the edge protection structure 100 shown in FIG. 53 lies in that the edge protection structure 100 in this implementation further includes a stiffener 450. The stiffener 450 includes a first part 451, a second part 452, and a third part 453 connected between the first part 451 and the second part 452. The first part 451 is fastened to the rigid member 410, the second part 452 passes through the elastic sheet 420 and the adhesive layer 440 to be is in contact with the bump 410*b*, and the third part 453 is located on a side that is of the elastic sheet 420 and that is away from the bump 410*b*. In this implementation, the elastic sheet 420 can be limited between the third part 453 and the bump 410*b*, to avoid separation between the elastic sheet 420 and the rigid member 410 when fastening between the elastic sheet 420 and the bump 410*b* fails. In addition, a through hole 423 is disposed on the elastic sheet 420. An end that is of the second part 452 and that is away from the third part 453 passes through the through hole 423 to one side of the first surface 42*a* of the elastic sheet 420 from the second surface 42*b* of the elastic sheet 420, and is in contact with the bump 410*b*. This further strengthens a connection between the elastic sheet 420 and the rigid member 410, and avoids separation between the elastic sheet 420 and the rigid member 410. It may be understood that, in some implementations of this application, an end that is of the second part 452 and that is away from the third part 453 may alternatively pass through the through hole 423 to one side of the first surface 42*a* of the elastic sheet 420 from the second surface 42*b* of the elastic sheet 420, but there is a gap between the end and the bump 410*b*, but it can be ensured that the elastic sheet 420 and the rigid member 410 are fastened.

In this implementation, the smooth layer 430 covers only another region of the second surface 42*b* of the elastic sheet 420 other than a position opposite to the bump 410*b*. In other words, the smooth layer 430 covers the second surface 42*b* of the elastic sheet 420, but a position that is of the smooth layer 430 and that is opposite to the bump 410*b* is hollow. As a result, the smooth layer 430 does not need to cover the third part 453, so that the smooth layer 430 can be conveniently formed on the elastic sheet 420.

Figure 68:
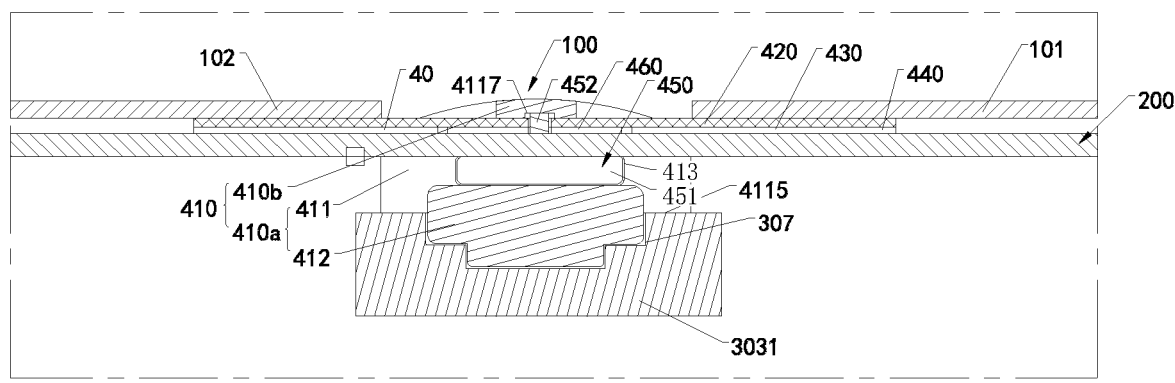
FIG. 68 is a cross sectional schematic view obtained through cutting along a position III-III after the edge protection structure shown in FIG. 59 is replaced with the edge protection structure shown in FIG. 65.

Refer to FIG. 67 and FIG. 68. FIG. 68 is a cross sectional schematic view obtained through cutting along a position III-III after the edge protection structure 100 shown in FIG. 59 is replaced with the edge protection structure 100 shown in FIG. 65. In some implementations of this application, a groove 4117 that is concavely disposed in a direction away from the elastic sheet 420 is disposed on the fastening surface 4116 of the bump 410*b*, and the end that is of the second part 452 and that is away from the third part 453 is inserted into the groove 4117. This further prevents the elastic sheet 420 from being separated from the bump 410*b*.

Refer to FIG. 66 and FIG. 68 again. The edge protection structure 100 shown in FIG. 66 further includes a flexible member 460. The flexible member 460 is disposed at the position that is of the second surface 42*b* of the elastic sheet 420 and that is opposite to the bump 410*b*, and there is a specific gap between the flexible member 460 and the smooth layer 430. A hollow region 461 is disposed on the flexible member 460, and the third part 453 is located in the hollow region 461. A thickness of the smooth layer 430 and a thickness of the flexible member 460 are both greater than or equal to a thickness of the third part 453. When the edge protection structure 100 is mounted in the foldable display terminal 1000, the flexible member 460 is in contact with the display 200. Because the thickness of the flexible member 460 is greater than or equal to the thickness of the third part 453, the third part 453 is not in direct contact with the display 200. This avoids a case that the third part 453 is in direct contact with the display 200 to damage the display 200.

In this implementation of this application, the flexible member 460 may be made of a flexible material, for example, foam, rubber, or silica gel, and can be deformed when being pressed. Therefore, it is ensured that the flexible member 460 does not generate large acting force for the display 200 when the display 200 is bent and deformed, to avoid a problem that the display 60 is damaged because the flexible member 460 squeezes the display 200.

Refer to FIG. 65 again. In some implementations of this application, a mounting groove 413 is concavely disposed on the connection surface of the rigid plate 410*a*, and a notch direction of the mounting groove 413 faces a side on which the bump 410*b* is located. In this implementation, the mounting groove 413 is disposed at the connecting end 411 of the rigid plate 410*a*, and is concavely disposed toward the first surface 11 from the second surface 4112 of the connecting end 411. The first part 451 of the stiffener 450 is embedded in the mounting groove 413. In this implementation, the first part 451 is in interference fit with the mounting groove 413, that is, the first part 451 is slightly greater than the mounting groove 413. After the first part 451 is mounted in the mounting groove 413, elastic pressure is generated between the first part 451 and the mounting groove 413, so that a firm connection is obtained. In some implementations, the first part 451 may be further fastened to the mounting groove 413 in a manner, for example, adhesive fastening or welding fastening, so that there is a more stable fastening relationship between the first part 451 and the mounting groove 413. It may be understood that, in some other implementations of this application, the rigid plate 410*a* may alternatively have no mounting groove 413, and the first part 451 is fastened to the second surface 4112 of the rigid plate 410*a* in a manner, for example, adhesive fastening or welding fastening.

In this implementation of this application, the rigid plate 410*a* of the edge protection structure 100 is disposed on the side of the side surface 204 of the display 200, and the rigid plate 410*a* is located in a length extension direction of the bending region 2001. The length extension direction of the bending region 2001 is a Y direction in FIG. 65. In this implementation, an arrangement direction of the first fastening region 200*a*, the bending region 2001, and the second fastening region 200*b* of the display 200 vertically intersect with the length extension direction of the bending region 2001. The first section 421 of the elastic sheet 420 of the edge protection structure 100 covers the edge of the bending region 2001 of the display 200, that is, the edge of the bending region 2001 of the display 200 can be wrapped by the rigid member 410 and the elastic sheet 420. This prevents the edge of the bending region 2001 from being exposed, to improve the appearance effect of the foldable display terminal 1000. In addition, when the bending region 2001 of the display 200 is collided, the rigid member 410 and the first section 421 of the edge protection structure 100 can protect the bending region 2001 of the display 200. This prevents the edge of the bending region 2001 of the display 200 from being damaged due to the collision, thereby improving reliability of the display 200 and the foldable display terminal 1000.

Figure 69:
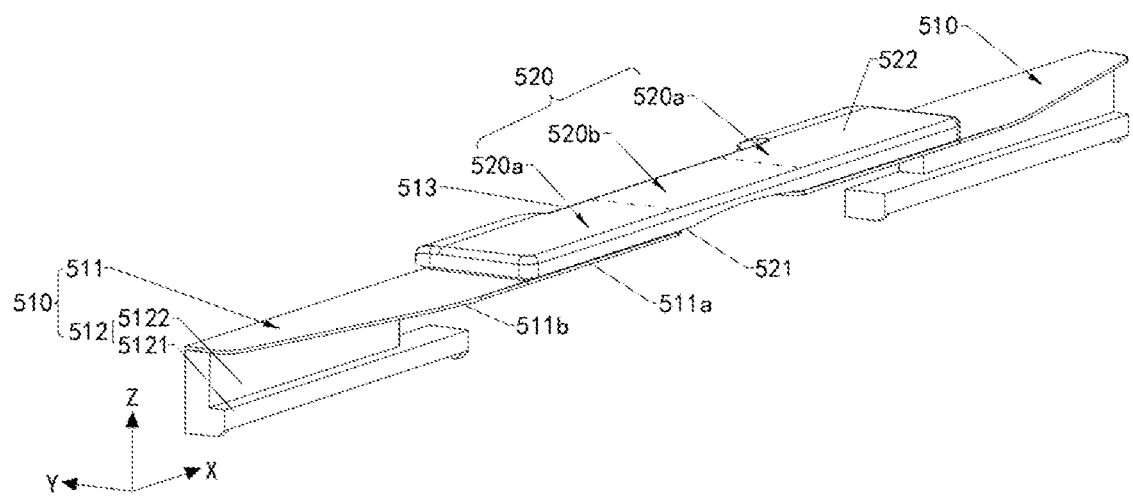
FIG. 69 is a schematic diagram of a thirteenth edge protection structure according to this application.
Figure 70:
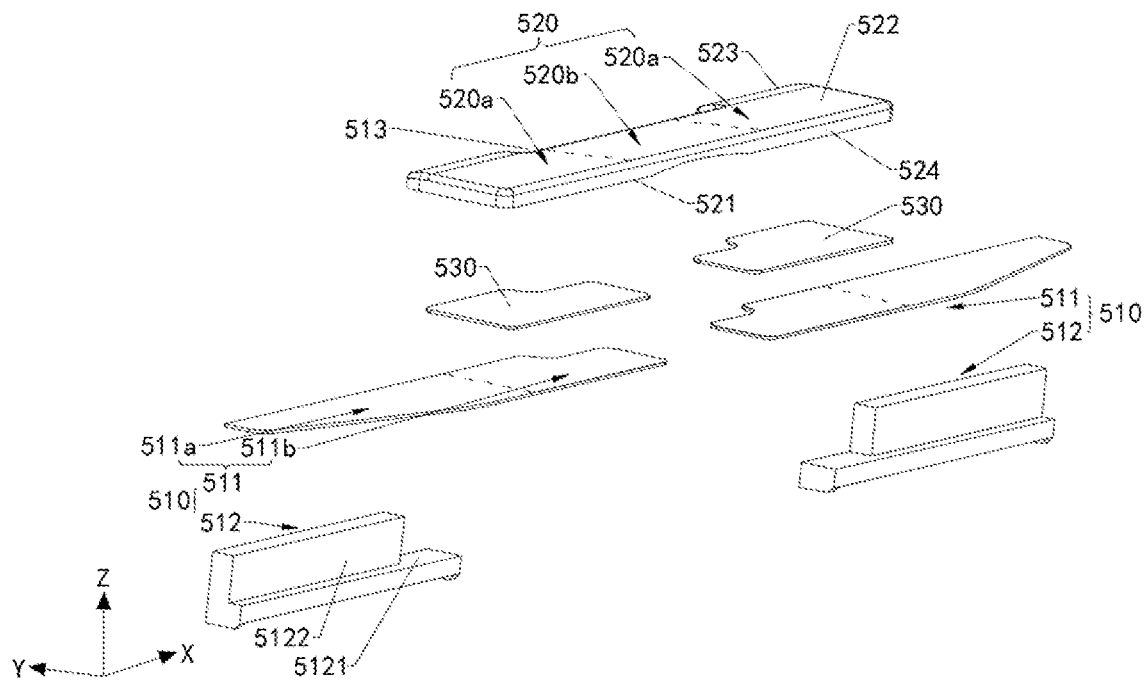
FIG. 70 is a schematic exploded view of the edge protection structure shown in FIG. 69.

Refer to FIG. 69 and FIG. 70. FIG. 69 is a schematic diagram of a thirteenth edge protection structure 100 according to this application. FIG. 70 is a schematic exploded view of the edge protection structure 100 shown in FIG. 69. In this implementation of this application, the edge protection structure 100 includes two fastening members 510 and a flexible member 520 connected between the two fastening members 510. In this implementation, the two fastening members 510 are respectively a first fastening member and a second fastening member. Each fastening member 510 includes a fastening plate 511 and a fastening block 512 fixedly connected to the fastening plate 511. In this implementation, two ends of the flexible member 520 are respectively fastened to the fastening plates 511 of the two fastening members 510, and the flexible member 520 is located on a side that is of the fastening plate 511 and that is away from the fastening block 512.

In this implementation, the flexible member 520 is a mechanical member with good flexibility, and can be bent randomly. In this implementation, flexibility of the flexible member 520 is greater than flexibility of the fastening member 510. The flexible member 520 includes two first regions 520*a* disposed at an interval and a second region 520*b* located between the two first regions 520*a*. The flexible member 520 further includes a first surface 521 and a second surface 522 that are disposed opposite to each other. In this implementation, the fastening plate 511 is fastened to the first surface 521, and is fastened to a region that is of the first surface 521 and that is located in the first region 520*a*. The fastening plate 511 of the first fastening member and the fastening plate 511 of the second fastening member are fixedly connected to the two first regions 520*a* of the flexible member 520 respectively. In this implementation, the first fastening member and the second fastening member are disposed at an interval. An interval region between the fastening plate 511 of the first fastening member and the fastening plate 511 of the second fastening member is opposite to the second region 520*b* of the flexible member 520. When the edge protection structure 100 is folded with the foldable display terminal 1000, the second region 520*b* of the flexible member 520 is not affected by the fastening plate 511. This ensures that the flexible member 520 can have good folding effect.

In this implementation of this application, when the edge protection structure 100 is mounted in the foldable display terminal 1000, the flexible member 520 is located outside the foldable display terminal 1000. When the foldable display terminal 1000 is collided, a collision position is usually located on the flexible member 520. Because the flexible member 520 has the good flexibility, the flexible member 520 can achieve good buffer effect, to prevent acting force generated by the collision from being transferred to the display 200, so as to implement a good protection function for the display 200.

In some implementations of this application, the flexible member 520 may be made of a material, for example, silica gel, a thermoplastic elastomer (thermoplastic elastomer, TPE), thermoplastic polyurethane (thermoplastic polyurethane, TPU), polyvinyl chloride (polyvinyl chloride, PVC) soft rubber, or rubber (for example, silicone rubber, natural rubber, cis-1,4-polybutadiene rubber, styrene-butadiene rubber, or ethylene propylene rubber). It may be understood that the flexible member 520 in this application may be alternatively made of another flexible material. The another material is not enumerated herein.

In some implementations of this application, the second region 520b of the first surface 521 is concavely disposed toward the second surface 522. In this way, a thickness of a part that is of the flexible member 520 and that corresponds to the first region 520a is reduced. As a result, the flexible member 520 can have better bending effect, to prevent the edge protection structure 100 from affecting folding effect of the foldable display terminal 1000. In implementations shown in FIG. 69 and FIG. 70, the second region 520b of the first surface 521 is a cambered surface that is concave towards the second surface 522.

In some implementations of this application, a width of a middle section of the flexible member 520 is less than widths of two ends of the flexible member 520. In this way, the middle section of the flexible member 520 can have good bending effect. This ensures protection effect of the edge protection structure 100 for the display, and further prevents the edge protection structure 100 from affecting the folding effect of the foldable display terminal 1000. In the implementation shown in FIG. 70, the flexible member 520 further includes a third surface 523 and a fourth surface 524 that are disposed opposite to each other. The third surface 523 and the fourth surface 524 are both connected between the first surface 521 and the second surface 522. When the edge protection structure 100 is mounted in the foldable display terminal 1000, the third surface 523 of the flexible member 520 is closer to an outer side of the foldable display terminal 1000 than the fourth surface 524. In this implementation, a middle section of the third surface 523 is concavely disposed toward the fourth surface 524 to form a notch 513. In this way, the width of the middle section of the flexible member 520 is less than the widths of the two ends of the flexible member 520.

Refer to FIG. 70 again. In some implementations of this application, the fastening plate 511 may be an elastic member. Elasticity of the fastening plate 511 is greater than that of the fastening block 512 and that of the flexible member 520. In this way, when the fastening plate 511 is fixedly connected to the flexible member 520, the fastening plate 511 can provide specific support for the flexible member 520. In addition, the fastening plate 511 is also a structure having good elasticity. Therefore, the fastening plate 511 also has good bending performance, that is, the first region 520a that is of the flexible member 520 and that is fixedly connected to the fastening plate 511 can also be bent. As a result, the edge protection structure 100 can have better bending performance, and the edge protection structure 100 is prevented from affecting the folding effect of the foldable display terminal 1000. In addition, the fastening plate 511 has good elasticity. Therefore, it can be ensured that the edge protection structure 100 still does not generate large deformation after being bent for a plurality of times, to ensure a bending life of the edge protection structure 100.

In this implementation of this application, the fastening plate 511 may be a thin plate-like structure with good elasticity. In some implementations, a thickness of the fastening plate 511 may be less than or equal to 0.1 mm, that is, the thickness of the fastening plate 511 is small. This can ensure that the fastening plate 511 can have the good elasticity, and can prevent the fastening plate 511 from increasing a thickness of the foldable display terminal 1000. In some implementations of this application, the fastening plate 511 may be a high-modulus plastic sheet or a metal sheet. For example, the fastening plate 511 may be a high-modulus polyethylene terephthalate (polyethylene terephthalate, PET) sheet, a high-modulus polyimide (polyimide, PI) sheet, or a steel sheet. It may be understood that the fastening plate 511 in this application may be alternatively made of another material that can implement elastic deformation. The another material is not enumerated herein.

In some implementations of this application, the fastening plate 511 includes a first section 511a and a second section 511b connected to the first section 511a. The first section 511a is connected to the flexible member 520, and the second section 511b is connected to the fastening block 512. In other words, in this implementation, the fastening block 512 and the flexible member 520 are fastened to different sections of the fastening plate 511. This avoids that strength of the fastening block 512 affects bending performance of a part that is on the fastening plate 511 and that is connected to the flexible member 520, thereby ensuring that each position of the flexible member 520 can have good bending performance. It should be noted that, in this implementation, the first section 511a and the second section 511b of the fastening plate 511 are actually connected together and are an integrated structure, there is no clear boundary between the first section 511a and the second section 511b, and the first section 511a and the second section 511b in this application are two parts divided for ease of description of the solution.

Refer to FIG. 70 again. In this implementation, the edge protection structure 100 further includes an adhesive layer 530. The adhesive layer 530 covers a surface that is of the first section 511a of the fastening plate 511 and that faces the flexible member 520. The flexible member 520 may be bonded and fastened to the fastening plate 511 by using the adhesive layer 530. It may be understood that, in another implementation of this application, the flexible member 520 and the fastening plate 511 may be alternatively fastened in another manner. For example, in some implementations of this application, the fastening plate 511 is a metal sheet, the flexible member 520 is a plastic member, and the flexible member 520 and the fastening plate 511 are obtained through integrated molding. Specifically, the fastening plate 511 is first formed, then the fastening plate 511 is put into a mold, and next, a plastic material is injected into the mold to form the flexible member 520. In other words, the fastening plate 511 and the flexible member 520 are fastened together in a manner of injection molding. The flexible member 520 and the fastening plate 511 are formed in a manner of integrated molding to obtain an integrated structure, so that the connection between the flexible member 520 and the fastening plate 511 can be firmer.

Figure 71:
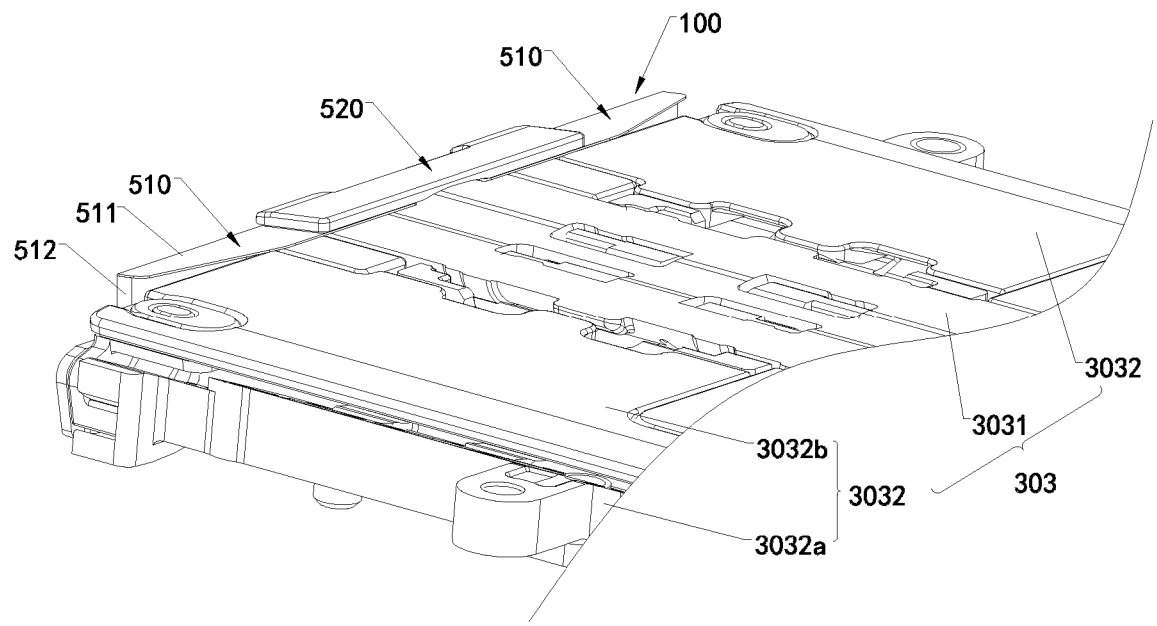
FIG. 71 is a schematic diagram of a structure of the edge protection structure shown in FIG. 69 and a rotating shaft assembly when the edge protection structure is fastened to a foldable display terminal.
Figure 72:
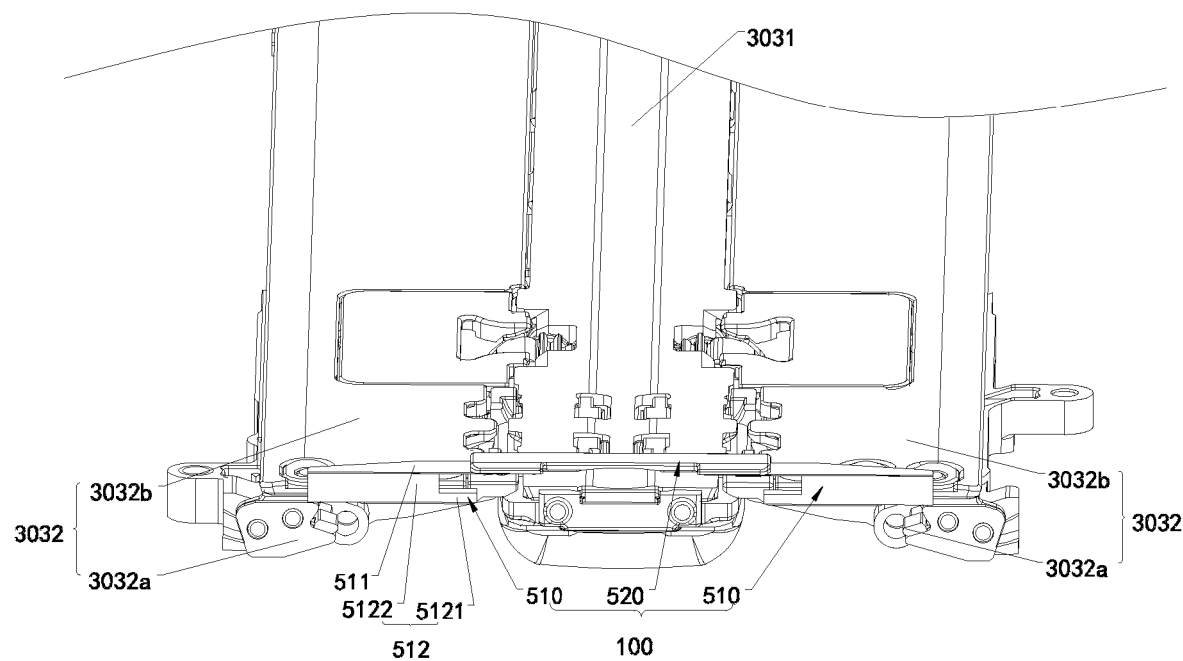
FIG. 72 is a schematic diagram of a structure of the edge protection structure and the rotating shaft assembly in an implementation shown in FIG. 71 from another perspective.

Refer to FIG. 69 and FIG. 70 again. In some implementations of this application, the fastening block 512 includes a first plate 5121 opposite to the fastening plate 511, and a second plate 5122 that connects the first plate 5121 to the fastening plate 511. In this implementation, the fastening block 512 is located on a side that is of the fastening plate 511 and that is away from the flexible member 520. Refer to FIG. 71 and FIG. 72. FIG. 71 is a schematic diagram of a structure of the edge protection structure 100 shown in FIG. 69 and the rotating shaft assembly 303 when the edge protection structure 100 is fastened to the foldable display terminal 1000. FIG. 72 is a schematic diagram of a structure of the edge protection structure 100 and the rotating shaft assembly 303 in an implementation shown in FIG. 71 from another perspective. In this implementation, when the edge protection structure 100 is fastened to the foldable display terminal 1000, the flexible member 520 and the fastening plate 511 are located on a side that is of the stationary shaft 3031 and that faces the display, and the flexible member 520 and the first section 511*a* of the fastening plate 511 are opposite to the stationary shaft 3031 of the rotating shaft assembly 303. The second section 511*b* of the fastening plate 511 is opposite to the rotating shaft. The fastening blocks 512 of the two fastening members 510 are respectively located in length extension directions of the two rotating shafts 3032 of the rotating shaft assembly 303, and the fastening member 510 is fixedly connected to a rotating shaft 3032 closest to the fastening member 510. In other words, in this implementation, the fastening block 512 of the first fastening member is located in the length extension direction of the first rotating shaft, and is fixedly connected to the first rotating shaft, and the fastening block 512 of the second fastening member is located in the length extension direction of the second rotating shaft, and is fixedly connected to the second rotating shaft. When the foldable display terminal 1000 is bent, the two rotating shafts 3032 are both rotated relative to the stationary shaft 3031, to drive the two fastening blocks 512, that are respectively fastened to the two rotating shafts 3032, to be close to or far away from each other, so as to drive the flexible member 520 and the first section 511*a* of the fastening plate 511, that are opposite to the stationary shaft 3031, to bend. As a result, the edge protection structure 100 is bent with the foldable display terminal 1000, to avoid impact of the edge protection structure 100 on bending or unfolding of the foldable display terminal 1000.

In some implementations of this application, an edge of the support plate 3032*b* of the rotating shaft 3032 can be inserted between the first plate 5121 and the fastening block 512, and the support plate 3032*b* can be in contact with and fastened to the first plate 5121. In this way, the fastening block 512 is fixedly connected to the rotating shaft 3032. In this implementation, the fastening block 512 is fixedly connected to the support plate 3032*b* of the rotating shaft 3032. This can achieve better fixed connection effect, and can further avoid impact of the fixed connection between the fastening block 512 and the rotating shaft 3032 on rotation effect of the rotating shaft 3032 relative to the stationary shaft 3031. It may be understood that, in another implementation of this application, the fastening block 512 may be alternatively fastened to the rotating shaft 3032 in another manner. For example, in some implementations, the fastening block 512 is located in a length extension direction of the rotating shaft 3032, there is a specific spacing between the fastening block 512 and the rotating shaft 3032, and the fastening block 512 and the rotating shaft 3032 are fastened by using a connecting plate. In other words, two ends of the connecting plate are fixedly connected to the fastening block 512 and the rotating shaft 3032 respectively. In this way, the fastening block 512 and the rotating shaft 3032 are connected and fastened by using the connecting plate. It may be understood that, in this application, the fastening block 512 and the rotating shaft 3032 may be alternatively connected in another manner. A connection manner is not specifically limited in this application. In this implementation, the first section 511*a* of the fastening plate 511 is opposite to the stationary shaft 3031, and the second section 511*b* of the fastening plate 511 is opposite to the rotating shaft 3032.

Figure 73:
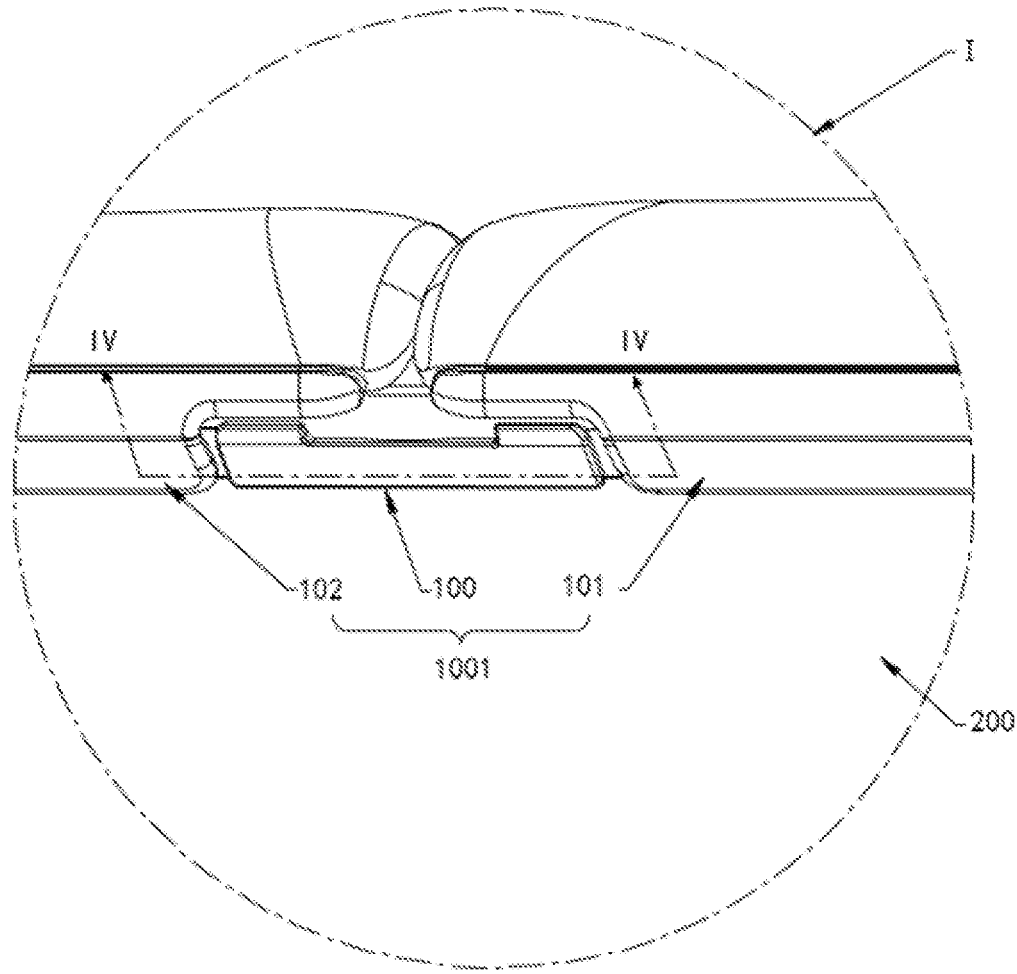
FIG. 73 is a schematic enlarged view of a position I when the edge protection structure shown in FIG. 1 is replaced with the edge protection structure in the implementation shown in FIG. 69.
Figure 74:
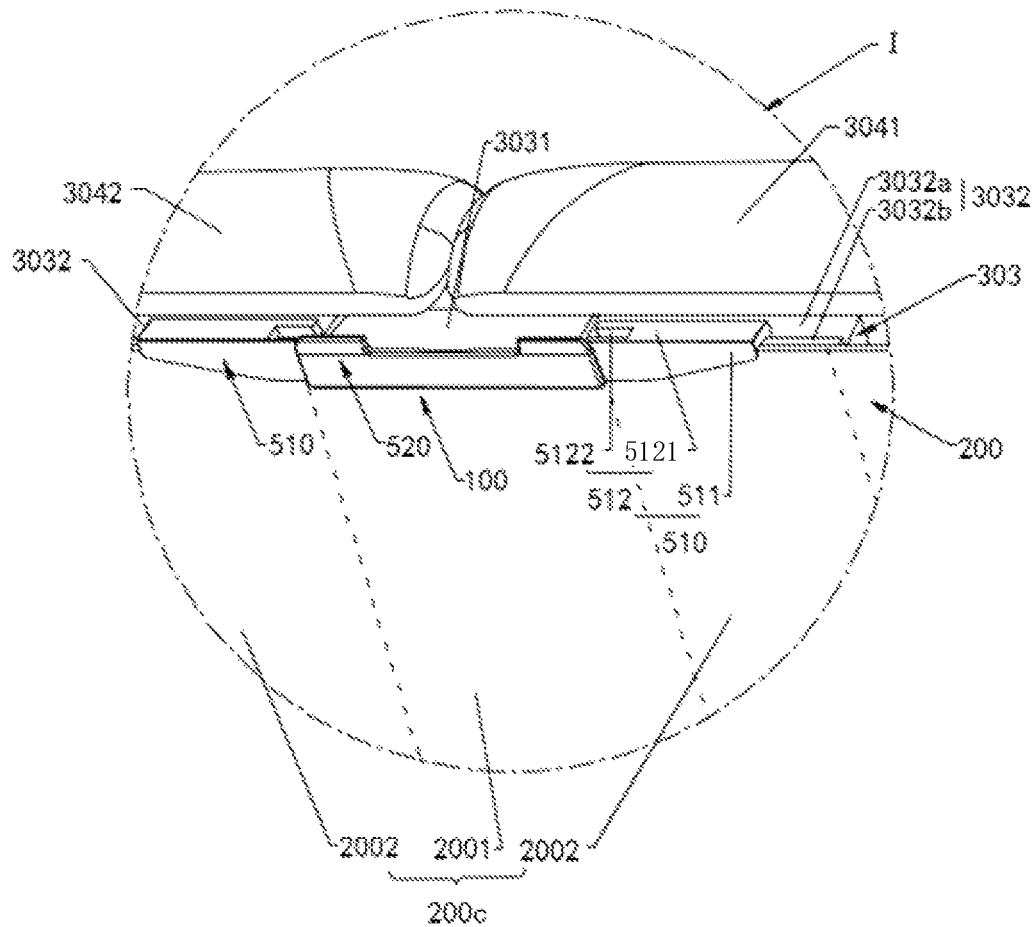
FIG. 74 is a schematic diagram of a position relationship between the edge protection structure shown in FIG. 73 and another structure of a foldable display terminal.
Figure 75:
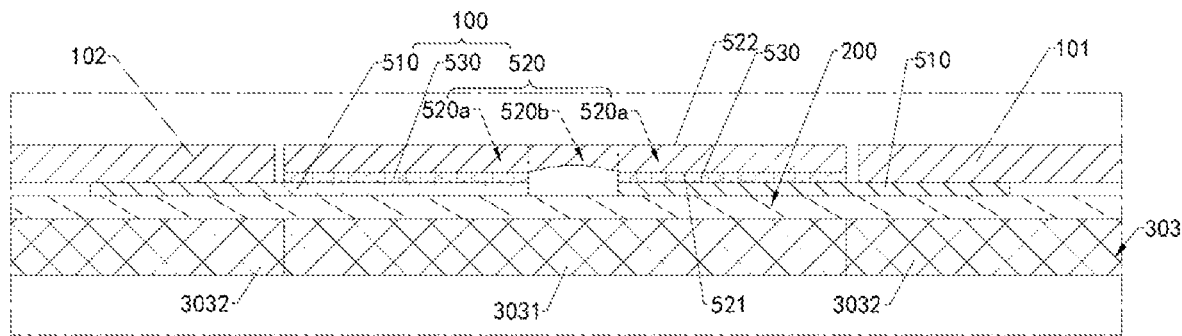
FIG. 75 is a partial cross sectional schematic view obtained through cutting along a position IV-IV in FIG. 73.

Refer to FIG. 73, FIG. 74, and FIG. 75. FIG. 73 is a schematic enlarged view of a position I when the edge protection structure 100 shown in FIG. 1 is replaced with the edge protection structure 100 in the implementation shown in FIG. 69. FIG. 74 is a schematic diagram of a position relationship between the edge protection structure 100 shown in FIG. 73 and another structure of the foldable display terminal 1000. FIG. 75 is a partial cross sectional schematic view obtained through cutting along a position IV-IV in FIG. 73. In this implementation of this application, when the edge protection structure 100 is mounted in the foldable display terminal 1000, the flexible member 520 and the fastening plate 511 of the edge protection structure 100 are located on one side of the display surface 203 of the display 200. In other words, the flexible member 520 and the fastening plate 511 are located on one side that is away from the screen support assembly 300. In addition, the flexible member 520 in this implementation is opposite to the stationary shaft 3031 of the rotating shaft assembly 303, that is, the flexible member 520 is opposite to the bending region 2001 of the display 200. In addition, in this implementation, the flexible member 520 can cover an edge position of the bending region 2001 of the display 200, to prevent the edge of the bending region 2001 from being exposed, so as to improve the appearance effect of the display terminal 1000. In addition, the bending region 2001 of the display 200 is covered with the flexible member 520 of the edge protection structure 100. Therefore, when the bending region 2001 of the display 200 is collided, the flexible member 520 of the edge protection structure 100 can protect the bending region 2001 of the display 200, to prevent the edge of the bending region 2001 of the display 200 from being damaged due to the collision.

In this implementation, the first section 511*a* of the fastening plate 511 and the fastening block 512 of the first fastening member of the edge protection structure 100 are located on a side that is of the first edge protector 101 and that faces the display 200. The fastening block 512 and the second section 511*b* of the fastening plate 511 of the second fastening member of the edge protection structure 100 are located on a side that is of the second edge protector 102 and that faces the display 200. In other words, the fastening block 512 and the fastening plate 511 of the first fastening member can be pressed by the first edge protector 101. When the connection between the first fastening member and the first rotating shaft fails, the first fastening member can also be pressed by the first edge protector 101. The fastening block 512 and the fastening plate 511 of the second fastening member can be pressed by the second edge protector 102. When the connection between the second fastening member and the second rotating shaft fails, the second fastening member can also be pressed by the second edge protector 102. This can further effectively prevent the edge protection structure 100 from falling off from the foldable display terminal 1000.

Figure 76:
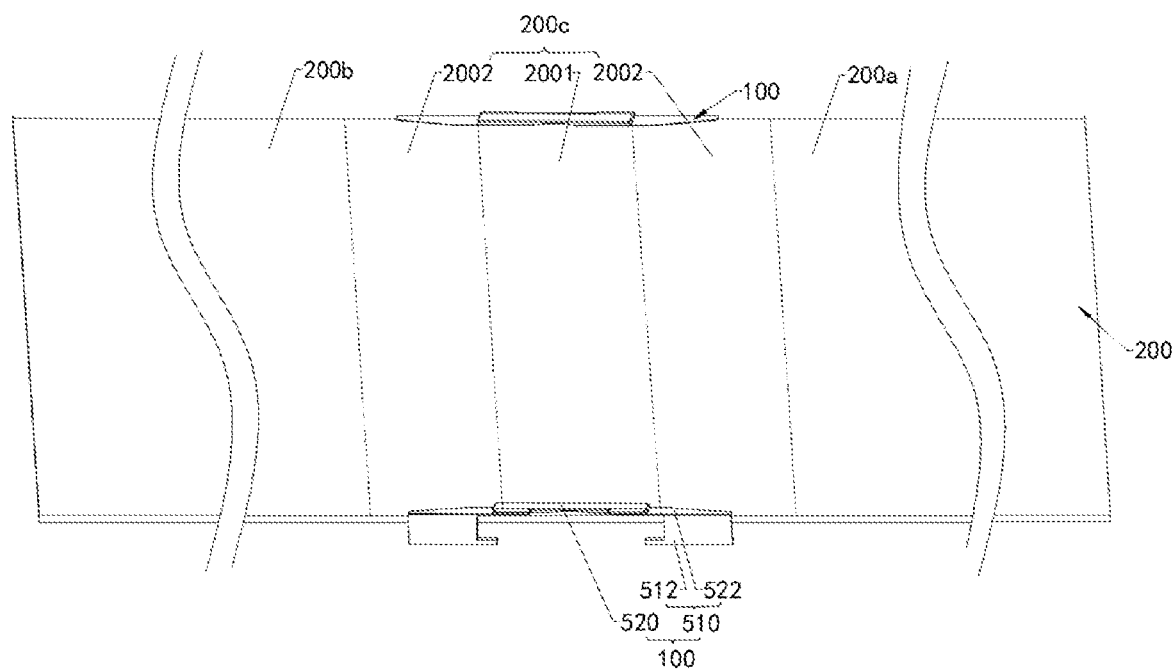
FIG. 76 is a schematic diagram of a structure state of a display of a foldable display terminal and an edge protection structure according to this application when the foldable display terminal is in the unfolded state shown in FIG. 1 after an edge protection structure shown in FIG. 1 is replaced with the edge protection structure.
Figure 77:
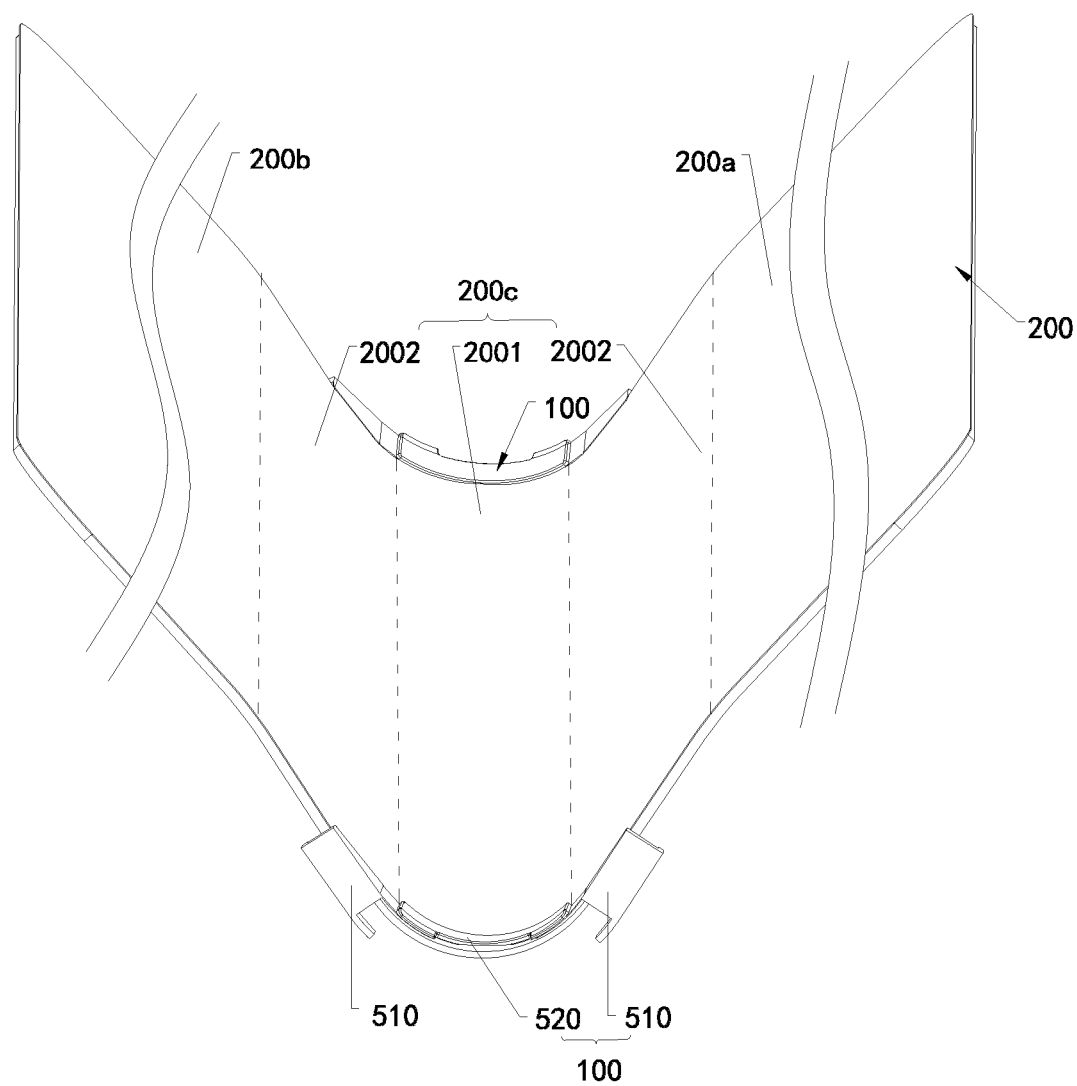
FIG. 77 is a schematic diagram of a structure state of a display of a foldable display terminal and an edge protection structure according to this application when the foldable display terminal is folded to the intermediate state shown in FIG. 2 after an edge protection structure shown in FIG. 1 is replaced with the edge protection structure.
Figure 78:
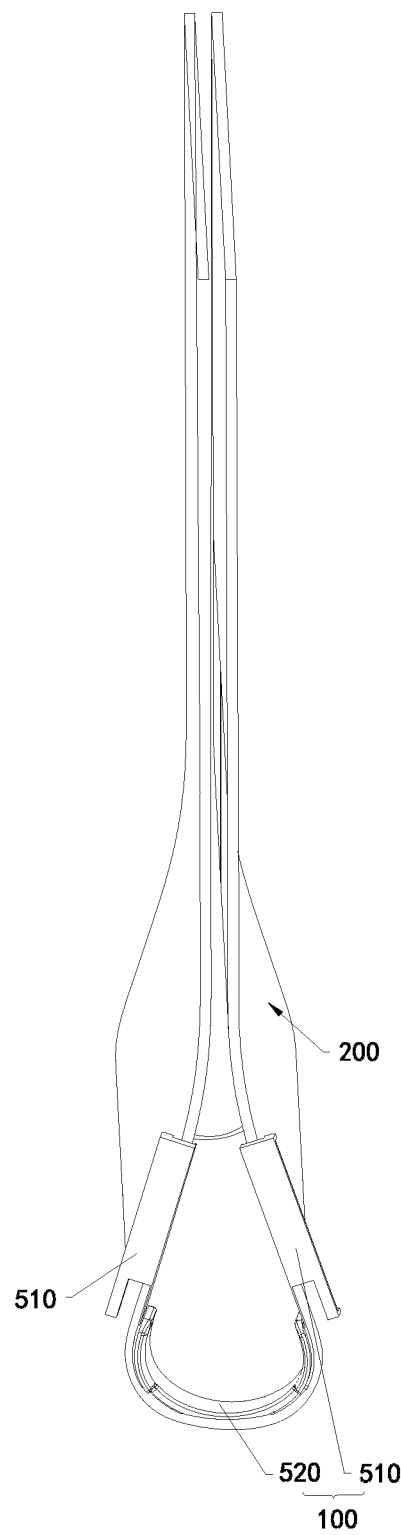
FIG. 78 is a schematic diagram of a structure state of a display of a foldable display terminal and an edge protection structure according to this application when the foldable display terminal is folded to the fully closed state shown in FIG. 3 after an edge protection structure shown in FIG. 1 is replaced with the edge protection structure.

When the foldable display terminal 1000 is folded, and the ends of the first body 301 and the second body 302 of the foldable display terminal 1000 that are away from the rotating shaft assembly 303 are close to each other, to drive the display 200, that is fastened to the first body 301 and the second body 302, to fold, the rotating shaft 3032 of the rotating shaft assembly 303 can be rotated relative to the stationary shaft 3031, to drive the display 200 to bend. In addition, the rotating shaft 3032 of the rotating shaft assembly 303 can be rotated relative to the stationary shaft 3031, and can drive the edge protection structure 100 to bend. In this way, the edge protection structure 100 and the display 200 are bent synchronously. As a result, the edge protection structure 100 can always cover the edge of the bending region 2001 of the display 200. This ensures that the edge of the bending region 2001 of the display 200 can be always well protected when the foldable display terminal 1000 is in any state. In this application, the flexible member 520 and the fastening plate 511 of the edge protection structure 100 both have good bending performance, basically do not affect a state of the display 200 when the display 200 is bent, but can correspondingly change shapes with the bending state of the display 200 when the display 200 is bent. Therefore, when the display 200 in this implementation of this application is fully folded, the first fastening region 200a and the second fastening region 200b of the display 200 can be attached together, and the rotating shaft region 200c of the display 200 can be naturally bent. In other words, in this application, the edge protection structure 100 disposed in the foldable display terminal 1000 is provided, to protect the edge of the bending region 2001 of the display 200 of the foldable display terminal 1000, and improve the appearance effect of the foldable display terminal 1000, without affecting folding of the display 200 of the foldable display terminal 1000 and reliability of the display 200. Refer to FIG. 76 to FIG. 78. FIG. 76 is a schematic diagram of a structure state of the display 200 of the foldable display terminal 1000 and the edge protection structure 100 according to this application when the foldable display terminal 1000 is in the unfolded state shown in FIG. 1 after the edge protection structure 100 shown in FIG. 1 is replaced with the edge protection structure 100. FIG. 77 is a schematic diagram of a structure state of the display 200 of the foldable display terminal 1000 and the edge protection structure 100 according to this application when the foldable display terminal 1000 is folded to the intermediate state shown in FIG. 2 after the edge protection structure 100 shown in FIG. 1 is replaced with the edge protection structure 100. FIG. 78 is a schematic diagram of a structure state of the display 200 of the foldable display terminal 1000 and the edge protection structure 100 according to this application when the foldable display terminal 1000 is folded to the fully closed state shown in FIG. 3 after the edge protection structure 100 shown in FIG. 1 is replaced with the edge protection structure 100.

In some implementations of this application, a surface of the edge protection structure 100 may be further coated with a plating layer, to improve appearance effect of the edge protection structure 100. For example, in some implementations, the surface of the edge protection structure 100 or a surface of the flexible member 520 of the edge protection structure 100 is covered with a plating layer. In this way, the edge protection structure 100 or the flexible member 520 of the edge protection structure 100 can have a same color as the rear cover of the foldable display terminal 1000, so that the foldable display terminal 1000 has a uniform appearance color, to have better appearance effect. In some implementations, the plating layer can further prevent external water, oxygen, and the like from corroding the edge protection structure 100, to improve quality of the foldable display terminal 1000.

In this application, the plating layer may be formed through evaporation by using an evaporation technology, or may be formed through deposition in a manner, for example, vapor deposition. A manner of forming the plating layer is not specifically limited herein.

In some implementations of this application, a surface of the fastening plate 511 has a high smoothness degree. When the edge protection structure 100 is mounted in the foldable display terminal 1000, the fastening plate 511 of the edge protection structure 100 is stacked on the display 200 and is in contact with the edge of the display 200. In this implementation of this application, when a surface smoothness degree of the fastening plate 511 is high, friction force between the fastening plate 511 and the display 200 can be reduced, to avoid pulling between the fastening plate 511 and the display 200 due to the friction force in a process of bending the foldable display terminal 1000. This ensures smooth bending of the foldable display terminal 1000, avoids damage to the display 200 due to pulling between the fastening plate 511 and the display 200, and improves reliability of the foldable display terminal 1000.

In the foldable display terminal 1000 in some other implementations of this application, a smooth layer may be further stacked on a surface that is of the fastening plate 511 and that is away from the flexible member 520. A surface smoothness degree of the smooth layer can be greater than the surface smoothness degree of the fastening plate 511. In this implementation, when the foldable display terminal 1000 is mounted in the foldable display terminal 1000, the smooth layer is in contact with the display 200. The smooth layer has a smooth surface. Therefore, friction force between the smooth layer and the display 200 can be reduced, to avoid pulling between the smooth layer and the display 200 due to the friction force in the process of bending the foldable display terminal 1000. This ensures smooth bending of the foldable display terminal 1000, avoids damage to the display 200 due to pulling between the smooth layer and the display 200, and improves reliability of the foldable display terminal 1000.

Refer to FIG. 69 again. In some implementations of this application, a width of the flexible member 520 is greater than a width of the fastening plate 511. A width direction of the flexible member 520 and a width direction of the fastening block 512 are both the same as extension directions of the stationary shaft 3031 and the rotating shaft 3032 in this implementation, and are a Y-axis direction in FIG. 69. In this implementation, because the width of the flexible member 520 is greater than the width of the fastening plate 511, when the flexible member 520 is fastened to the fastening plate 511, an edge of the flexible member 520 in the width direction extends out of an edge of the fastening plate 511. As a result, when the edge protection structure 100 is collided, collision force acts on the flexible member 520. Because the flexible member 520 is a flexible structure that is more flexible than the fastening plate 511, the flexible member 520 can generate a better buffer function for the collision force, to prevent the collision force from acting on the fastening plate 511, so as to avoid a case that the collision force is transferred to the display 200 through the fastening plate 511 to damage the display 200.

Refer to FIG. 73 and FIG. 75. In some implementations of this application, when the edge protection structure 100 is mounted in the foldable display terminal 1000, the second surface 522 of the flexible member 520 is coplanar with a surface that is of the first edge protector 101 or the second edge protector 102 and that is away from the display 200. In this way, the foldable display terminal 1000 can have a flatter outer surface, to improve the appearance effect of the foldable display terminal 1000.

In this application, the fastening plate 511 of the fastening member 510 and the flexible member 520 of the edge protection structure 100 cover the edge of the bending region 2001 of the display 200. This can prevent the bending region 2001 of the display 200 from being exposed, to improve the appearance effect of the foldable display terminal 1000. In addition, the flexible member 520 and the fastening plate 511 of the elastic sheet 310 of the edge protection structure 100 cover the edge of the bending region 2001 of the display 200. This can protect the edge of the bending region 2001 of the display 200, and prevent the edge of the bending region 2001 of the display 200 from being damaged due to a collision, thereby improving reliability of the foldable display terminal 1000.

The foregoing descriptions are embodiments of the present invention. It should be noted that a person of ordinary skill in the art may make some improvements and polishing without departing from the principle of the present invention and the improvements and polishing shall fall within the protection scope of the present invention.

What is claimed is:

1. A foldable display terminal, comprising a rotating shaft assembly, a display, a first body, a second body, and an edge protection structure, wherein the display comprises a bending region, a first fastening region, and a second fastening region, the bending region of the display is stacked on the rotating shaft assembly, the display comprises a display surface and a side surface intersecting with the display surface, and the display surface is away from the rotating shaft assembly;

the first body, the rotating shaft assembly, and the second body are sequentially connected in a first direction, wherein the first direction is a direction in which the first body points to the second body when the foldable display terminal is in an open state;

the edge protection structure comprises a rigid member, a connector, and a soft rubber member, wherein the soft rubber member is an integrated component;

the first body comprises a first border and a first middle plate, the second body comprises a second border and a second middle plate;

the first middle plate is located in a region enclosed by the first border, and is connected to an inner surface of the first border;

the second middle plate is located in a region enclosed by the second border, and is connected to an inner surface of the second border;

the display is stacked on the first middle plate, the second middle plate, and the rotating shaft assembly;

the first fastening region is fastened to the first body;

the second fastening region is fastened to the second body;

in a length extending direction of the rotating shaft assembly, a first gap is provided between a first end of the rotating shaft assembly and the first border, a second gap is provided between the first end of the rotating shaft assembly and the second border;

the soft rubber member comprises a protection part, a first extension part, a second extension part, a first fastening part, and a second fastening part;

the first extension part and the first fastening part connect to a first end of the protection part;

the second extension part and the second fastening part connect to a second end of the protection part;

a bending angle is formed between the first extension part and the first fastening part, a bending angle is formed between the second extension part and the second fastening part;

the first extension part, the protection part, and the second extension part are located on part of an edge of the display;

the first fastening part is positioned inside the first gap, the second fastening part is positioned inside the second gap, and both the first fastening part and the second fastening part face the side surface of the display; and the connector comprises a first part and a second part connected to the first part, the first part is fixedly connected to the protection part, and the second part is fixedly connected to the rigid member.

2. The foldable display terminal of claim 1, wherein the foldable display terminal further comprises a first edge protector and a second edge protector; and wherein the first edge protector covers edges of the first fastening region, the second edge protector covers edges of the second fastening region;

the first fastening part is pressed by the first edge protector, and the second fastening part is pressed by the second edge protector.

3. The foldable display terminal of claim 1, further comprising a first edge protector and a second edge protector; wherein the first extension part is located between the first edge protector and the display; and the second extension part is located between the second edge protector and the display.

4. The foldable display terminal of claim 1, wherein the first extension part comprises a first contact surface and a first fastening surface, wherein the first fastening surface is opposite to the first contact surface, wherein the first contact surface faces the display;

wherein the second extension part comprises a second contact surface and a second fastening surface, wherein the second fastening surface is opposite to the second contact surface, wherein the second contact surface faces the display.

5. The foldable display terminal of claim 1, wherein the first extension part comprises a first contact surface, the first contact surface faces the display, and the first contact surface is connected to the protection part; and the second extension part comprises a second contact surface, the second contact surface faces the display, and the second contact surface is connected to the protection part.

6. The foldable display terminal of claim 5, wherein the first extension part comprises a first fastening surface opposite to the first contact surface, and the first fastening surface is connected to the protection part; and the second extension part comprises a second fastening surface opposite to the second contact surface, and the second fastening surface is connected to the protection part.

7. The foldable display terminal of claim 1, wherein the first extension part, the second extension part, and the soft rubber member are an integrated structure.

8. The foldable display terminal of claim 1, wherein the rigid member and the second part of the connector are an integrated structure.

9. The foldable display terminal of claim 1, wherein a first rigid plate is embedded in the first fastening part, a second rigid plate is embedded in the second fastening part, wherein the first rigid plate and the second rigid plate are made of metal materials.

10. An edge protection structure, configured to protect an edge of a bending region of a display, wherein the edge protection structure comprises a rigid member, a connector, and a soft rubber member, wherein the soft rubber member is an integrated component; the soft rubber member comprises a protection part, a first extension part, a second extension part;

the first extension part is connected to a first end of the protection part, a first surface of the first extension part is connected to a second surface of the protection part;

the second extension part is connected to a second end of the protection part, a third surface of the second extension part is connected to the second surface of the protection part; and the connector comprises a first part and a second part connected to the first part, the first part is fixedly connected to the protection part, the second part is fixedly connected to the rigid member.

11. The edge protection structure of claim 10, wherein the soft rubber member further comprises two fastening parts, the two fastening parts are respectively connected to two ends of the protection part, the two fastening parts comprises a first fastening part and a second fastening part, wherein the first fastening part, the second fastening part and the protection part are an integrated structure.

12. The edge protection structure of claim 11, wherein a bending angle is formed between the first extension part and the first fastening part, a bending angle is formed between the second extension part and the second fastening part.

13. The edge protection structure of claim 11, wherein a first rigid plate is embedded in the first fastening part, a second rigid plate is embedded in the second fastening part, wherein the first rigid plate and the second rigid plate are made of metal materials.

14. The edge protection structure of claim 10, wherein the first extension part comprises a first contact surface, and the first contact surface is connected to the protection part, the second extension part comprises a second contact surface, and the second contact surface is connected to the protection part.

15. The edge protection structure of claim 14, wherein the first extension part comprises a first fastening surface opposite to the first contact surface, and the first fastening surface is connected to the protection part; and the second extension part comprises a second fastening surface opposite to the second contact surface, and the second fastening surface is connected to the protection part.

16. The edge protection structure of claim 10, wherein the first extension part, the second extension part and the protection part are an integrated structure.

17. The edge protection structure of claim 10, wherein the rigid member and the second part of the connector are an integrated structure.

18. The edge protection structure of claim 10, wherein the rigid member is connected to the second part of the connector by using an adhesive, a screw, solder, or a fastener.

19. The edge protection structure of claim 10, wherein the first part and the protection part are an integrated structure.

20. The edge protection structure of claim 10, wherein the soft rubber member is made of a soft rubber material, and the rigid member and the connector are both made of a metal material.

* * * * *